US011068742B2

(12) United States Patent
Lee et al.

(10) Patent No.: US 11,068,742 B2
(45) Date of Patent: Jul. 20, 2021

(54) CURATION OF CUSTOM WORKFLOWS USING MULTIPLE CAMERAS

(71) Applicant: Scenera, Inc., Palo Alto, CA (US)

(72) Inventors: David D. Lee, Palo Alto, CA (US); Andrew Augustine Wajs, Haarlem (NL)

(73) Assignee: Scenera, Inc., Palo Alto, CA (US)

( * ) Notice: Subject to any disclaimer, the term of this patent is extended or adjusted under 35 U.S.C. 154(b) by 0 days.

(21) Appl. No.: 17/084,417

(22) Filed: Oct. 29, 2020

(65) Prior Publication Data

US 2021/0133492 A1    May 6, 2021

Related U.S. Application Data

(60) Provisional application No. 62/928,199, filed on Oct. 30, 2019, provisional application No. 62/928,165, (Continued)

(51) Int. Cl.
*G06K 9/62* (2006.01)
*G06K 9/00* (2006.01)
(Continued)

(52) U.S. Cl.
CPC .......... *G06K 9/6227* (2013.01); *G06F 9/542* (2013.01); *G06K 9/00973* (2013.01); (Continued)

(58) Field of Classification Search
CPC ............ G06K 9/6227; G06K 9/00973; G06K 9/6289; G06K 2209/27; H04N 5/247; H04N 5/23229; G06N 20/00; G06F 9/542
See application file for complete search history.

(56) References Cited

U.S. PATENT DOCUMENTS 10,412,291 B2    9/2019 Lee et al.
10,509,459 B2    12/2019 Lee et al.
(Continued)

OTHER PUBLICATIONS

PCT International Search Report and Written Opinion, PCT Application No. PCT/US20/58193, dated Feb. 2, 2021, 14 pages.
(Continued)

*Primary Examiner* — Aaron W Carter
(74) *Attorney, Agent, or Firm* — Fenwick & West LLP

(57) ABSTRACT

A multi-layer technology stack includes a sensor layer including image sensors, a device layer, and a cloud layer, with interfaces between the layers. A method to curate different custom workflows for multiple applications include the following. Requirements for custom sets of data packages for the applications is received. The custom set of data packages include sensor data packages (e.g., SceneData) and contextual metadata packages that contextualize the sensor data packages (e.g., SceneMarks). Based on the received requirements and capabilities of components in the technology stack, the custom workflow for that application is deployed. This includes a selection, configuration and linking of components from the technology stack. The custom workflow is implemented in the components of the technology stack by transmitting workflow control packages directly and/or indirectly via the interfaces to the different layers.

18 Claims, 47 Drawing Sheets
(46 of 47 Drawing Sheet(s) Filed in Color)

Related U.S. Application Data filed on Oct. 30, 2019, provisional application No. 63/020,521, filed on May 5, 2020.

(51) Int. Cl.
| | |
|---|---|
| *H04N 5/232* | (2006.01) |
| *G06F 9/54* | (2006.01) |
| *G06N 20/00* | (2019.01) |
| *H04N 5/247* | (2006.01) |

(52) U.S. Cl.
CPC ........... *G06K 9/6289* (2013.01); *G06N 20/00* (2019.01); *H04N 5/23229* (2013.01); *H04N 5/247* (2013.01); *G06K 2209/27* (2013.01)

(56) References Cited

U.S. PATENT DOCUMENTS

| | | | |
|---|---|---|---|
| 10,693,843 | B2 | 6/2020 | Lee et al. |
| 2005/0120330 | A1 | 6/2005 | Ghai et al. |
| 2008/0028363 | A1 | 1/2008 | Mathew |
| 2010/0185973 | A1 | 7/2010 | Ali et al. |
| 2010/0207762 | A1 | 8/2010 | Lee et al. |
| 2011/0173328 | A1* | 7/2011 | Park .................. G06F 9/5072 709/226 |
| 2013/0055201 | A1* | 2/2013 | No .................... G06F 3/048 717/113 |
| 2013/0124807 | A1* | 5/2013 | Nielsen ............. G06F 11/1438 711/162 |
| 2014/0201707 | A1* | 7/2014 | Schroeder ......... H04L 67/34 717/106 |
| 2014/0350997 | A1 | 11/2014 | Holm et al. |
| 2016/0004390 | A1 | 1/2016 | Laska et al. |
| 2017/0006135 | A1 | 1/2017 | Siebel et al. |
| 2017/0316586 | A1* | 11/2017 | Ricci .................. G06T 11/206 |
| 2018/0018508 | A1 | 1/2018 | Tusch |
| 2019/0043201 | A1 | 2/2019 | Strong et al. |
| 2019/0207866 | A1* | 7/2019 | Pathak .............. H04L 41/5051 |
| 2019/0258864 | A1 | 8/2019 | Lee et al. |
| 2020/0293803 | A1 | 9/2020 | Wajs et al. |

OTHER PUBLICATIONS

PCT International Search Report and Written Opinion, PCT Application No. PCT/US20/58198, dated Feb. 2, 2021, 12 pages.
United States Office Action, U.S. Appl. No. 17/084,429, dated Feb. 4, 2021, 16 pages.
Girdhar, R. et al., "Video Action Transformer Network," Proceedings of the IEEE/CVF Conference on Computer Vision and Pattern Recognition (CVPR), Jun. 2019, pp. 244-253.
Horev, R., "Bert Explained: State of the art language model for NLP," Nov. 10, 2018, 8 pages, [Online] [Retrieved on Jan. 21, 2021] Retrieved from the Internet <URL: https://towardsdatascience.com/bert-explained-state-of-the-art-language-model-for-nlp-18b21a9b6270>.
Kong, Y. et al., "Human Action Recognition and Prediction: A Survey," arXiv.1806.11230, Jul. 2, 2018, pp. 1-20.
Loginova, K., "Attention in NLP," Jun. 22, 2018, 16 pages, [Online] [Retrieved on Jan. 20, 2021] Retrieved from the Internet <URL: https://medium.com/@edloginova/aftention-in-nlp-734c6fa9d983>.
Olah, C. et al., "Attention and Augmented Recurrent Neural Networks," Sep. 8, 2016, 19 pages, [Online] [Retrieved on Jan. 21, 2021] Retrieved from the Internet <URL: https://distill.pub/2016/augmented-rnns/>.
Olah, C., "Understanding LSTM Networks," Aug. 27, 2015, eight pages, [Online] [Retrieved on Jan. 20, 2021] Retrieved from the Internet <URL: https://colah.github.io/posts/2015-08-Understanding-LSTMs/>.
Piergiovanni, Aj., et al., "Tiny Video Networks," arXiv:1910.06961, Oct. 15, 2019, pp. 1-10.
Rivera-Soto, R.A. et al., "Sequence to Sequence Models for Generating Video Captions," Stanford University, Jul. 2, 2017, pp. 1-7.
Rosset, C., "Turing-NLG: A 17-billion-parameter language model by Microsoft," Feb. 13, 2020, 11 pages, [Online] [Retrieved on Jan. 21, 2021] Retrieved from the Internet <URL: https://www.microsoft.com/en-us/research/blog/turing-nlg-a-17-billion-parameter-language-model-by-microsoft/>.
Security World Market, "Androvideo's AI camera for security & safety," Nov. 14, 2019, six pages, [Online] [Retrieved on Jan. 21, 2021] Retrieved from the Internet <URL: https://www.securityworldmarket.com/int/News/Product-News/androvideos-ai-camera-ideal-for-property-security--safety>.
Sharma, A.K., "Predicting Human Behaviour Activity using Deep Learning (LSTM)," May 26, 2018, 12 pages, [Online] [Retrieved on Jan. 21, 2021] Retrieved from the Internet <URL: https://medium.com/@chataks93/predicting-human-behaviour-activity-using-deep-learning-Istm-Itf9030b82e7>.
Sun, C. et al., "VideoBERT: A Joint Model for Video and Language Representation Learning," arXiv:1904.01766, Sep. 11, 2019, pp. 1-13.
Vincent, J., "This Japanese AI security camera shows the future of surveillance will be automated," Jun. 26, 2018, four pages, [Online] [Retrieved on Jan. 21, 2021] Retrieved from the Internet <URL: https://www.theverge.com/2018/6/26/17479068/ai-guardman-security-camera-shoplifter-japan-automated-surveillance>.

\* cited by examiner

CURATION OF CUSTOM WORKFLOWS USING MULTIPLE CAMERAS

CROSS-REFERENCE TO RELATED APPLICATION(S)

This application claims priority under 35 U.S.C. § 119(e) to U.S. Provisional Patent Application Ser. No. 62/928,199, "Scenera Multi-Camera Curation," filed Oct. 30, 2019; 62/928,165, "Network of Intelligent Camera Ecosystem," filed Oct. 30, 2019; and 63/020,521, "NICE Tracking Sequence of Events," filed May 5, 2020. The subject matter of all of the foregoing is incorporated herein by reference in their entirety.

BACKGROUND

1. Technical Field

This disclosure relates generally to obtaining, analyzing and presenting information from sensors, including cameras.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. Applications such as advanced driver assisted systems and security based on facial recognition require custom built software which reads in raw images from cameras and then processes the raw images in a specific way for the target application. The application developers typically must create application-specific software to process the raw video frames to extract the desired information. In addition to the low-level camera interfaces, if application developers want to use more sophisticated processing or analysis capabilities, such as artificial intelligence or machine learning for higher-level image understanding, they will also have to understand and create interfaces for each of these systems. The application-specific software typically is a full stack beginning with low-level interfaces to the sensors and progressing through different levels of analysis to the final desired results. The current situation also makes it difficult for applications to share or build on the analysis performed by other applications.

As a result, the development of applications that make use of networks of sensors is both slow and limited. For example, surveillance cameras installed in an environment typically are used only for security purposes and in a very limited way. This is in part because the image frames that are captured by such systems are very difficult to extract meaningful data from. Similarly, in an automotive environment where there is a network of cameras mounted on a car, the image data captured from these cameras is processed in a way that is very specific to a feature of the car. For example, a forward-facing camera may be used only for lane assist. There usually is no capability to enable an application to utilize the data or video for other purposes.

Thus, there is a need for more flexibility and ease in accessing and processing data captured by sensors, including images and video captured by cameras.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
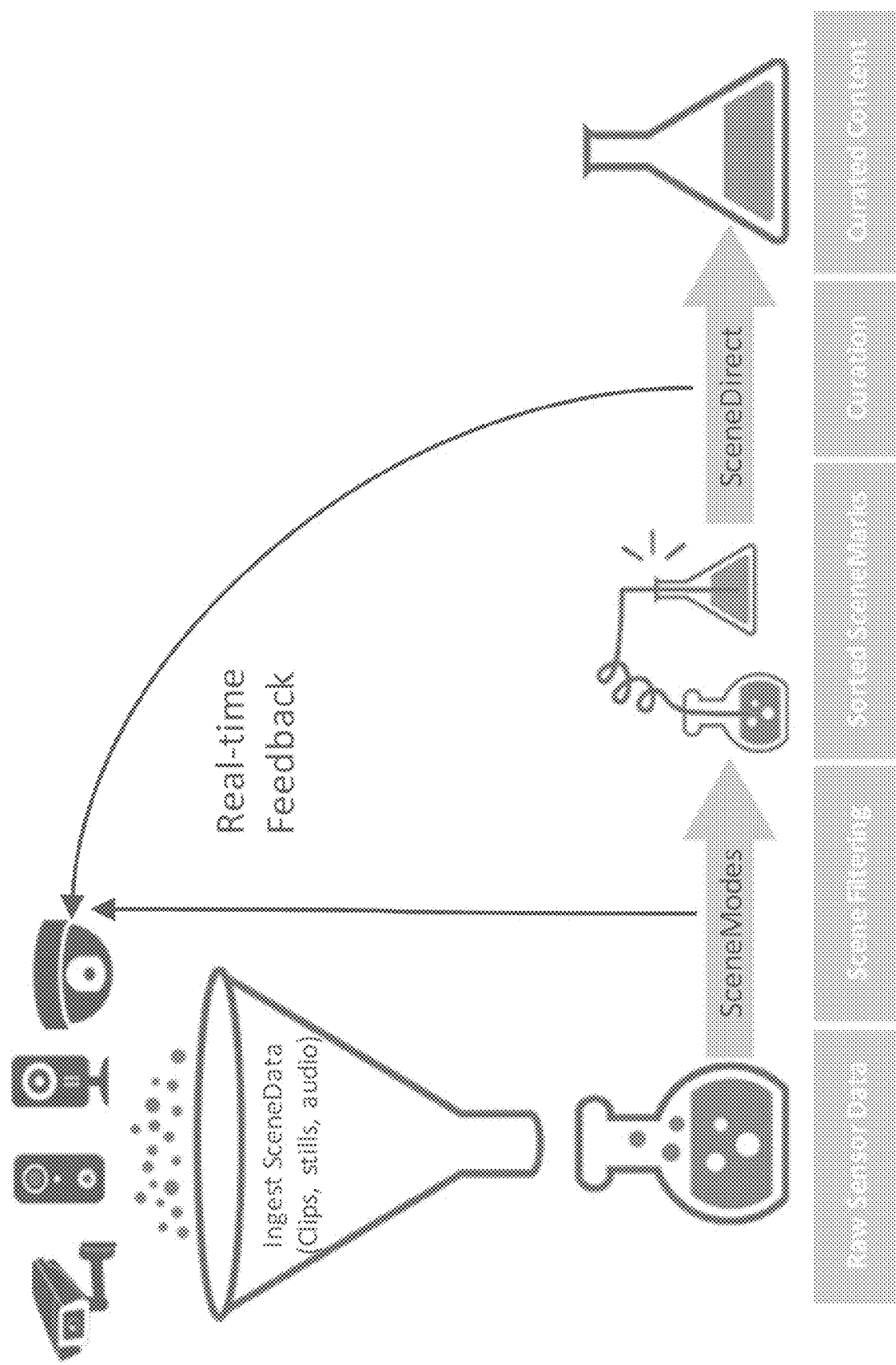
FIG. 1A is an introductory diagram of a custom workflow to generate useful data from raw sensor data, including image data.
Figure 1B:
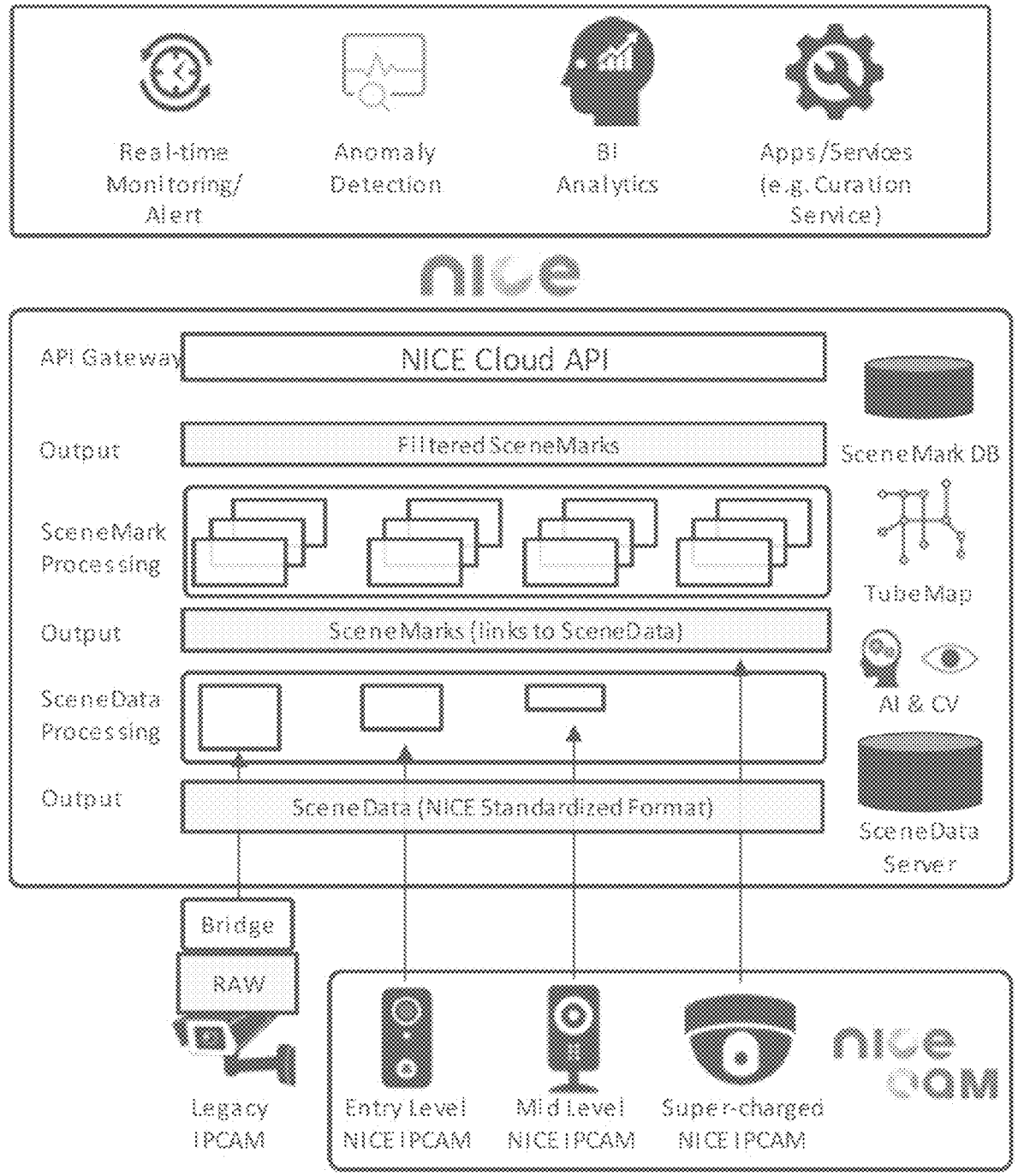
FIG. 1B is another introductory diagram of a custom workflow to generate useful data from raw sensor data, including image data.

FIGS. 1A and 1B are high level introductory diagrams that show a custom workflow to generate useful data from raw sensor data, including image data. In FIG. 1A, in imaging applications, there are lots of different types of data that the cameras and other sensors capture. This raw sensor data, which may be captured 24×7 at video frame rates, typically is not all needed. Applications may need certain data only when certain important events occur. But how does an application know what events to look for or how to detect those events? In FIG. 1A, the custom workflow from raw sensor data to curated content detects the events and also provides some feedback to the sensor devices to configure their operation to look for these events. For example, one event might be a human appears in the video. If so, the application is notified. To detect this type of event, the sensors can be set into modes which are optimized to detect a human.

The raw sensor data may be filtered and analyzed to produce metadata (such as: human present). Metadata may be packaged in a form referred to as SceneMarks, as described in more detail below. The SceneMarks can be categorized and SceneMarks can come from different sensor data streams and from different types of analysis. The SceneMarks may be sorted and analyzed to provide further context for the situation. Different SceneMarks from different devices may all relate to one particular event or a sequence of relevant events. This metadata is analyzed to provide higher level understanding of the situational context and then presented in a human-understandable format to the end user. This is the curated content at the end of the workflow.

FIG. 1B shows a custom workflow implemented based on a standard, referred to as the NICE (Network of Intelligent Camera Ecosystem) standard. Image sensors (IPCAM in FIG. 1B) capture raw sensor data. Some image sensors are NICE-compliant. Legacy image sensors may be made NICE-compliant through the use of bridges. The workflow sorts and processes the sensor data and makes it more searchable. It also presents the results to the end users or other applications, which can then analyze the processed data more easily than raw sensor data. In FIG. 1B, there is a lot of sensor data (SceneData) coming from different cameras or other sensors or IoTs, and the system filters this by scene. If the system finds important scenes (i.e., events), it may generate metadata for those events and mark those events. It may use artificial intelligence (AI), machine learning and computer vision (CV) techniques to do so. The Tube Map in FIG. 1B is a proximity map of sensors, which may also be utilized in the workflow.

In FIG. 1B, the events are marked by SceneMarks. SceneMarks may be characterized by device and by event. As a result of this custom workflow, the SceneMarks are better organized, indexable, and searchable. These SceneMarks may be stored on the cloud (SceneMark DB in FIG. 1B) and published to allow different applications to look at what is going on. Sample applications shown in FIG. 1B include biometric analytics, anomaly detection or some security and surveillance-type monitoring. The curation service in FIG. 1B is a service to create custom workflows for different applications. The applications themselves may also create custom workflows. The system may present not only processed data but also a summary of the events.

FIG. 1B refers to the NICE standard. The NICE standard defines standard APIs between different layers of the technology stack, which facilitate a layered approach to image understanding. It also allows the definition of different types of data packages, including SceneData and SceneMarks. SceneData include sensor data, for example video. SceneData can include raw sensor data and/or processed/combined sensor data. SceneMarks include metadata resulting from the analysis of SceneData and/or other SceneMarks. For example, SceneMarks may indicate the presence of various trigger events (e.g., human detected). SceneMarks typically include links or references to the underlying SceneData and may also include thumbnails or other abbreviated versions of the SceneData. More detailed definitions of these data objects are provided in Section X below.

Figure 1C:
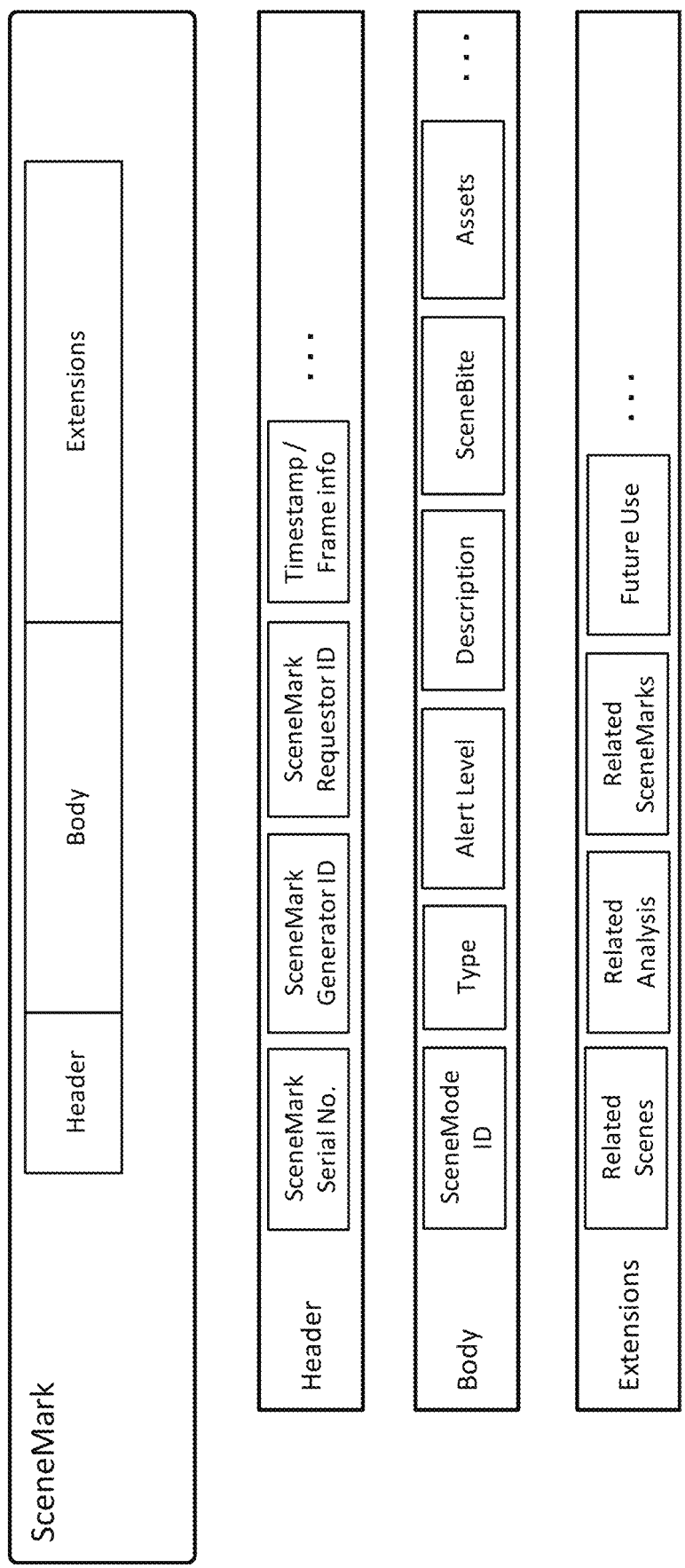
FIG. 1C shows an example format for a SceneMark.

FIG. 1C shows an example format for a SceneMark. In this example, the SceneMark includes a header, a main body and an area for extensions. The header identifies the SceneMark. The body contains the bulk of the "message" of the SceneMark. The header and body together establish the provenance for the SceneMark. In this example, the header includes an ID (or a set of IDs) and a timestamp. The SceneMark may also contain information as to how it has been processed and which processing nodes or steps have processed the SceneMark. This information can be used by a workflow or data pipeline to keep track of the stage of processing of the SceneMark without requiring additional database queries. The ID (serial number in FIG. 1C) uniquely identifies the SceneMark. The Generator ID identifies the source of the SceneMark. The body includes a SceneMode ID, SceneMark Type, SceneMark Alert Level, Short Description, and Assets and SceneBite. The SceneMark Type specifies what kind of SceneMark it is. The SceneMark Alert Level provides guidance regarding how urgently to present the SceneMark. The SceneMark Description preferably is a human-friendly (e.g. brief text) description of the SceneMark. Assets and SceneBite are data such as images and thumbnails. "SceneBite" is analogous to a soundbite for a scene. It is a lightweight representation of the SceneMark, such as a thumbnail image or short audio clip. Assets are the heavier underlying assets (SceneData). Extensions permit the extension of the basic SceneMark data structure. One possible extension is the recording of relations between SceneMarks, as described in further detail below. For further descriptions, see also U.S. patent application Ser. No. 15/487,416, "Scene Marking," which is incorporated by reference herein.

SceneData (from multiple sensors) and corresponding SceneMarks may be organized and packaged into time-stamped packages, referred to as SceneShots which aggregate the relevant data for a scene. For example, the sensor data from cameras looking at the same environment, including processed versions of that data, and relevant metadata may be packaged into SceneShots. For further descriptions, see also U.S. patent application Ser. No. 15/469,380, "Scene-Based Sensor Networks," which is incorporated by reference herein.

Figure 2A:
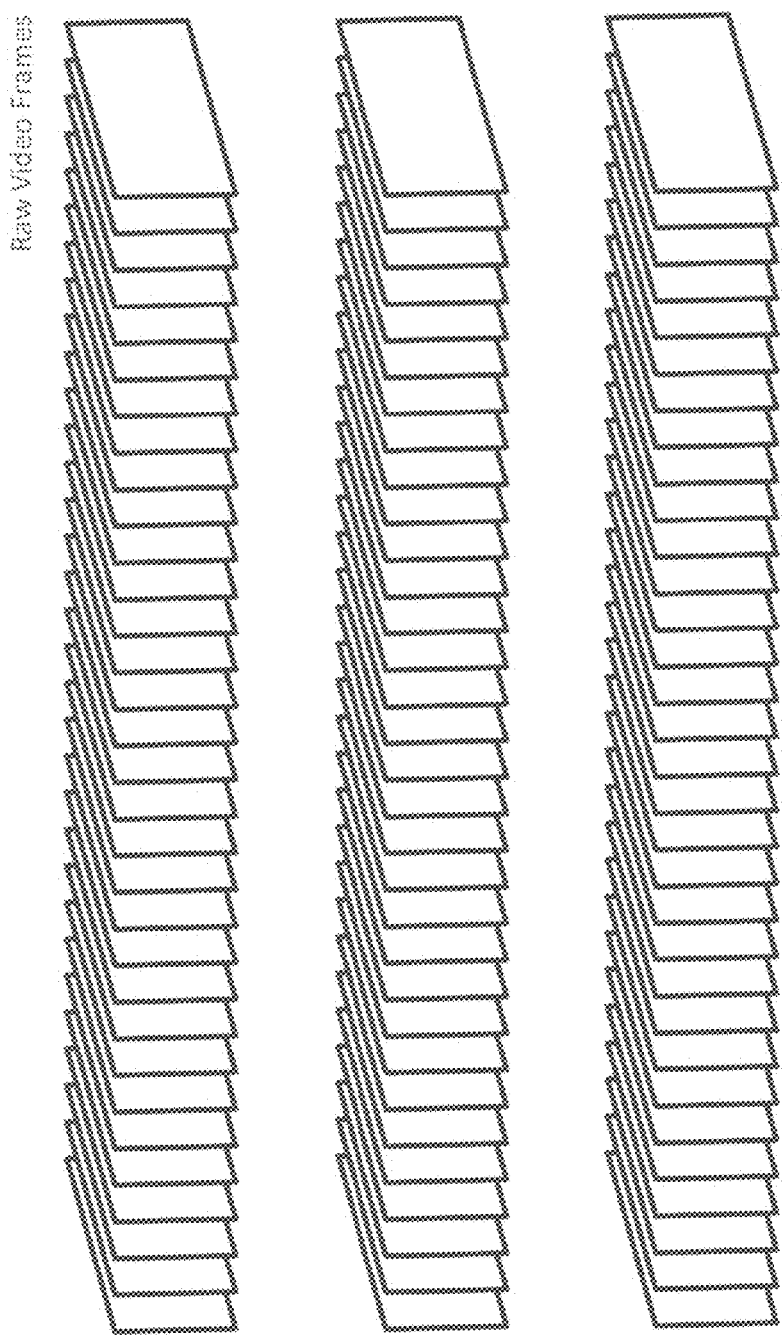
FIGS. 2A and 2B show smart workflow for processing video images.
Figure 2A:
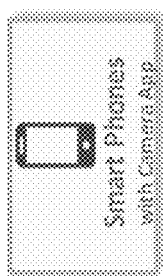
Figure 2A:
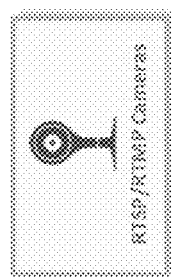
Figure 2A:
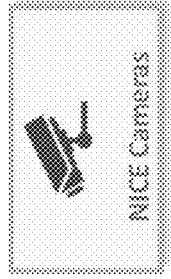
Figure 2B:
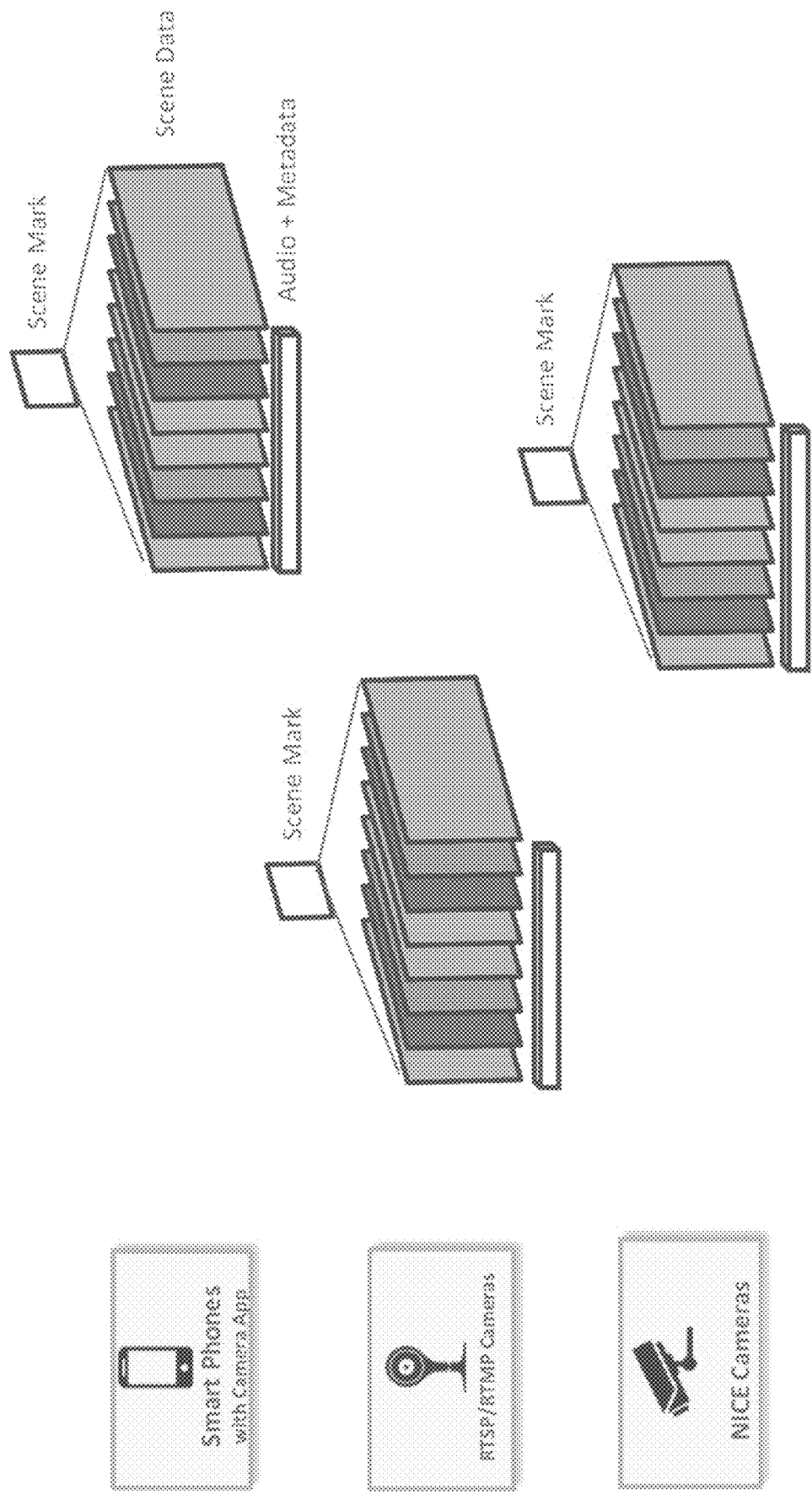

FIGS. 2A and 2B show smart workflow for processing video images. Image sensors that capture video generate a large amount of raw data. Some applications, like home security, may require multiple cameras. Home security can be monitored by different cameras, like doorbell cameras, wall-mounted cameras, or smartphones. Typically, these camera devices generate the raw video frames continuously, as shown in FIG. 2A. However, raw video streams from multiple cameras are difficult to index and search. Not all of this data is needed all of the time. Instead of generating the same unneeded data over and over, smarter workflow allows devices to use different ways to capture the scenes or capture what is going on in the scene, including capturing different types of data, for example different exposures.

So instead of capturing the same unnecessary data over and over 24×7, the workflow may focus on data when a certain event happens, as shown in FIG. 2B. The workflow enriches the data by having different types of capture, which will then be more useful, upon detection of an event such as detection of a human present. For example, if the system tries to detect somebody's face or recognize somebody's face but it is too dark or too bright, the workflow may use different exposures to capture the same scene. In FIG. 2B, the different color frames represent low exposure, mid exposure, high exposure and IR imaging. These are turned on when a relevant event is detected. Then there is a better chance to have a correct recognition or detection. Instead of continuously generating and detecting the same images over and over when nothing is happening, the workflow conditionally captures data. The system stores only important data, not all data. Important events may be marked by SceneMarks and SceneMarks may trigger different types of capture (and storage). SceneMarks can streamline video streams when there is significant event of interest, reducing bandwidth and storage requirement.

Figure 3:
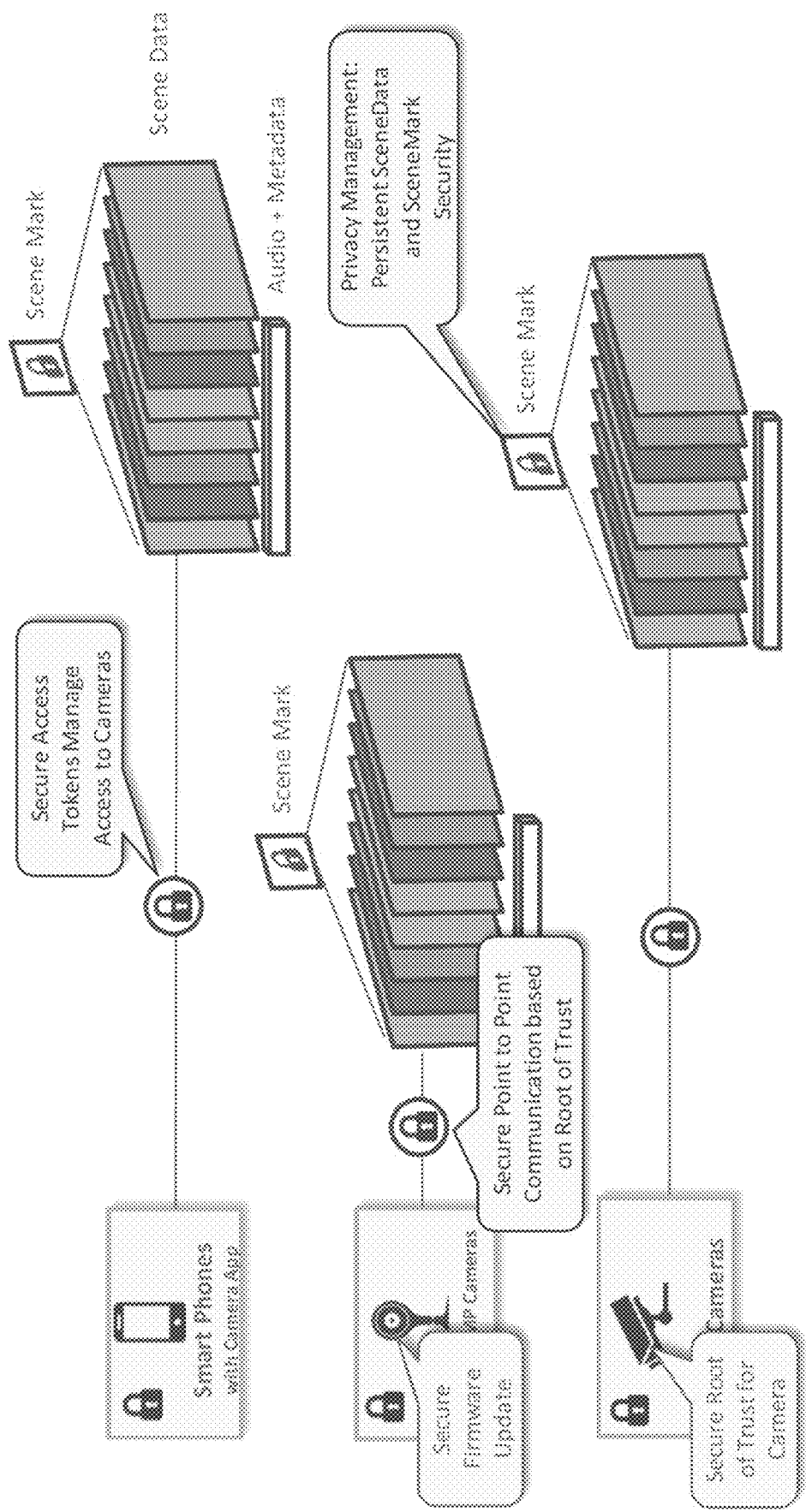
FIG. 3 shows security applied to workflow and data.

FIG. 3 shows security applied to workflow and data, as indicated by the lock symbols. Not all data is available for everybody. Security may be used to ensure that anybody who is trying to capture certain data can access the corresponding devices securely. And then on the secure access or under secure request of getting data, the system generates this data and makes sure this data is encrypted and that device security is not vulnerable to any hack, especially if the data includes personal data. So the system can implement security, privacy and conditional access (e.g., rights of applications to access certain data or components, such as data access for fee). See also U.S. patent application Ser. No. 15/642,311, "Security for Scene-Based Sensor Networks," which is incorporated by reference herein.

Figure 4:
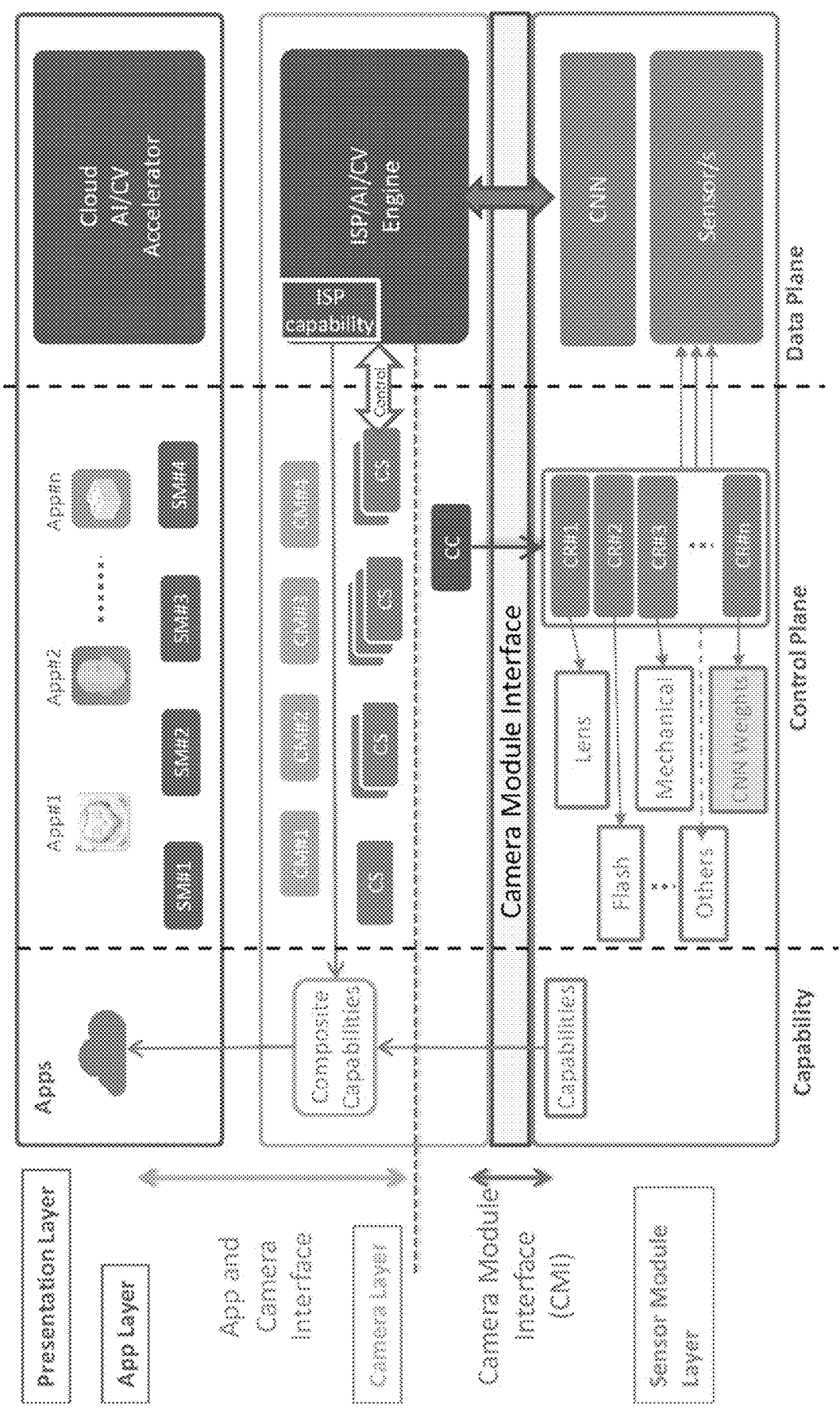
FIG. 4 shows a multi-layer technology stack.

FIG. 4 shows a multi-layer technology stack. From bottom to top, the stack includes a sensor layer (sensor module layer in FIG. 4), a device layer (camera layer in FIG. 4), a cloud layer that contains cloud processing capabilities (part of the app layer in FIG. 4), and an application layer (app layer and presentation layer in FIG. 4). In one approach, the different layers and interfaces between layers are defined by standards. The standard may define how image or other sensor data is captured from sensors and then passed on to the next layer, like a camera module or more processing intensive devices. This device may be a bridge device, which bridges to a sensor that is not standards-compliant, or it may be a processor inside the camera device or IoT device. Sensors are getting more intelligent and may also have some processing power. The encapsulating device also may have powerful processors and probably has some way to communicate to the cloud and application. With different layers and interfaces defined, a custom workflow may be implemented across the different layers from sensors to applications to present the desired contextual data to the end user.

Figure 5:
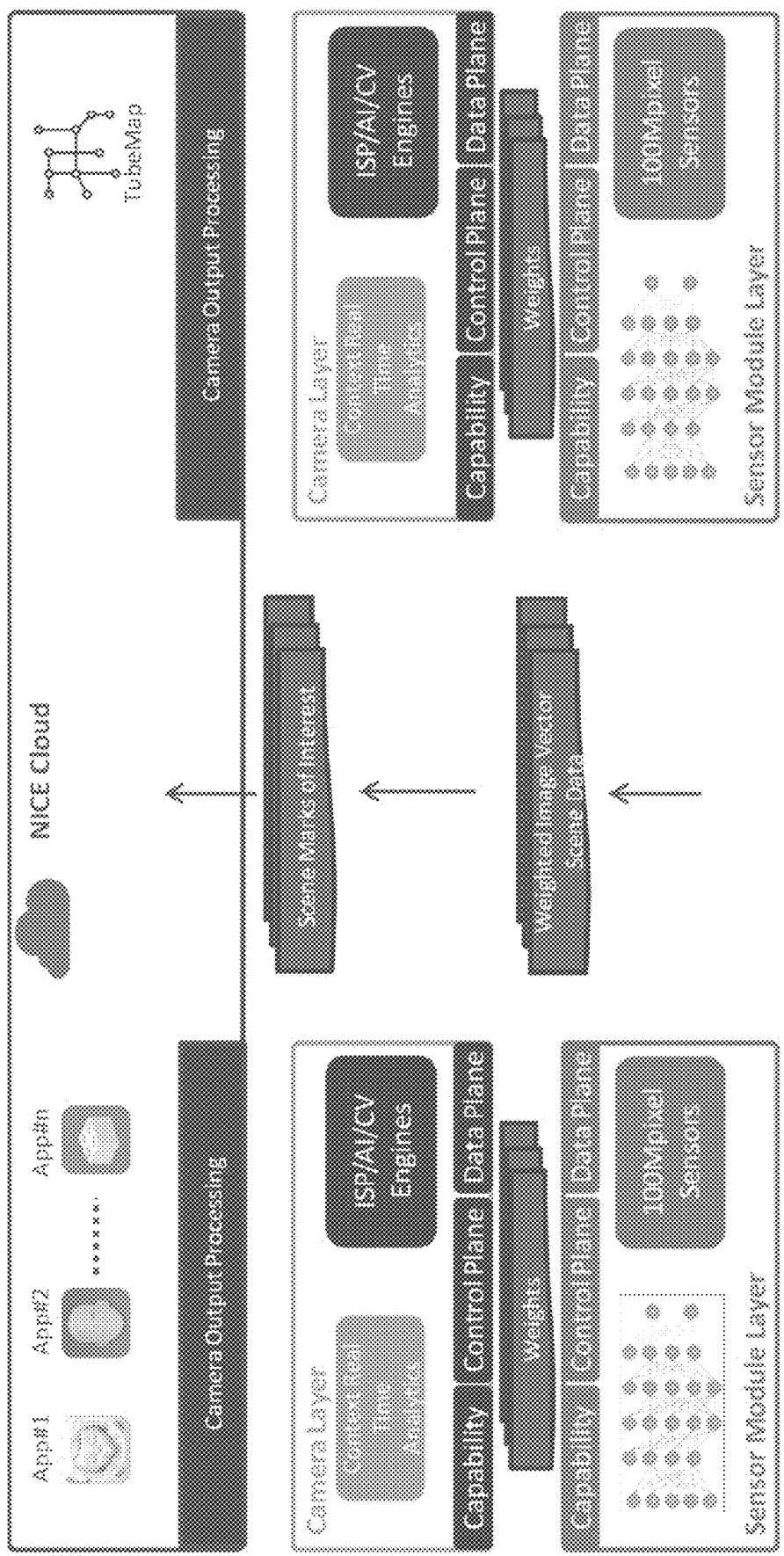
FIG. 5 is another representation of a multi-layer technology stack.

FIG. 5 is another way of showing this layering. There is a sensor module layer on the bottom of the stack, which in this example is a 100-Mpixel sensor. Then there is a camera layer or some other device layer. Then on top of that there is a cloud layer. The left side of FIG. 5 shows a vertical stack for one camera and the right side shows a vertical stack for another camera. Different sensor data can come from multiple cameras, but through this layered approach.

AI and machine learning, such as convolutional neural network (CNN), may be performed by components at any layer. At the sensor layer, the sensor captures images and processes them using CNN to reduce the amount of data passed to the device layer. At the device layer, the sequence of CNN processed images of interests may be processed, also using CNN or other types of AI or CV, generating SceneMarks of interest. At the cloud layer, the SceneMarks of interest from multiple cameras may be analyzed, also using AI, producing the final result desired.

As shown in FIG. 4, the multi-layer stack may also be divided into different planes: capability, control and data. Components on each of the layers have different capabilities to either capture sensor data and/or to process or analyze data. These capabilities may be containerized and referred to as nodes. For example, see U.S. patent application Ser. No. 16/355,705 "Configuring Data Pipelines with Image Understanding", which is incorporated by reference herein in its entirety. Sensor-level nodes may have capabilities to capture sensor data, and the camera or device-level nodes have processing capabilities. Cloud-layer nodes may have a wide variety of powerful capabilities.

The system communicates these capabilities among the different layers. The overall workflow may be deployed by selecting, configuring and linking different nodes at different layers based on their capabilities. A certain device or sensor may be able to capture images using different configurations. It may be able to capture different exposures, at different frame rates, in either color or black/white. Those are sensor capabilities. Knowing what capabilities are available helps the next higher layer to determine how to configure those sensors. The device layer may take those sensor layer capabilities and combine that with its own processing capabilities and then communicate those (composite capabilities in FIG. 4) up to the applications or services running on the cloud. This is the capability plane shown on the left of FIG. 4.

The application or cloud, knowing what kind of capabilities are available, can send control signals to implement the overall workflow. This is the control plane shown in the middle of FIG. 4. This control plane can require a lot of detail if the application is required to directly provide complete control data for every component beginning at the sensor layer all the way through the cloud layer. However, the layering virtualizes this control, so that each layer can deal with a limited number of other layers while abstracting away from the lower layers. For example, the application layer can deal with what kind of event to capture and provide corresponding control data to the device layer. The device layer translates that into control data for the sensor layer. In FIG. 4, the control data from app layer to device layer is packaged into SceneModes, labelled SM #1-4 in FIG. 4. The control data from device layer to sensor layer is packaged into CaptureModes and capture sequences, labelled CM #1-4 and CS in FIG. 4. CC is capture control and CR #N are capture registers in the sensor layer. For further descriptions, see U.S. patent application Ser. No. 15/469,380, "Scene-Based Sensor Networks," which is incorporated by reference herein in its entirety.

In this way, the application can specify the overall workflow by defining the relevant mode (e.g., SceneMode) in which it wants to capture data. Within that mode, the camera or other devices then define the corresponding modes (CaptureModes) for the sensors. For example, assume the task is to recognize a person's face. For this, the workflow may want to capture multiple shots of the face at different exposures and different angles. So the SceneMode may be face detection mode or object detection mode. That SceneMode is communicated to the camera device layer and the device layer then defines the relevant types of CaptureModes. The CaptureMode is translated to the sensor layer and then the sensor can determine the right types of data capture sequences. This is a benefit of having these virtualized layers and having control somewhat virtualized between layers.

These capabilities and controls are translated from top layer to bottom sensor layer. Data can be transferred in the reverse direction from sensor to device, and device to cloud. In doing that, the sensor generates the raw sensor data. The devices can then process that data with more powerful processors and with more AI and computer vision (CV) algorithms applied. It can select what is important, what is relevant, and then make this data more indexable or searchable and present that data to the cloud. The cloud can then use more powerful processing with access to more resources to further analyze the data. In this example, the sensor and device layers are "edge" components, and the cloud and app layers are away from the edge. For convenience, nodes that are not on the edge will be referred to as "cloud", even though they may not be actually "in the cloud."

Figure 6A:
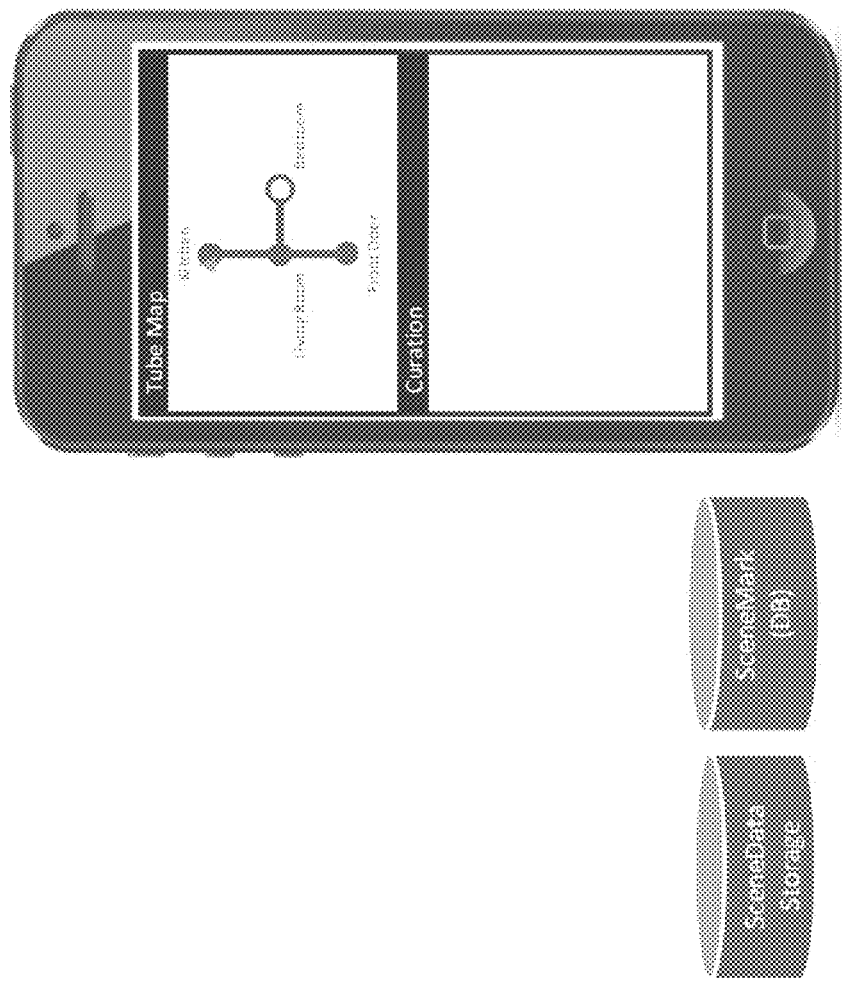
FIGS. 6A-6D show an example of a custom workflow using SceneMarks and SceneData.
Figure 6A:
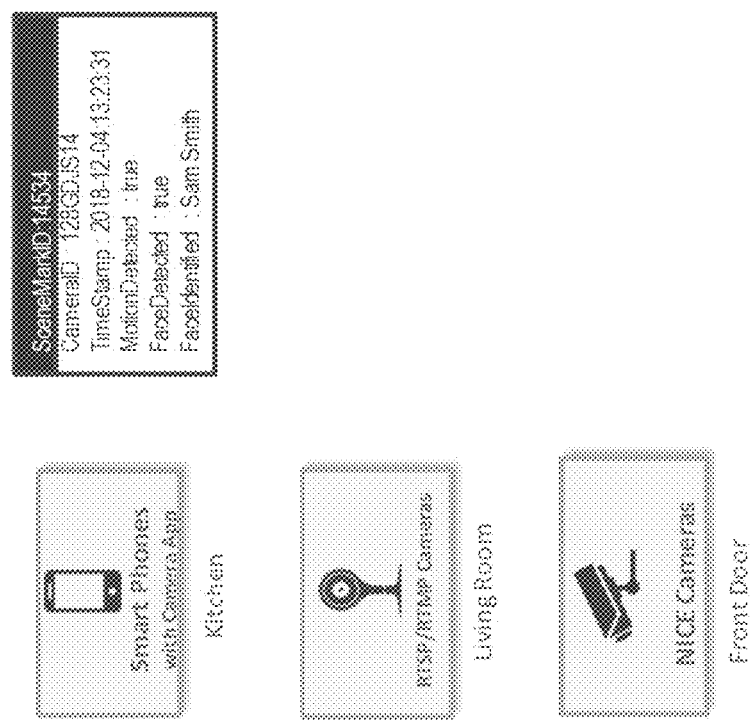
Figure 6B:
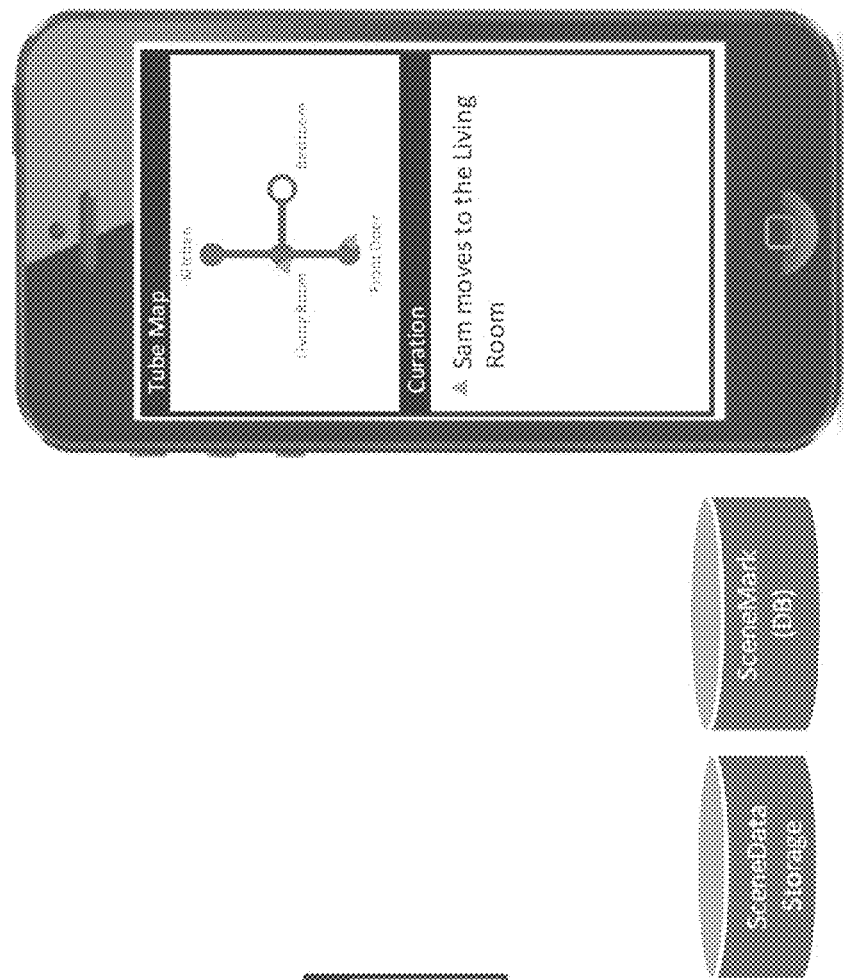
Figure 6B:
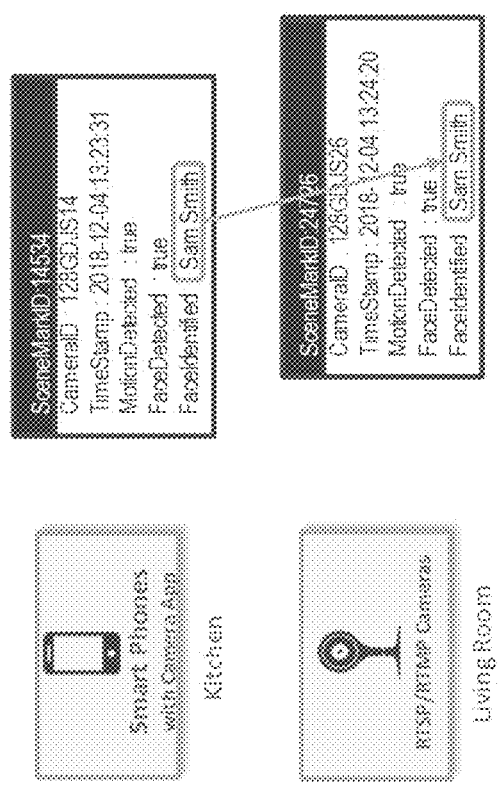

FIGS. 6A-6D show an example of a custom workflow using SceneMarks and SceneData. In this example, there is a camera in the kitchen and another camera in the living room and another camera at the front door of the house. The workflow has access to a Tube Map that shows the proximity of the different cameras to each other. In FIG. 6A, Sam Smith appears in the kitchen. The camera in the kitchen detects somebody, which is a trigger event that generates a SceneMark. The SceneMark includes the camera ID, timestamp, and contextual metadata of MotionDetected=true, FaceDetected=true, and FaceIdentified=Sam Smith. In FIG. 6B, the camera in the living room some time later detects the same person moving from the kitchen to the living room, which is consistent with the Tube Map. The appearance of Sam Smith in the living room also generates a SceneMark. The workflow for the application analyzes the data, including SceneMarks, and generates the notification "Sam moves to the Living Room." At the same time, Wendy Smith arrives at the front door and is detected by the front door camera. This also generates a SceneMark.

Figure 6C:
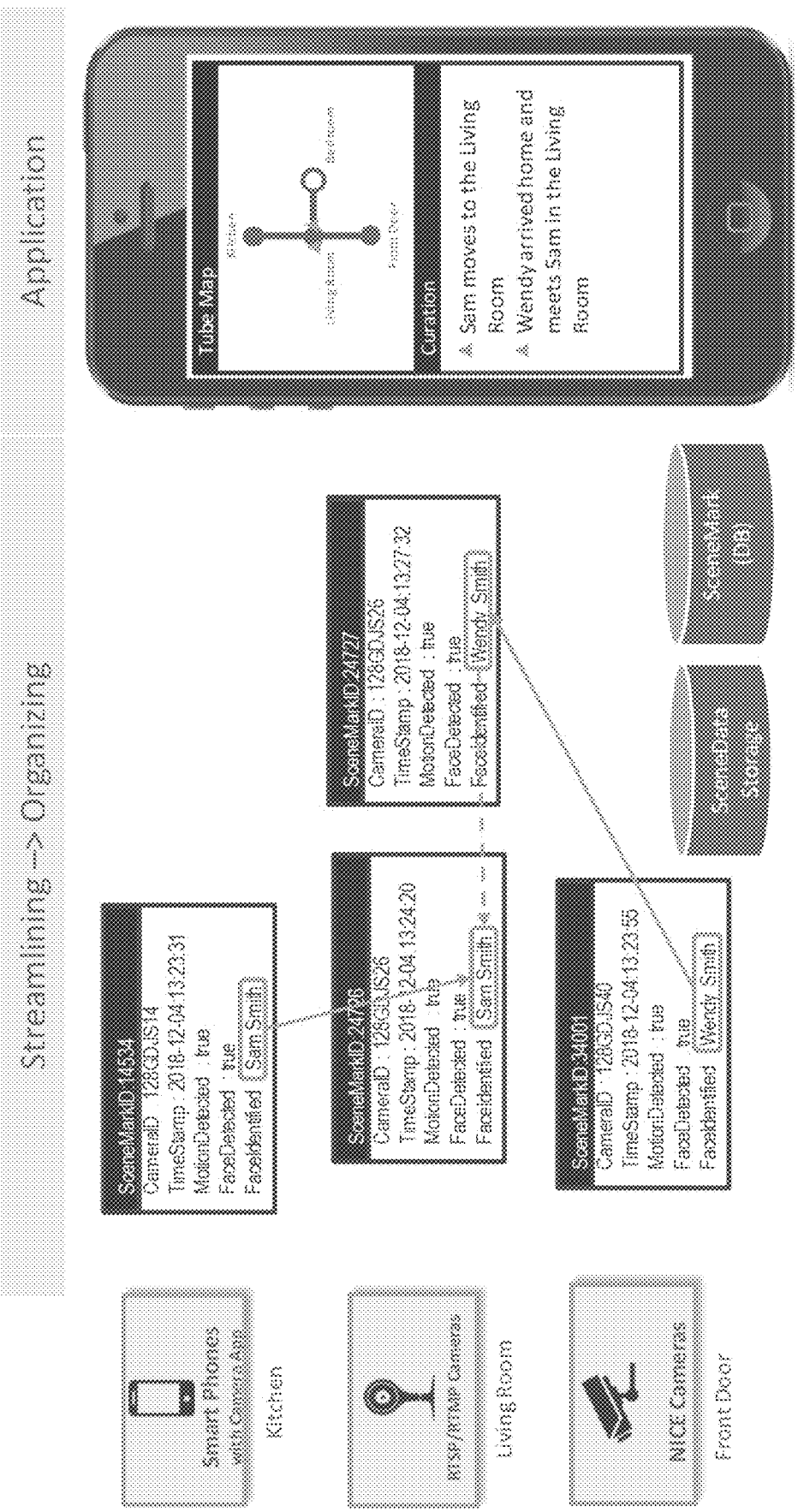

In FIG. 6C, Wendy moves to the living room. The living room camera detects Wendy's presence and generates the corresponding SceneMark. From the previous SceneMarks, the workflow knows that Sam is already in the living room. Therefore, Sam and Wendy meet in the living room and a notification is generated. Although not shown in FIG. 6C, this could generate a higher-level SceneMark for the meeting. That SceneMark is generated based on the analysis of the two SceneMarks for Sam in living room and Wendy in living room. Note that of all the data that is captured and analyzed, the workflow reduces this to two notifications. As far as the end user is concerned, he just gets a notification that Sam moved to the living room, and another notification when Wendy arrived and met Sam in the living room.

Figure 6D:
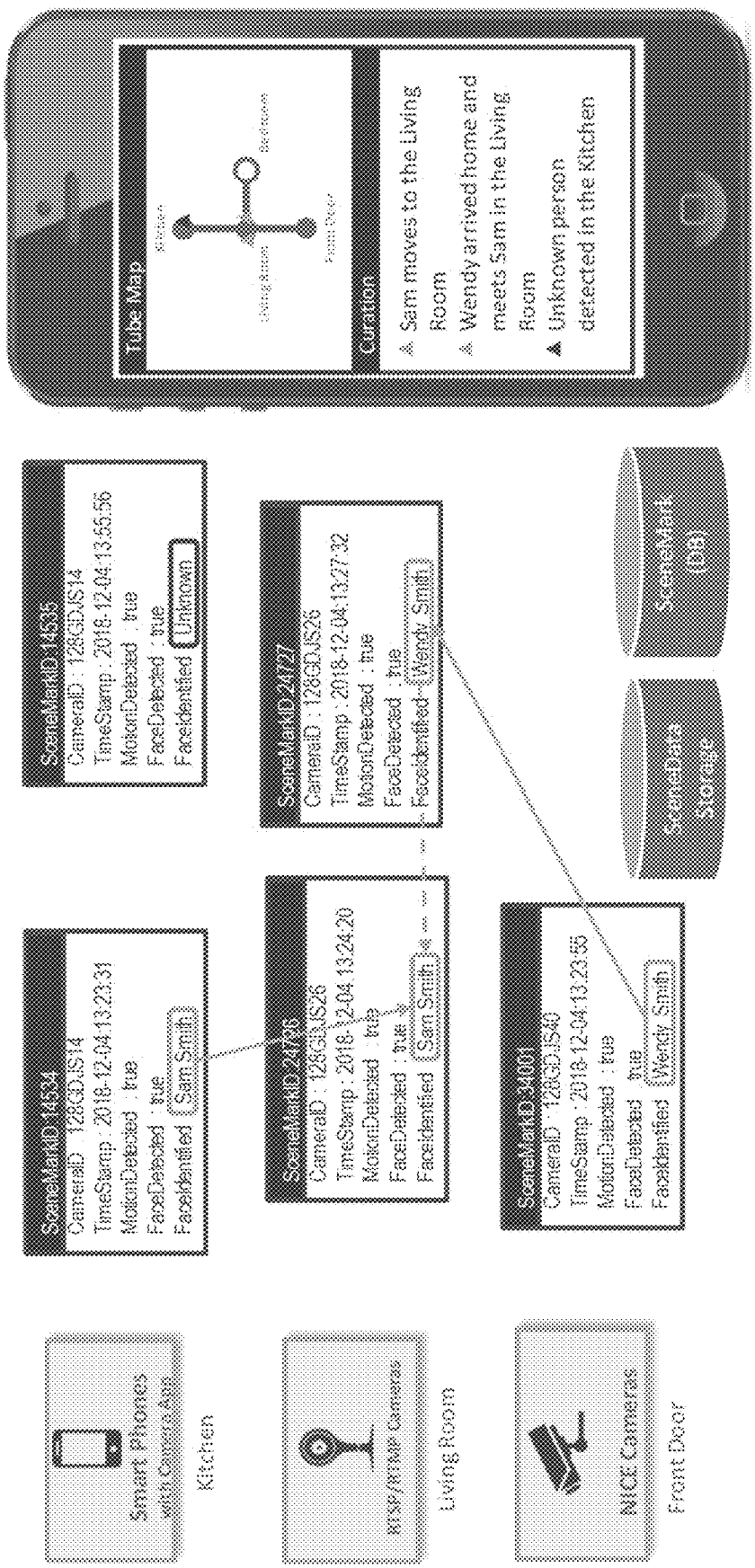

In FIG. 6D, an unknown person shows up in the kitchen, possibly an intruder because FaceIdentified=Unknown. The workflow analyzes the data and produces the notification "Unknown person detected in the Kitchen." By streamlining the events of interest and organizing analyzed information from multiple cameras, this reduces bandwidth/storage requirements and eliminates constant false alarm/notification caused by any motion.

The custom workflow for an application could be determined by the application itself. Alternatively, it could be determined by a separate service, which in the following example is referred to as the curation service or Scene Director. FIGS. 7A-7E show an example of Scene Director software used to deploy the custom workflow for an application. The left side of these figures shows three different cameras or devices. In the middle is the cloud, which may provide additional capabilities. The overall workflow filters sensor data by using some sort of AI or computer vision, for example to identify events. The workflow also sorts and filters data to reduce the total volume of data, for example by capturing contextual metadata in SceneMarks. The workflow may also organize these SceneMarks so they can be indexed and searched. They may also be stored in the cloud and published for others to use.

On the right side of the NICE cloud is a Scene Director, and then there are Apps and Services which may not be NICE-compliant. The Scene Director is a software service that determines and implements the custom workflow for the Apps. The role of the Scene Director may be analogized to that of a movie director. When you make a movie, there are many cameras shooting the same scene. The movie director decides which camera footage to use, how to splice it together, etc. Sometimes only one camera can capture the entire story. Sometimes multiple cameras are used to show the story. If somebody is throwing a ball in sports, the director may use one camera to show the passer, one to show the ball in flight, and a third camera to show the receiver. Those kinds of sequences of a scene can be made by multi-camera capture.

Figure 7A:
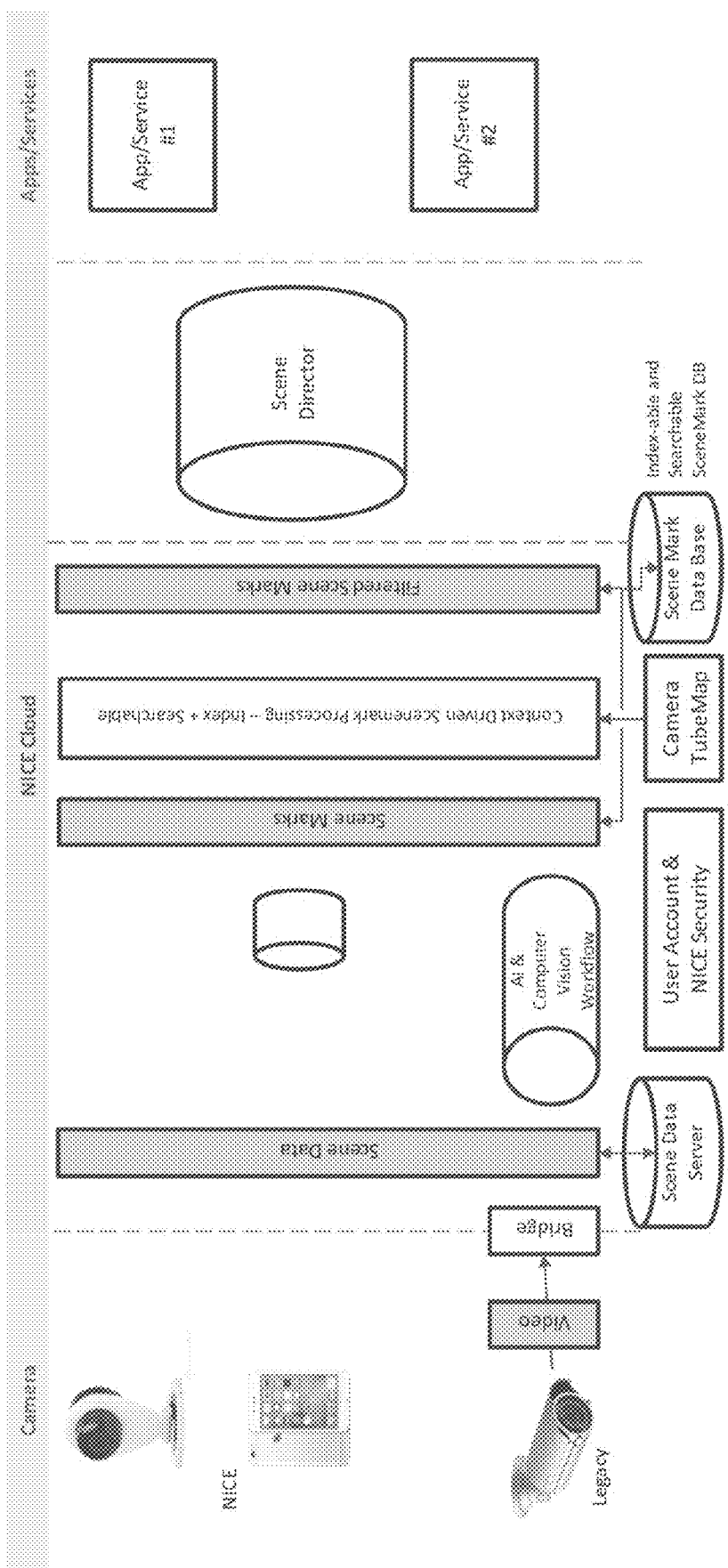
FIGS. 7A-7E show an example of a Scene Director software curating a custom workflow in a multi-layer technology stack.
Figure 7B:
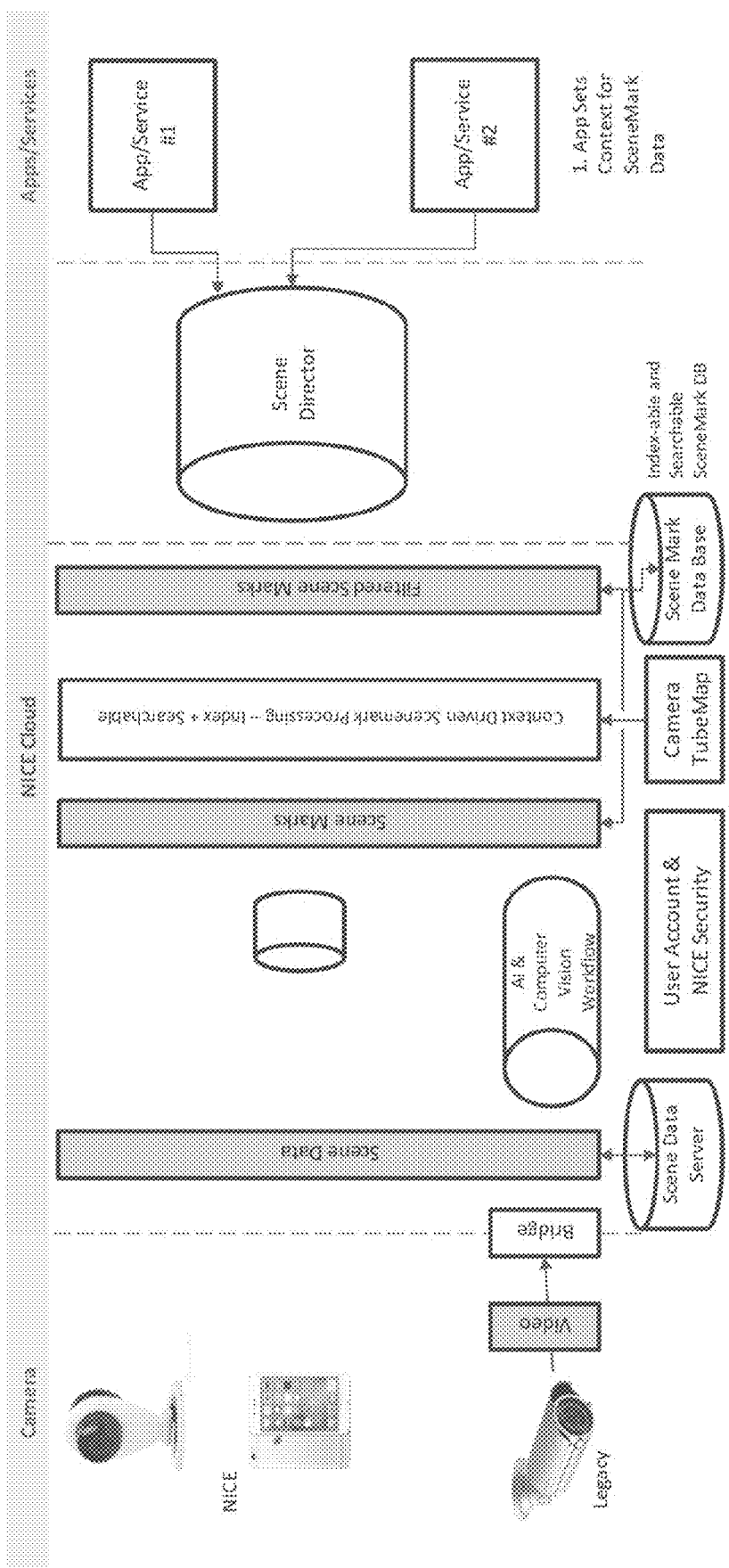

The Scene Director plays an analogous role here. In FIG. 7B, the App sets the requirements for its task: what is the App trying to do or what does it really care about? These requirements will determine what raw sensor data is captured and what processing and analysis will be performed to develop a custom set of data packages that is useful to the App. This typically will include sensor data and contextual metadata. The Scene Director software receives these requirements and, like a movie director, determines which components in the stack to use, how to configure those components and how to link those components into a custom workflow.

Figure 7C:
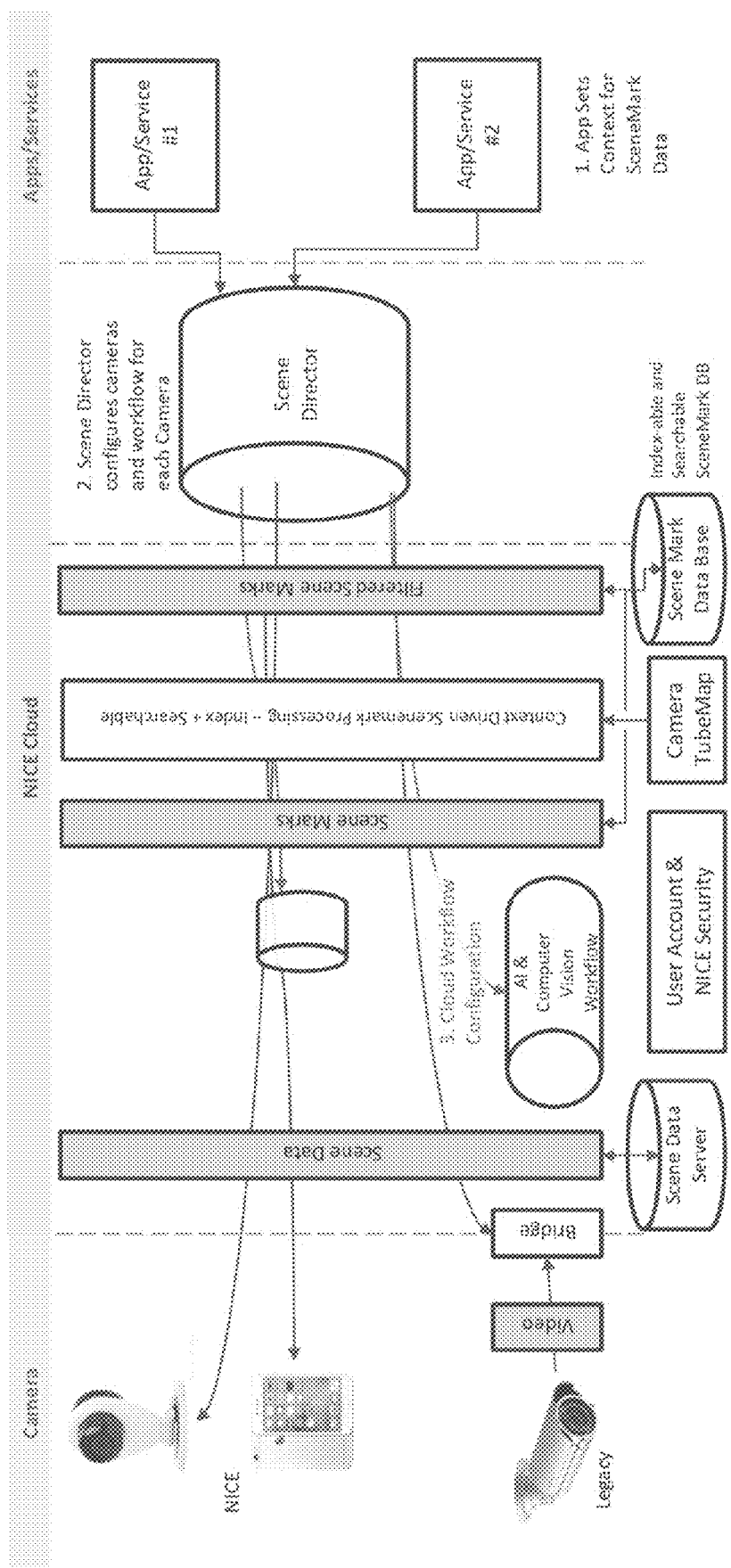
Figure 7D:
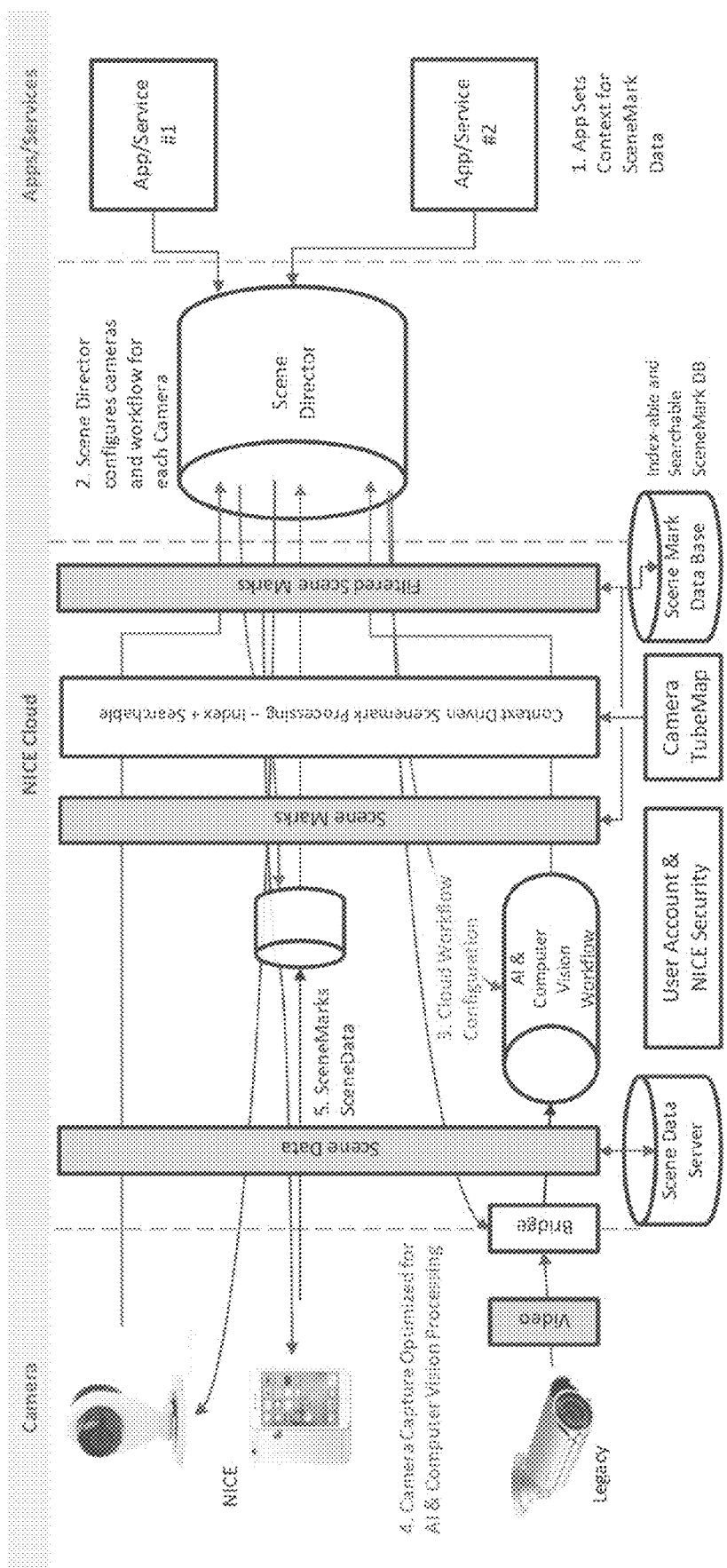
Figure 7E:
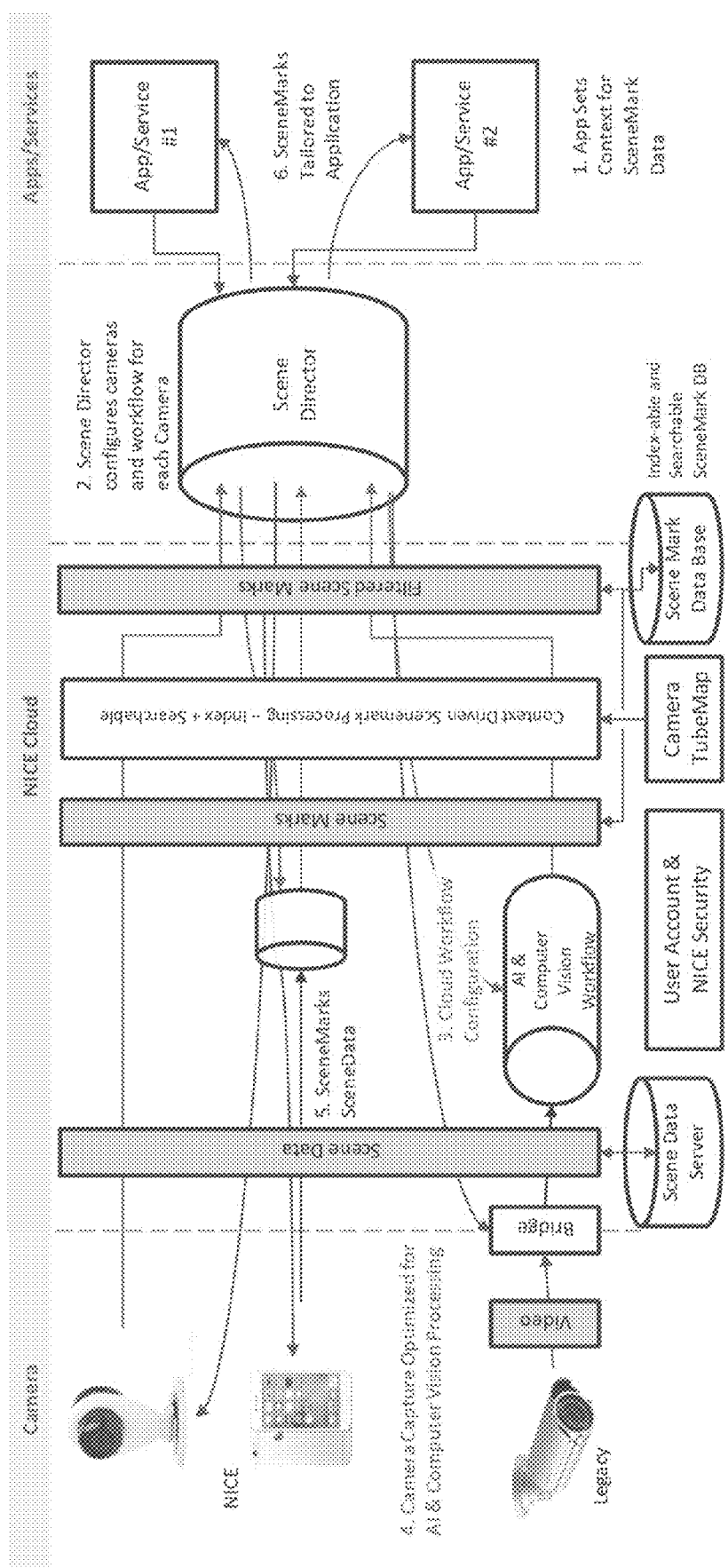

The Scene Director then implements the workflow by sending control data to the different components in the stack, as shown in FIG. 7C. It may do this directly to every component, or indirectly through the use of abstracted layers as described previously. The control data will generally be referred to as workflow control packages. The sensors capture the relevant raw data, and other components in the stack perform processing and/or analysis to generate SceneData and SceneMarks, as shown in FIG. 7D. The Scene Director may summarize or filter the SceneMarks or other data sent back to the Apps, as shown in FIG. 7E.

In FIG. 7, the flow starts from the right side. Control and configuration data, such as CurationModes, SceneModes and CaptureModes, flow from right to left. CurationModes are set by the requirements and semantics of the Apps. The Scene Director configures cameras and workflow for each camera by choosing SceneModes according to the CurationMode from the Apps. At the device level, depending on a camera's capabilities, the SceneModes of the cameras are set via the NICE API to generate SceneMarks of interest. Cameras control the sensor modules with CaptureModes to acquire the right video images and then apply certain analytics processing to generate SceneData and lower level SceneMarks.

The sensors capture sensor data according to the control data. This is passed through the stack back to the Apps. The SceneData is filtered and organized and presented back to the Scene Director and Scene Director curates the relevant SceneMarks to create the final "story" to present to the Apps on the right side.

Figure 8:
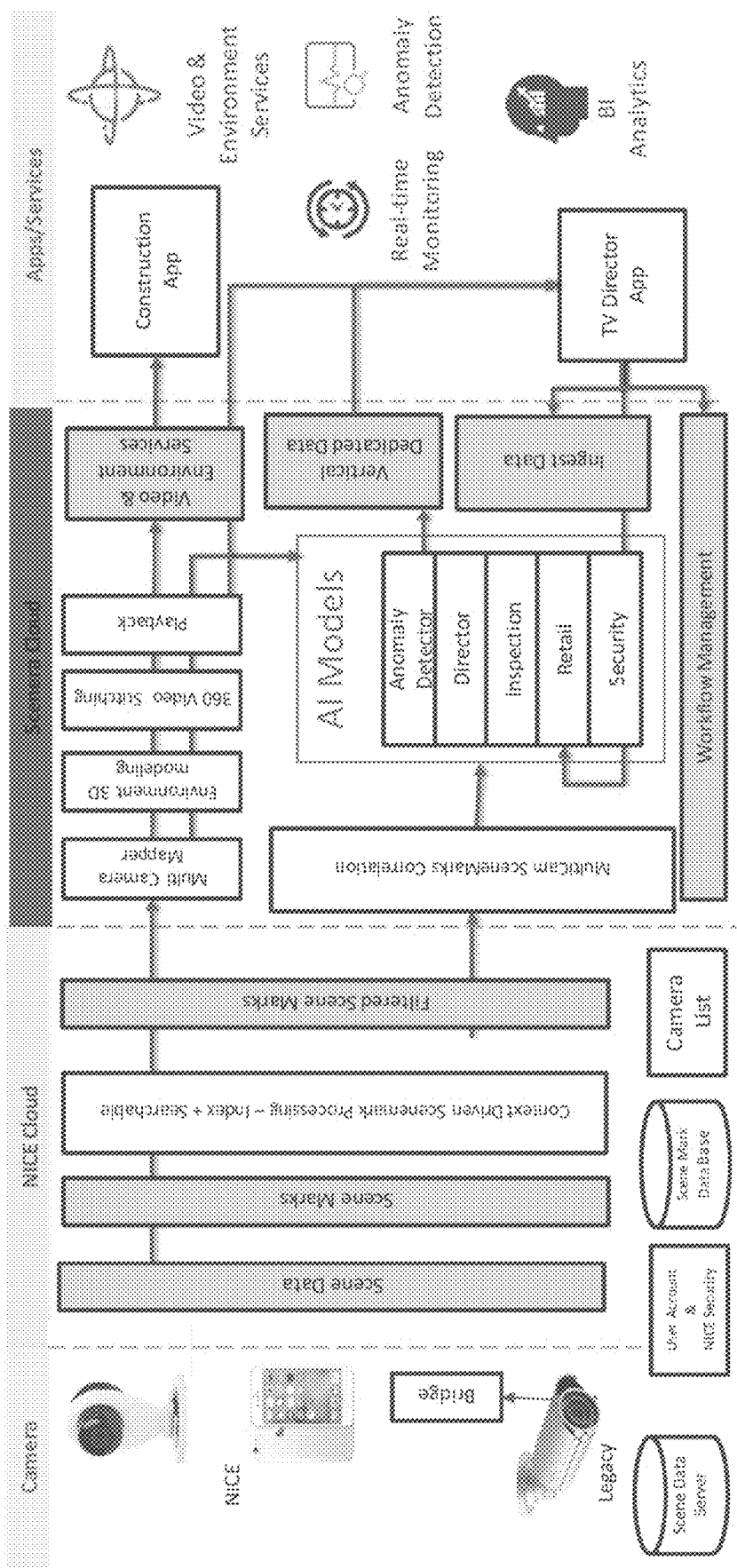
FIG. 8 shows more details of the Scene Director software.

FIG. 8 shows more details of the Scene Director software. In this figure, the Scene Director is labelled as the Scenera Cloud, to distinguish it from other cloud services. The components shown in the Scenera Cloud are regular components available in the stack, which are used by the Scene Director. When data is coming in from the NICE cloud originating from the cameras, the Scene Director calls on components in the stack to map this data. Some of the data may be run through AI, different AI models, for example to detect or analyze certain events. A summary of events is then presented to the applications.

The Scene Director or other software may be used on top of the NICE basic service to provide increased value add. One class of services is multi-camera and SceneMarks data analytics services such as:

Multi-camera and SceneMarks interpretation to create environmental aware capabilities
Temporal and spatial features
Multi-camera curation
Market-specific AI models for NICE cameras
Market-specific SceneMarks interpretation
Data analytics combining SceneMarks and customer's input data Another class of services is video and environment services, such as:

Physical relation scheme between cameras
Physical model of the environment
Stitched video from multi-cameras into a bigger picture
Video storage, playback and search.

FIGS. 9-13 describe sequential capturing of related events and images based on SceneMarks. This describes how workflow can capture and generate related SceneMarks from different cameras depending on what happens and what events are triggered. For example, if a person is entering a building, a camera outside the building will capture images that trigger an event of somebody entering the building. Then the workflow expects that other cameras in that vicinity will soon capture related events. This is the ability to sequentially capture related events based on the generation of earlier SceneMarks. This is used to build the workflow for curating content. In other words, one camera generates a SceneMarks and communicates the SceneMark to other nearby cameras. This can help build curated content from multiple cameras.

Figure 9A:
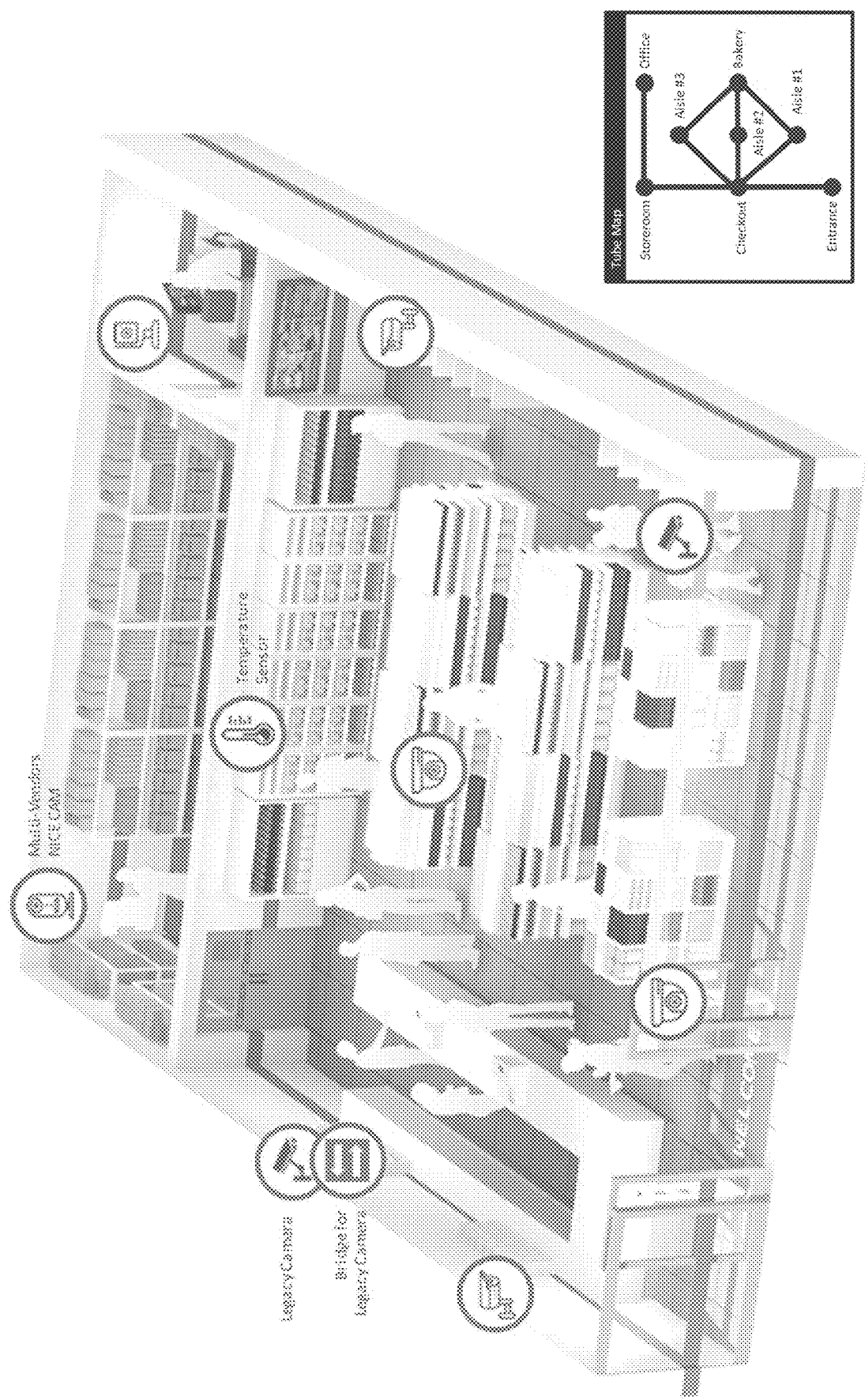
FIGS. 9A-9D show an example of sequential capture of related images based on SceneMarks.
Figure 9B:
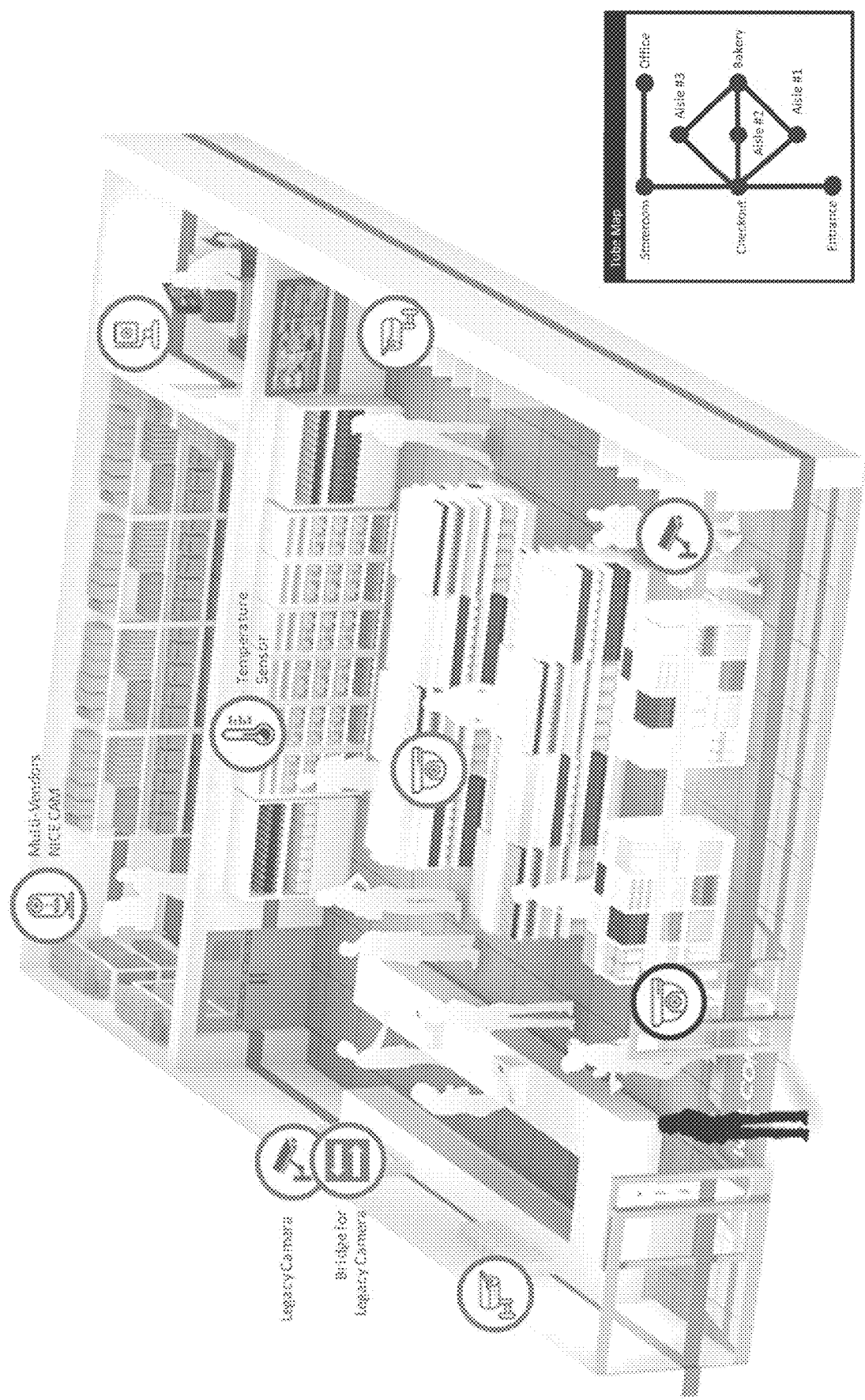
Figure 9C:
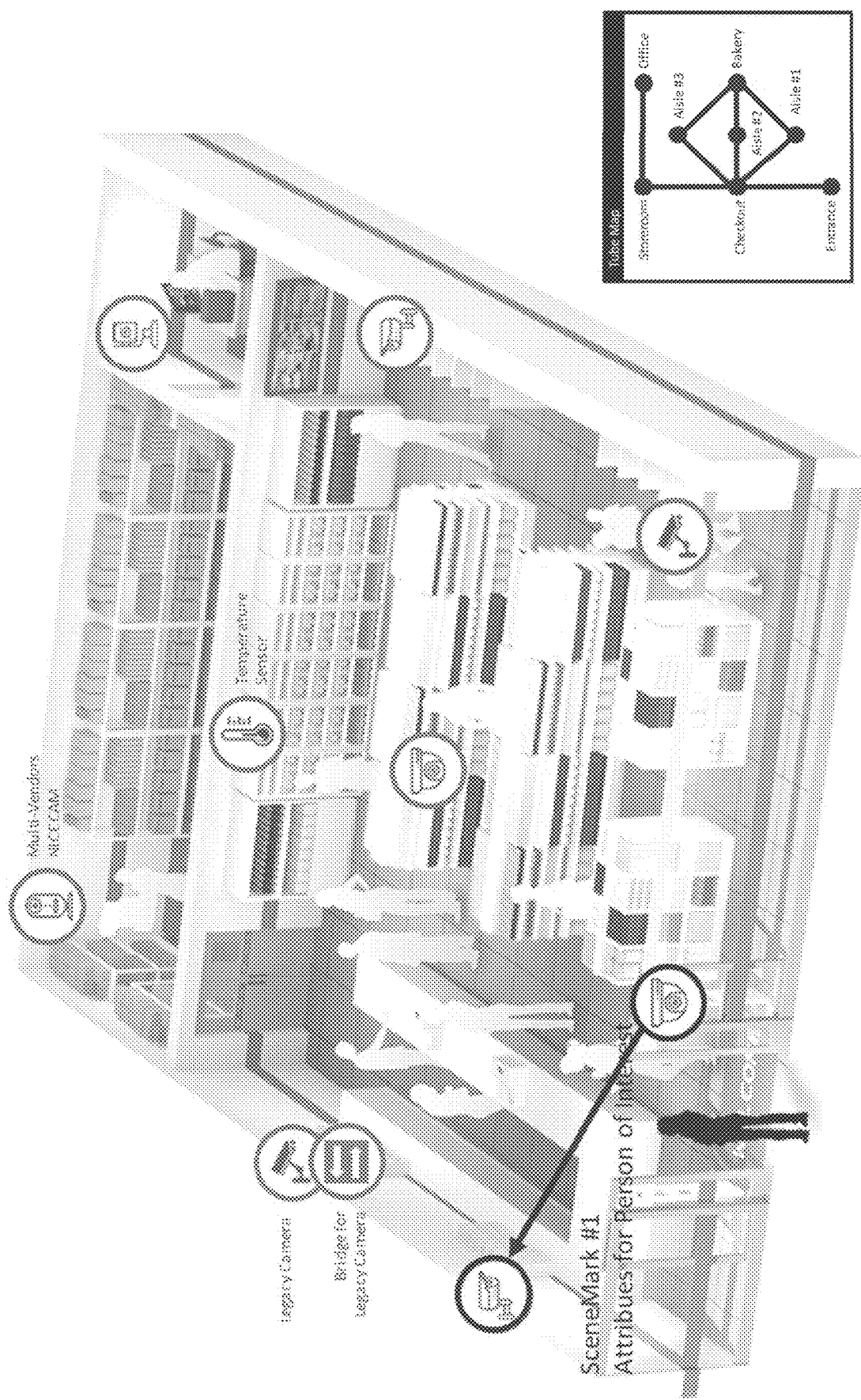
Figure 9D:
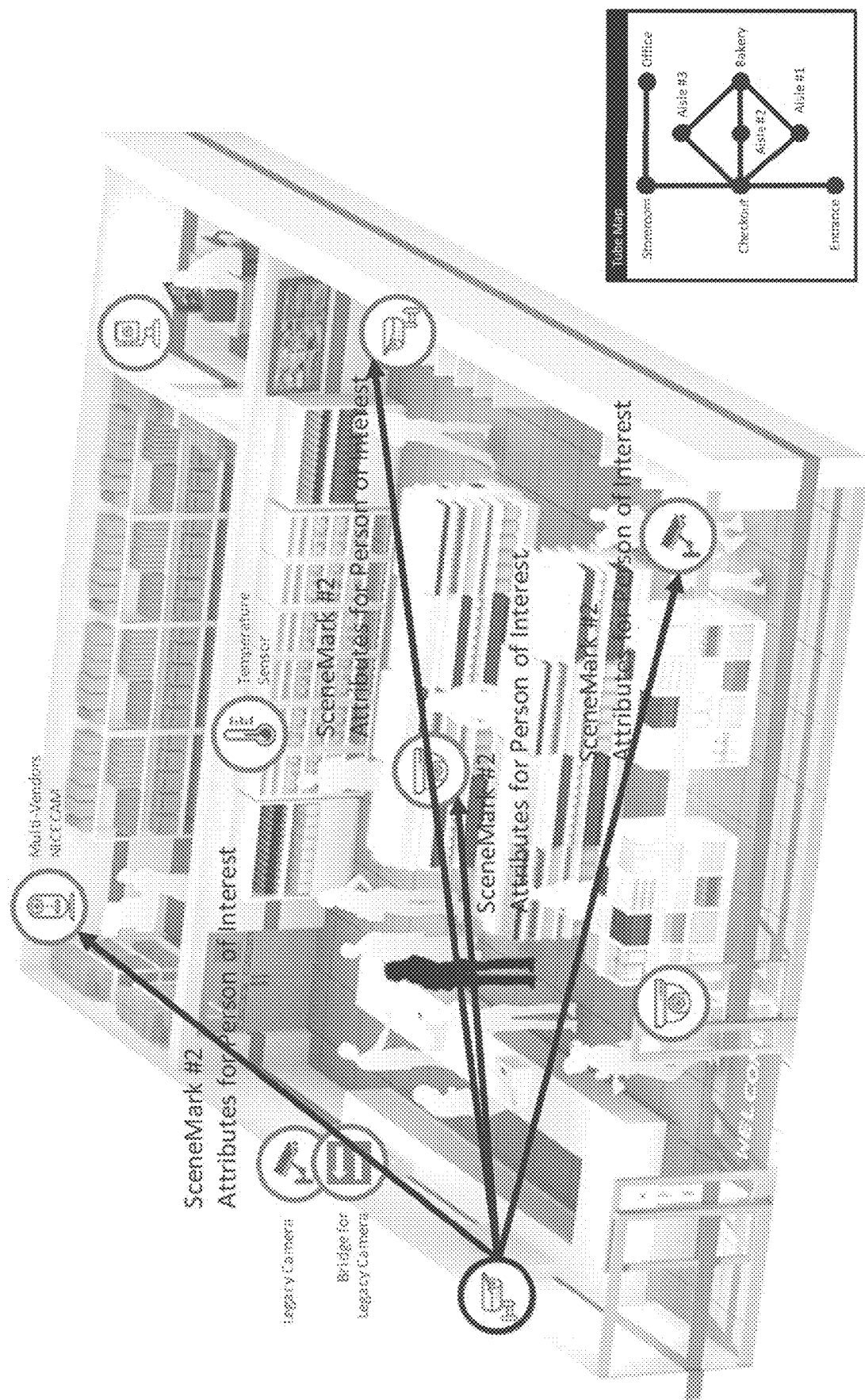

FIGS. 9A-9D show an example of sequential capture of related images based on SceneMarks. As shown in FIG. 9A, a retail store has an entrance and many aisles. Most customers come in through the entrance and browse through the store looking for certain products. Maybe they will go to the bakery section, and then they go to the refrigerator section and then they come to the checkout section to pay. The retail store is monitored by different cameras and sensors, and there is a Tube Map that shows the relative camera locations. When a person enters (FIG. 9B), the entrance camera detects that and a SceneMark is generated. This SceneMark is used to notify other cameras in the vicinity, according to the Tube Map. FIG. 9C shows notification of a checkout camera when a SceneMark is generated by the exterior entrance camera, because that is the only possible path for the person. FIG. 9D shows notification of multiple possible next cameras, for the SceneMark generated by the checkout camera. Upon receiving the SceneMark, the cameras that receive the forwarded SceneMark may capture SceneData relevant to the particular event. This is helpful because other cameras are now expecting this person and can tailor their data capture and processing. For example, if the person is already identified, it is easier for the next camera to confirm it is the same person than to identify the person from scratch.

Figure 10:
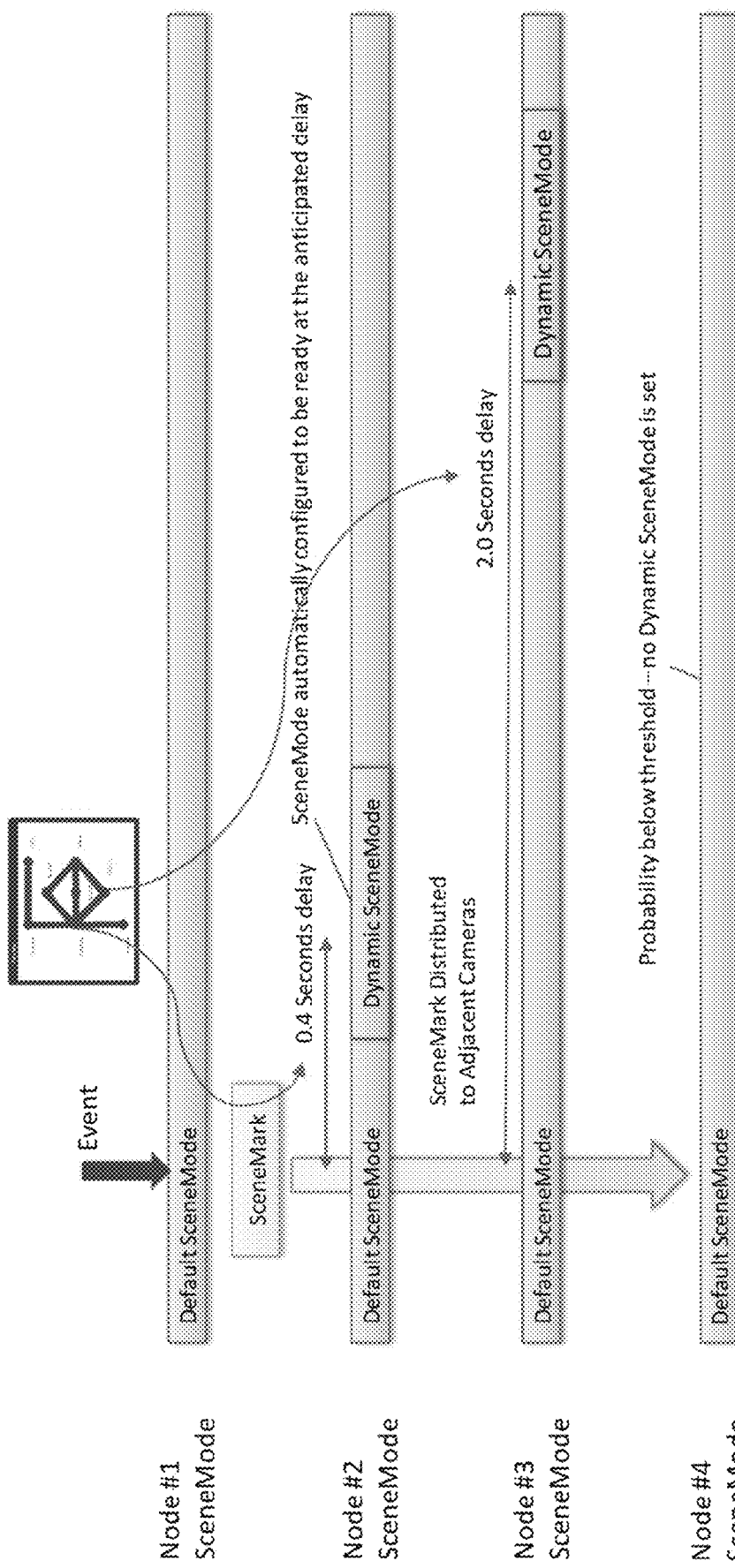
FIG. 10 shows an example of dynamic SceneModes triggered by SceneMarks.

FIG. 10 shows configuration of cameras triggered by SceneMarks. In this figure, the cameras are referred to as nodes and, in general, this approach may be used with any components (nodes) in the workflow, not just cameras. The Tube Map is used as a mechanism whereby, when one node detects an event or trigger, the workflow uses the Tube Map to determine nearby nodes and schedules different SceneModes or capture sequence configurations for the nearby nodes. The SceneMark triggers the receiving nodes to be optimally configured to capture the person or object of interest. Appropriate AI models may be loaded onto the receiving nodes. The Tube Map can also provide the expected probability of a person appearing in one camera and then appearing in another camera, and the expected delay to go from one camera to the next. This allows the workflow to anticipate the person appearing and to set up the correct SceneMode for that window of time. In FIG. 10, an event occurs, which is the red arrow. This generates a SceneMark, which is used to notify other cameras, which can then switch from a default SceneMode to a more appropriate SceneMode during the expected window of arrival. In FIG. 10, node #2 (e.g., the closest nearby camera) switches to the alternate SceneMode after 0.4 second delay, node #3 switches after 2.0 second delay, and node #4 does not switch at all because the probability is too low. This business logic may reside in the nodes themselves, consistent with the layering approach.

Figure 11A:
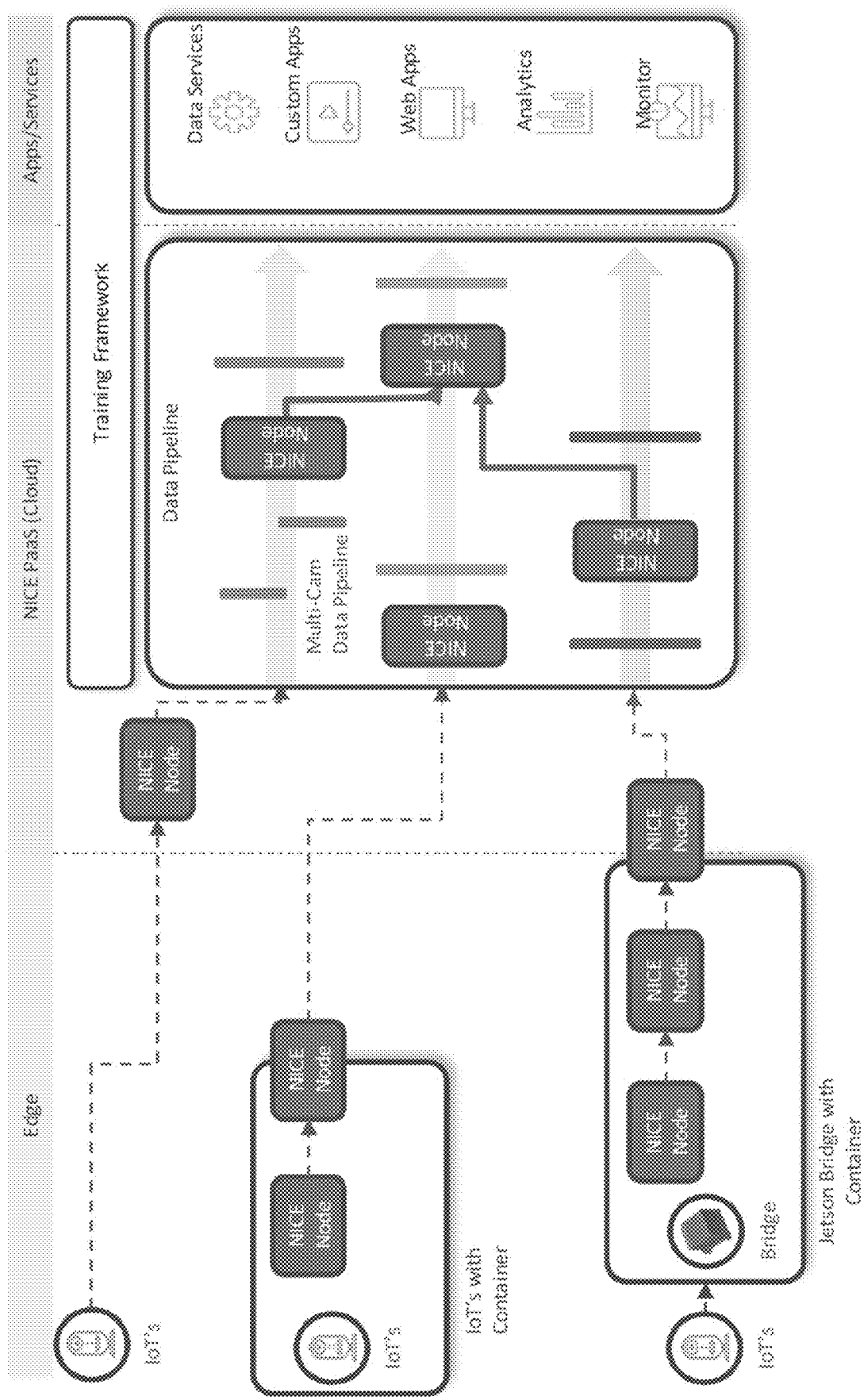
FIGS. 11A-11C show a sequence for structuring SceneMarks.
Figure 11B:
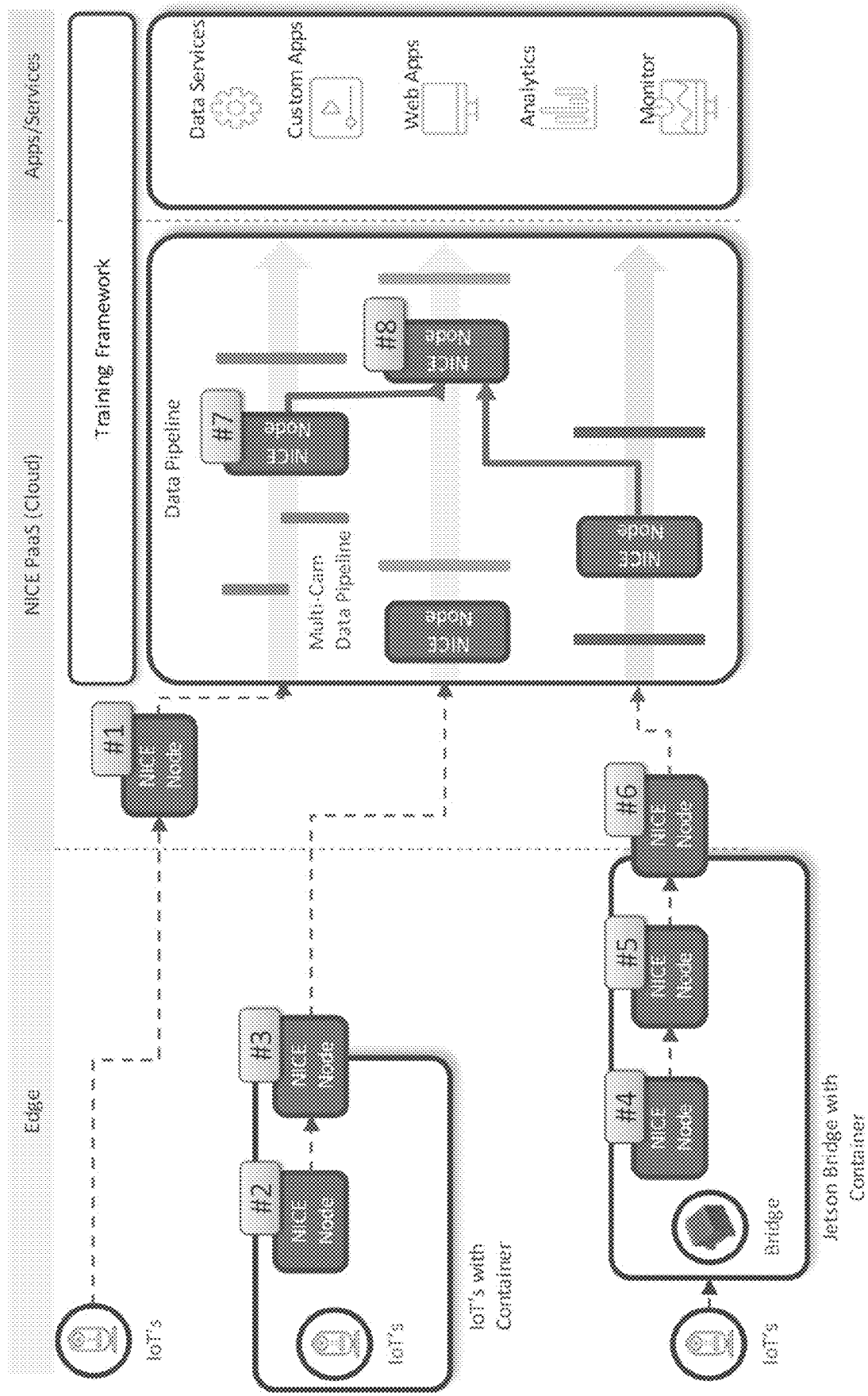
Figure 11C:
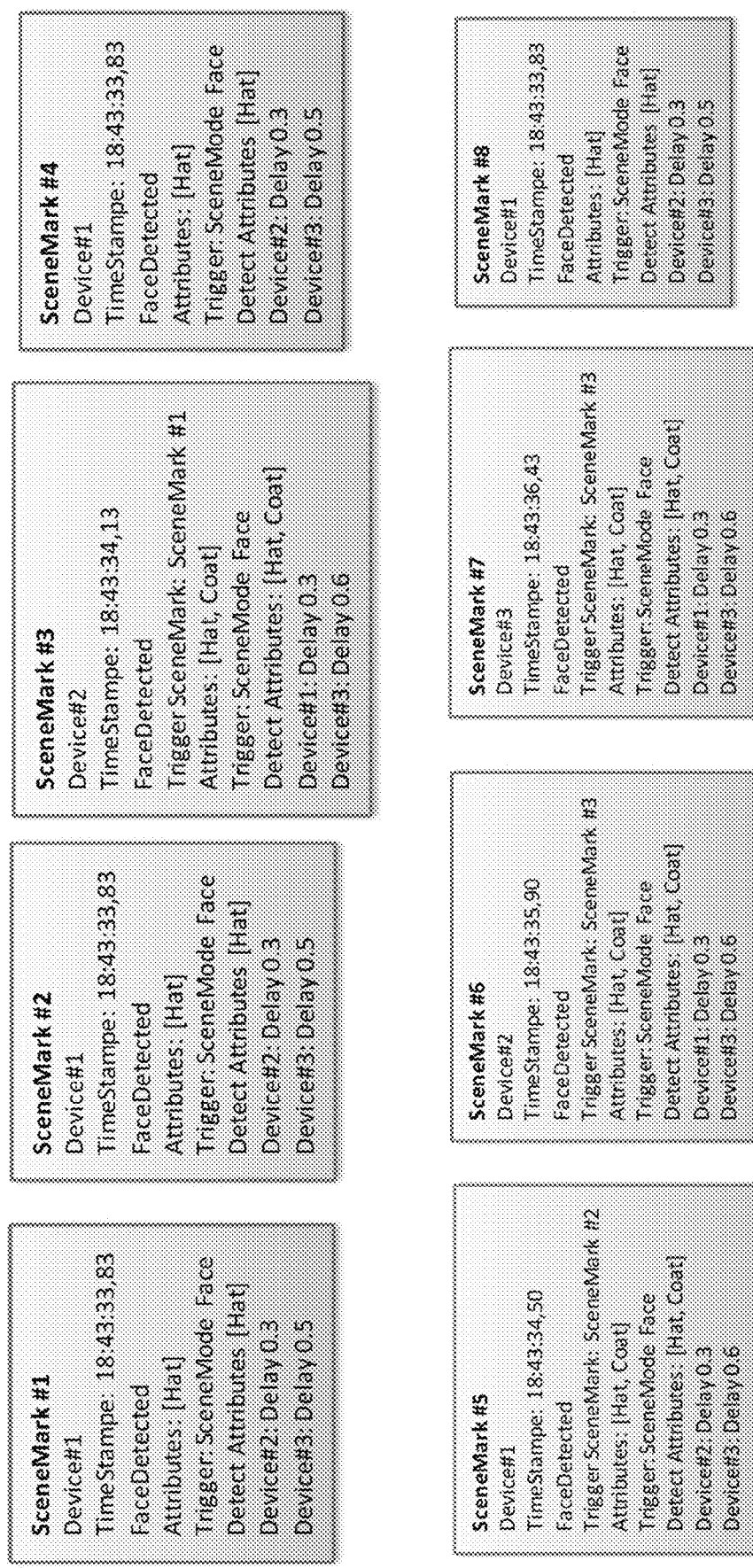

FIGS. 11A-11C shows a sequence for structuring SceneMarks from multiple cameras. FIG. 11A shows a multi-layer technology stack with multiple nodes in blue. FIG. 11B shows events #1-8 detected by nodes in the stack. Each event generates a SceneMark, as shown in FIG. 11C. Some SceneMarks trigger other nodes to capture SceneMarks. These SceneMarks serve as notifications to other nodes to set up their dynamic SceneModes, and those SceneModes generate their own SceneMarks. For example, SceneMark #3 is triggered by SceneMark #1, as indicated by the Trigger SceneMark field. This creates a summary of events in the form of a linked list of SceneMarks which are generated by some initial trigger plus the subsequently generated SceneMarks.

Figure 12:
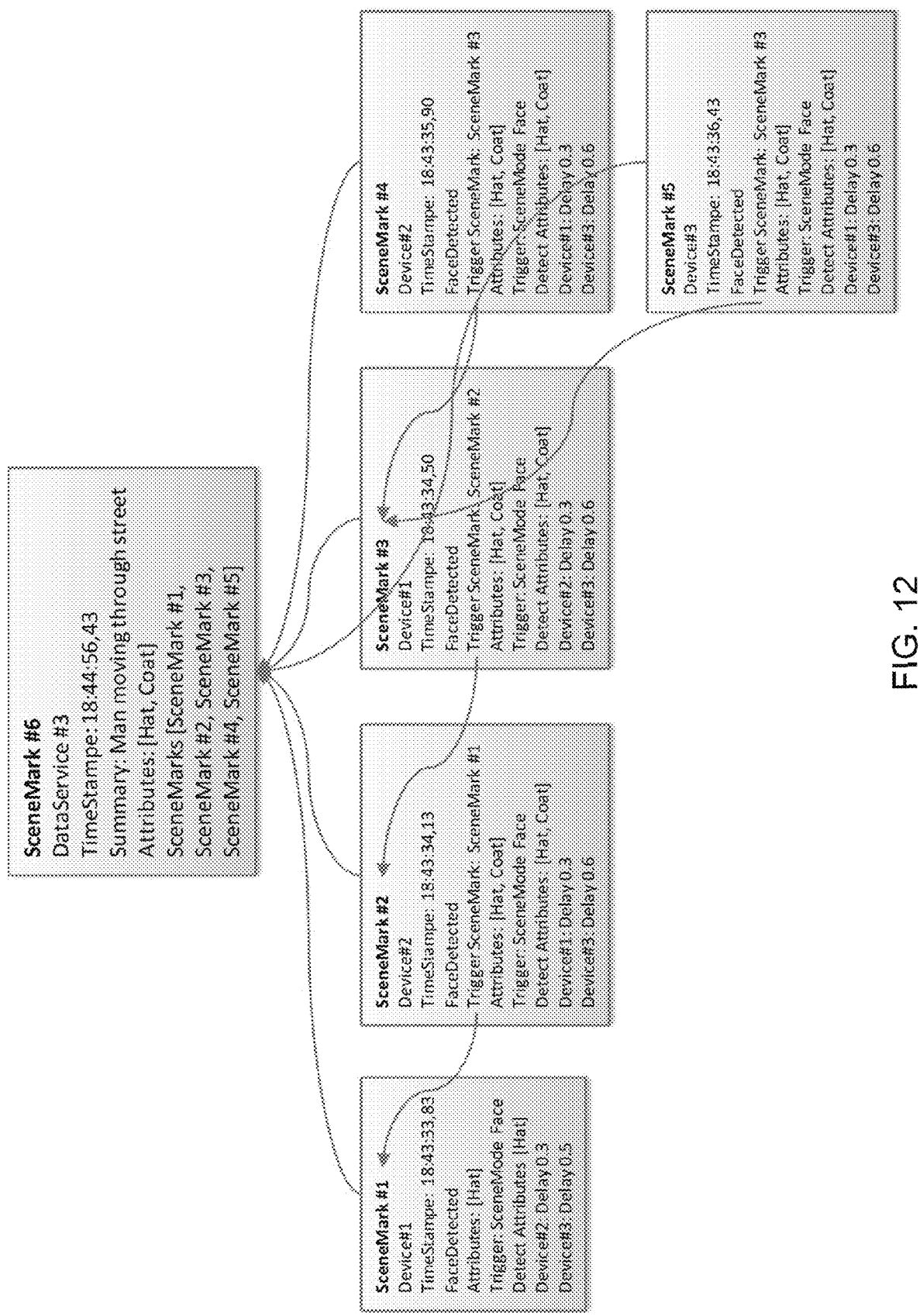
FIG. 12 shows an event summarized by structured SceneMarks.

These linked lists of SceneMarks may be analyzed and summarized. They can provide a summary of events, as shown in FIG. 12. They may generate a summary of SceneMarks associated with the event and may also have a description of the event that occurred. In FIG. 12, SceneMark #6 is created by a higher-level node. It analyzes SceneMarks #1-5, which were generated by lower level nodes. SceneMark #6 lists the underlying SceneMarks #1-5 but also summarizes them. It is a higher order SceneMark.

The generation of SceneMarks are typically triggered by an analysis sequence. It could be an analysis SceneData (sensor data), such as detecting motion or detecting a person. It could also be an analysis of other SceneMarks (metadata), such as detecting a sequence of four or five SceneMarks with a particular timing between them and between different nodes with certain events in the SceneMarks, that could then become a trigger for a higher level SceneMark. Certain recognized patterns of lower level SceneMarks can trigger the generation of higher level SceneMarks.

Figure 13:
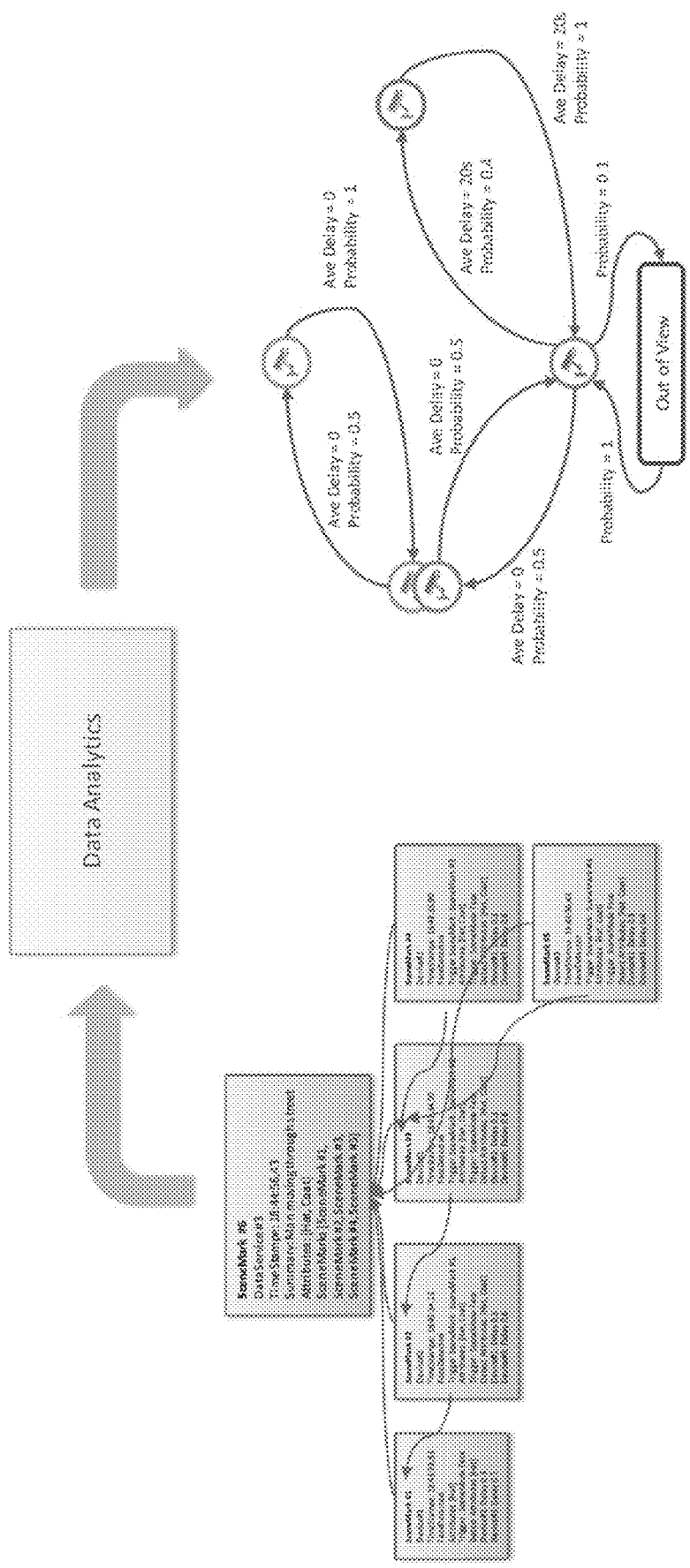
FIG. 13 shows analysis of SceneMarks to determine relationship of cameras.

As shown in FIG. 13, SceneMarks that are accumulated over time may be used to update other parts of the workflow. In this example, chains of SceneMarks are fed into an analytics engine. SceneMarks intrinsically have information about the spatial and time relationship between nodes, including cameras. Data analytics analyzes the SceneMarks to derive the relationships between nodes, such as the probability that an object appearing in one camera will then appear in a neighboring camera or the delay from one appearance to the next. This builds the overall understanding of the relationships among different sensors. The data analytics could include machine learning. SceneMarks accumulated over time could be used as a training set for machine learning. The machine learning can then be used to estimate probability and delay between nodes.

Analysis of SceneMarks can also determine what kinds of AI models or AI processing is appropriate for devices. This additional information can then be sent to the devices as part of the workflow control package, such as in the Capture-Mode or capture sequence. Some sensor and devices have capability to do some analysis for certain analytic models. For example, AI models may be transmitted to the sensors and devices using industry standards, such as ONNX.

Figure 14:
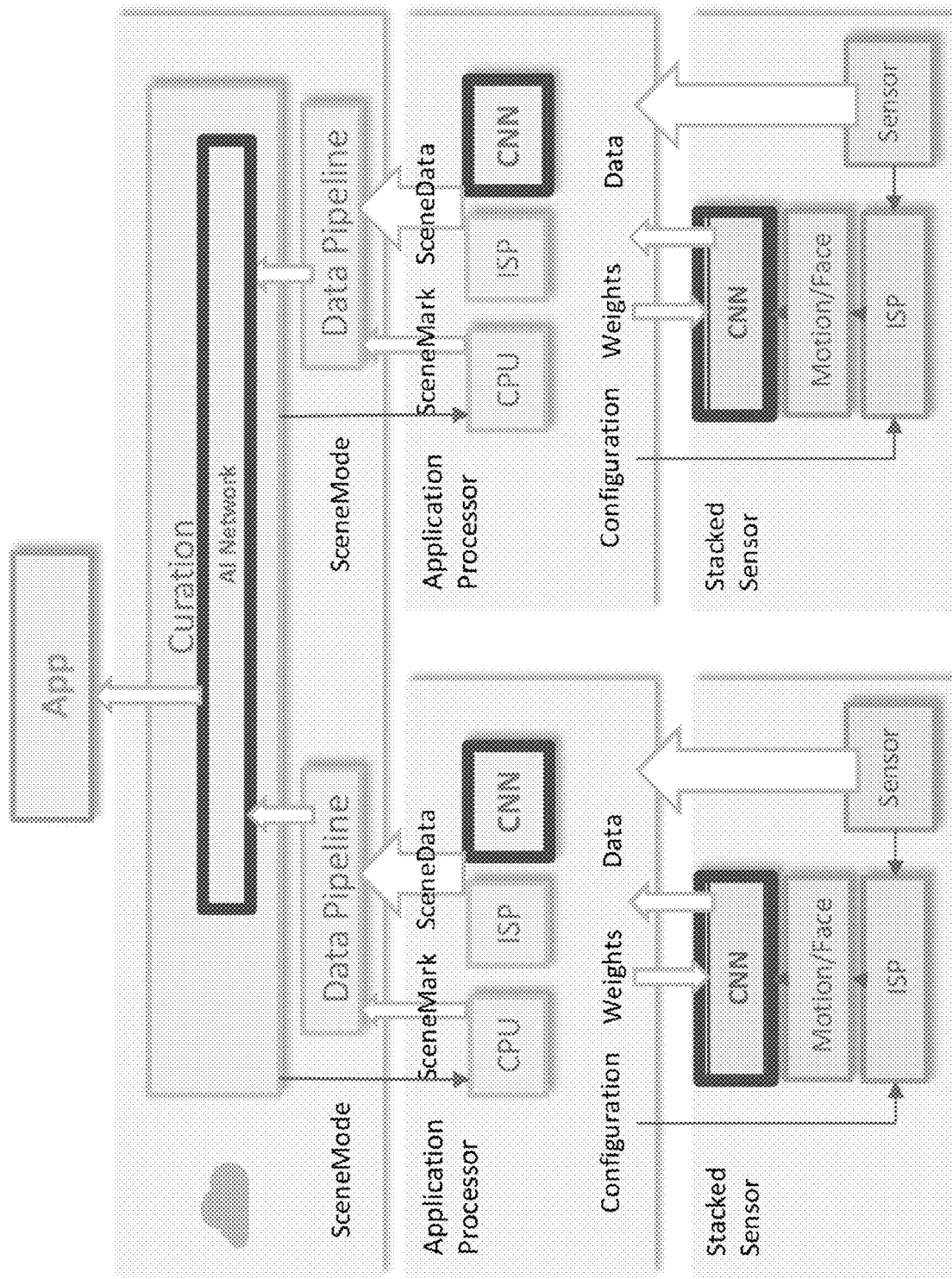
FIG. 14 shows an example multi-layer technology stack with distributed AI processing for multiple cameras.

Some of the features described above include the following:
- Using Tube Map to manage the triggering of nodes
- Tube Map includes probability and delays between event happenings among nodes
- Mechanism to allow timing information to be used to set SceneMode of other relevant nodes
- SceneMark incorporates relationship between initial SceneMark and subsequent SceneMarks captured in response to the initial (or other prior) SceneMarks FIG. 14 shows an example multi-layer technology stack with distributed AI processing for multiple cameras. This example shows two cameras and shows the different layers for each camera. The sensor layer is labelled "stacked sensor," the device layer is labelled "application processor" and the cloud layer is marked by the cloud symbol. Machine learning exists in all three layers, as shown by the CNNs in the sensor and device layers and the AI Network (broader range of machine learning and AI techniques) at the cloud layer.

The AI at the sensor layer may perform sensor level detection of objects, faces etc., and limited classification. Feedback to the sensor may be implemented by changing the weights of the CNN. Use of the sensor layer AI reduces bandwidth for data transmission from the sensor layer to higher layers. The AI at the device layer may include single camera analytics and more robust classification of objects, faces, etc. The AI at the cloud layer may include multi camera analytics and curation, interpretation of scenes and detection of unusual behavior.

Based on accumulated data and intelligence (e.g., capturing sequences of SceneMarks as described above), the workflow may program a sensor or low-level devices to generate the low-level SceneMarks. Based on those low-level SceneMarks at the sensor level, data can be passed on to the next layer of the device, through a bridge device or using a more advanced camera with application processors. From there, the workflow can determine higher-level SceneMarks and then send both relevant sensor data and metadata (SceneData and SceneMarks) to the cloud. The final curation can be done in a more intelligent way compared to brute force analysis of raw data. The layering is important to enable this.

The layering is also important for the control. As part of the control, the control plane is virtualized from layer to layer. Not only can the workflow send control packages specifying what can be captured, like a CaptureMode and capture sequence, but the workflow can also communicate back to the different layers what kind of AI model is appropriate. The layering also affects cost. The more that is done at the lower layers, the less is the total cost of analytics. Layering also reduces latency—how quickly events are detected, analyzed and responded to.

Figure 15A:
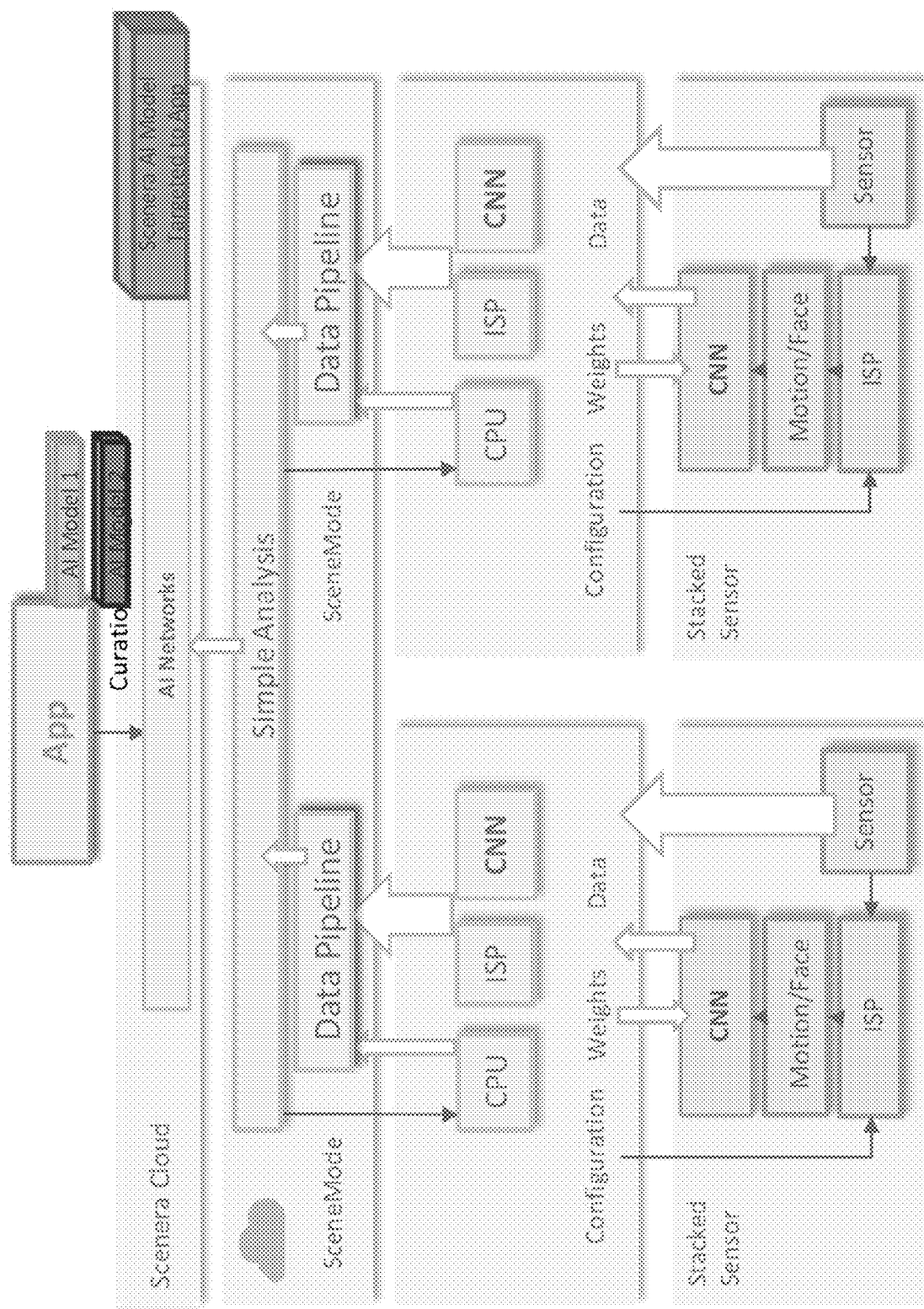
FIGS. 15A-15C show the distribution of targeted AI models through the multi-layer technology stack of FIG. 14.
Figure 15B:
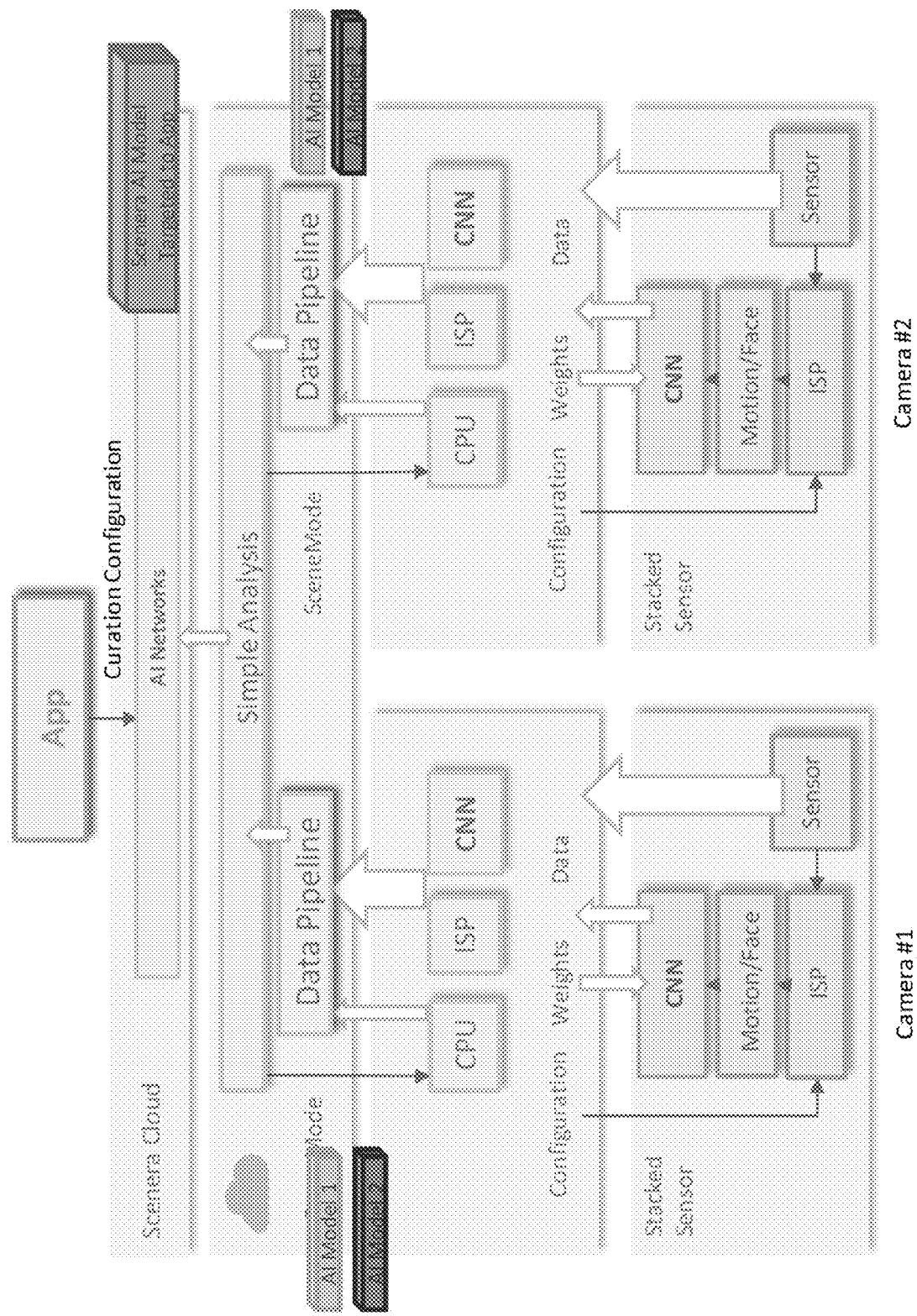
Figure 15C:
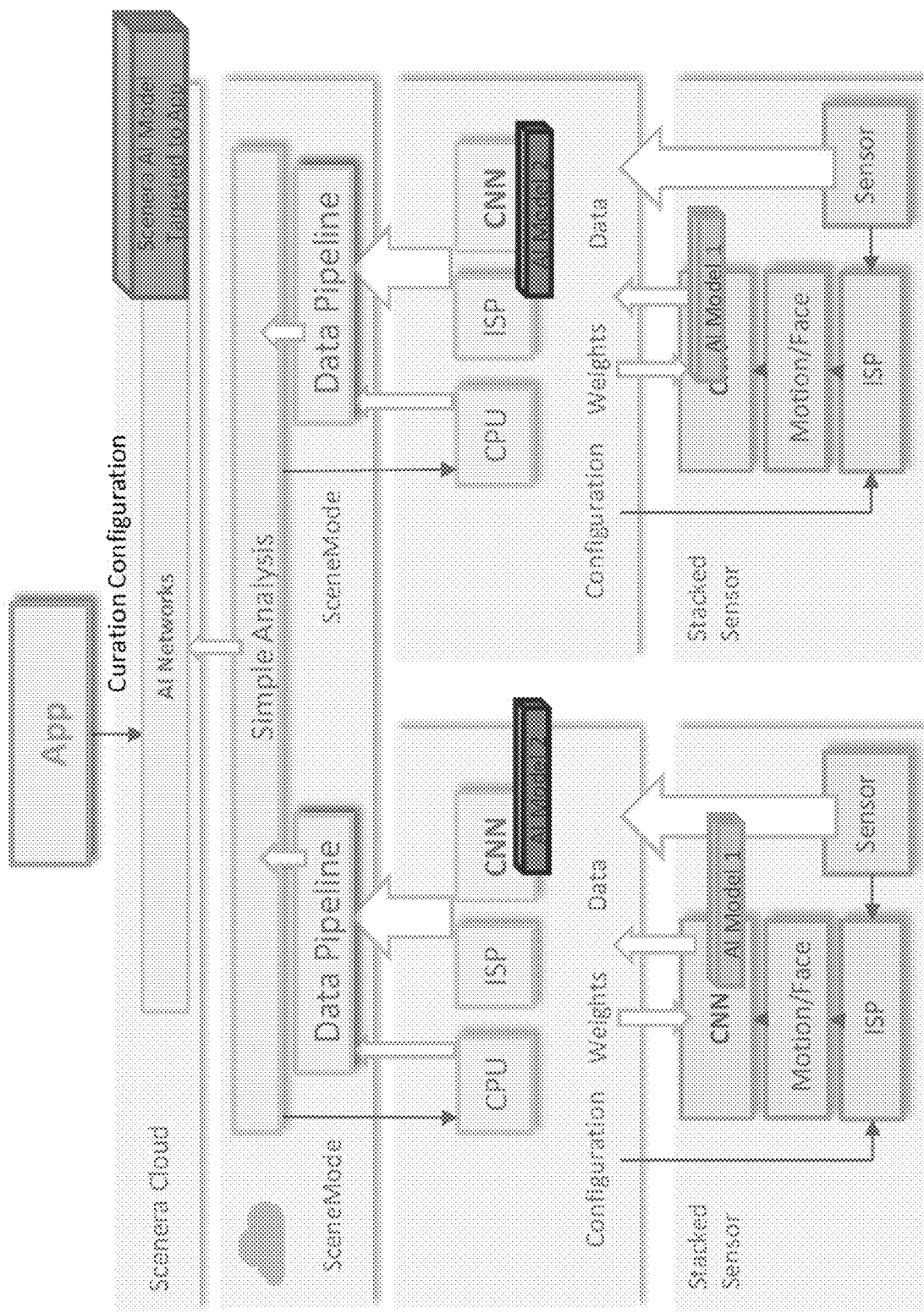

FIGS. 15A-15C show the distribution of targeted AI models through the multi-layer technology stack of FIG. 14. Simple data search techniques may be widely used in a cloud-based system. More sophisticated AI and machine learning, including learning characteristics of the relationships between nodes in the multi-layer stack, can also be done in the cloud. This can lead to a more customized or sophisticated AI compared to a generic cloud platform. FIG. 15A shows AI models targeted to specific applications. Data accumulated over time can be used to develop different AI models for different devices or different layers. This can include AI models for bridge devices or more advanced devices and also AI models for sensors which have some analytic capability like a CNN capability.

In this example, the stacked sensor is the sensor and processor stacked together and offered as one device. If the sensor has many pixels (e.g., 100-megapixel sensor), then no processing means sending 100 megapixel data to the next layer, which requires lots of bandwidth. With a stacked sensor, certain processing is done at the sensor with a stack processor in order to reduce data. Only important data is retained and sent to the next layer. To do so, what should this low-level sensor do to accomplish the task for the top-layer application? Knowing what problem that the application is trying to solve and knowing the capabilities of the nodes, and possibly after capturing much data and learning through that data, the workflow determines what AI model runs at which layer. This could also be done in real time. In real time, depending on what the workflow is trying to capture and summarize, each node can be programmed to capture and process data more efficiently.

In the example of FIG. 15, a curation service (labelled Scenera Cloud in FIG. 15) enables AI models tailored to specific enterprise verticals to be pushed to the edge layers (camera and sensor) for intelligent capture. In this example, the application is in a specific vertical and the curation service determines that AI Models 1 and 2 are appropriate for the task, as shown in FIG. 15A. These are pushed through the layers to the device layer and sensor layer respectively, as shown in FIGS. 15B and 15C. The curation service may provide sophisticated AI models which utilize the SceneData and SceneMarks to provide automated control and interpretation of events in the enterprise.

Figure 16A:
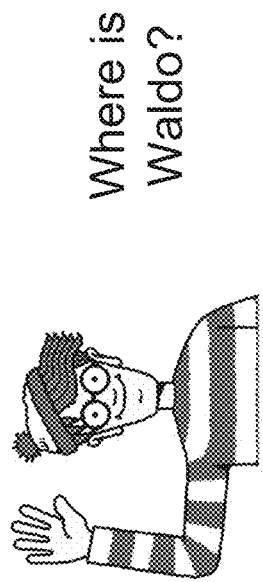
FIGS. 16A-16H show a use example based on finding Waldo.
Figure 16A:
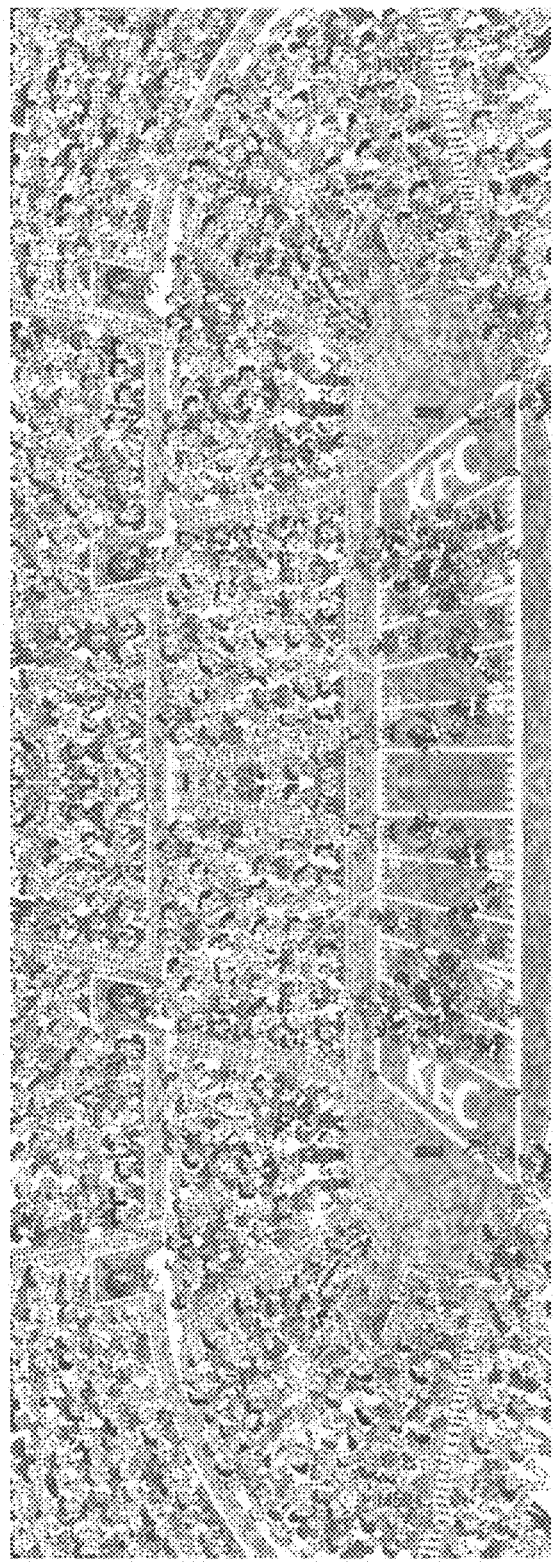
Figure 16B:
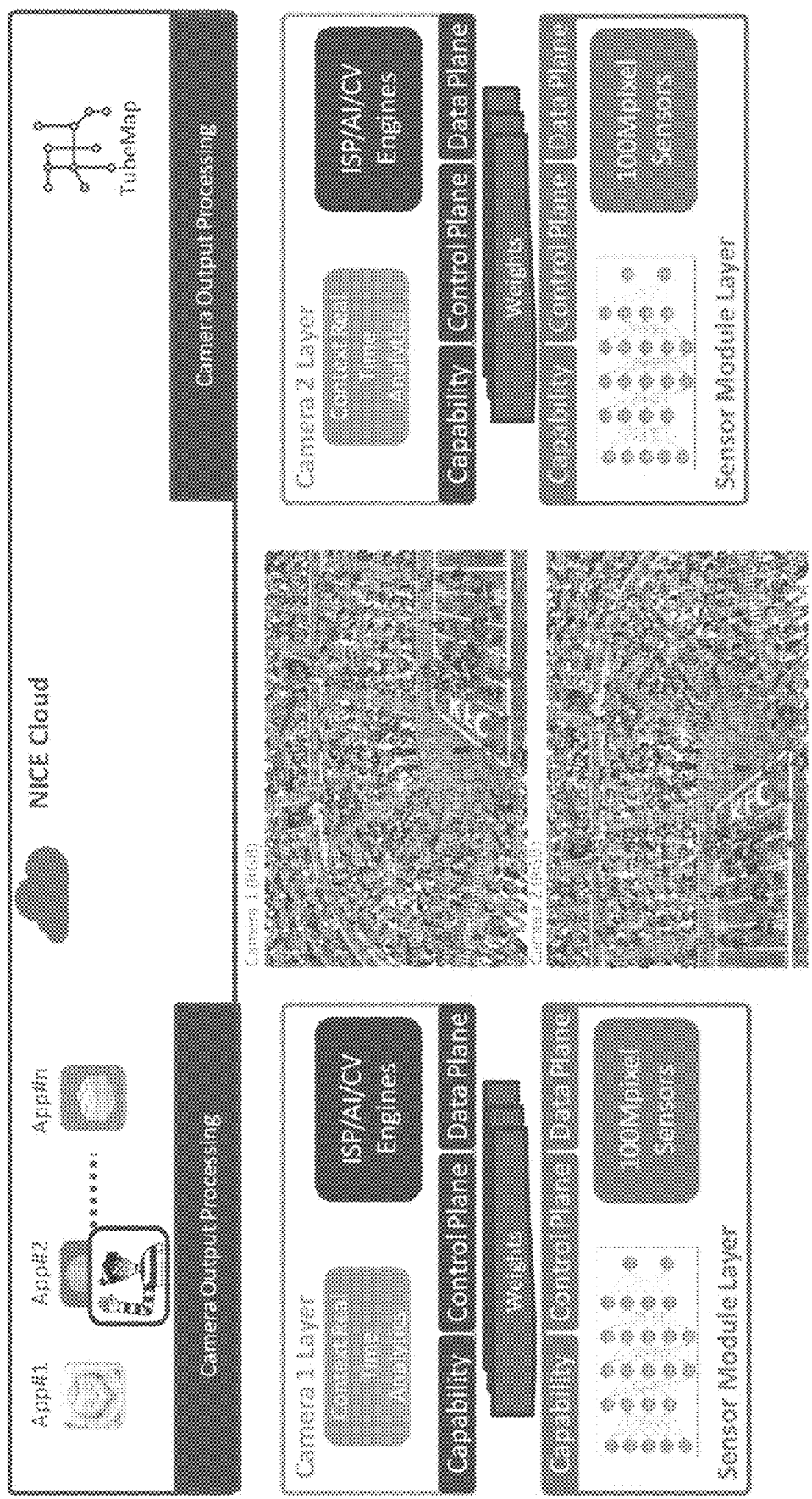

FIGS. 16A-16H show a use example based on finding Waldo. As shown in FIG. 16A, the application's task is to find all the Waldos at a crowded football game. Finding many Waldos in the same field can be achieved using multiple cameras and a multi-layer stack, as described above. In FIG. 16B, the system uses cameras with stacked sensor and sensors with 100 megapixels. There are two cameras, so two sensors and two camera processors. The workflow may divide the field, with camera 1 imaging the left half and camera 2 imaging the right half. Two cameras are used here, but any number of cameras may be used. One hundred cameras may be used to capture images in 100 different sections.

Figure 16C:
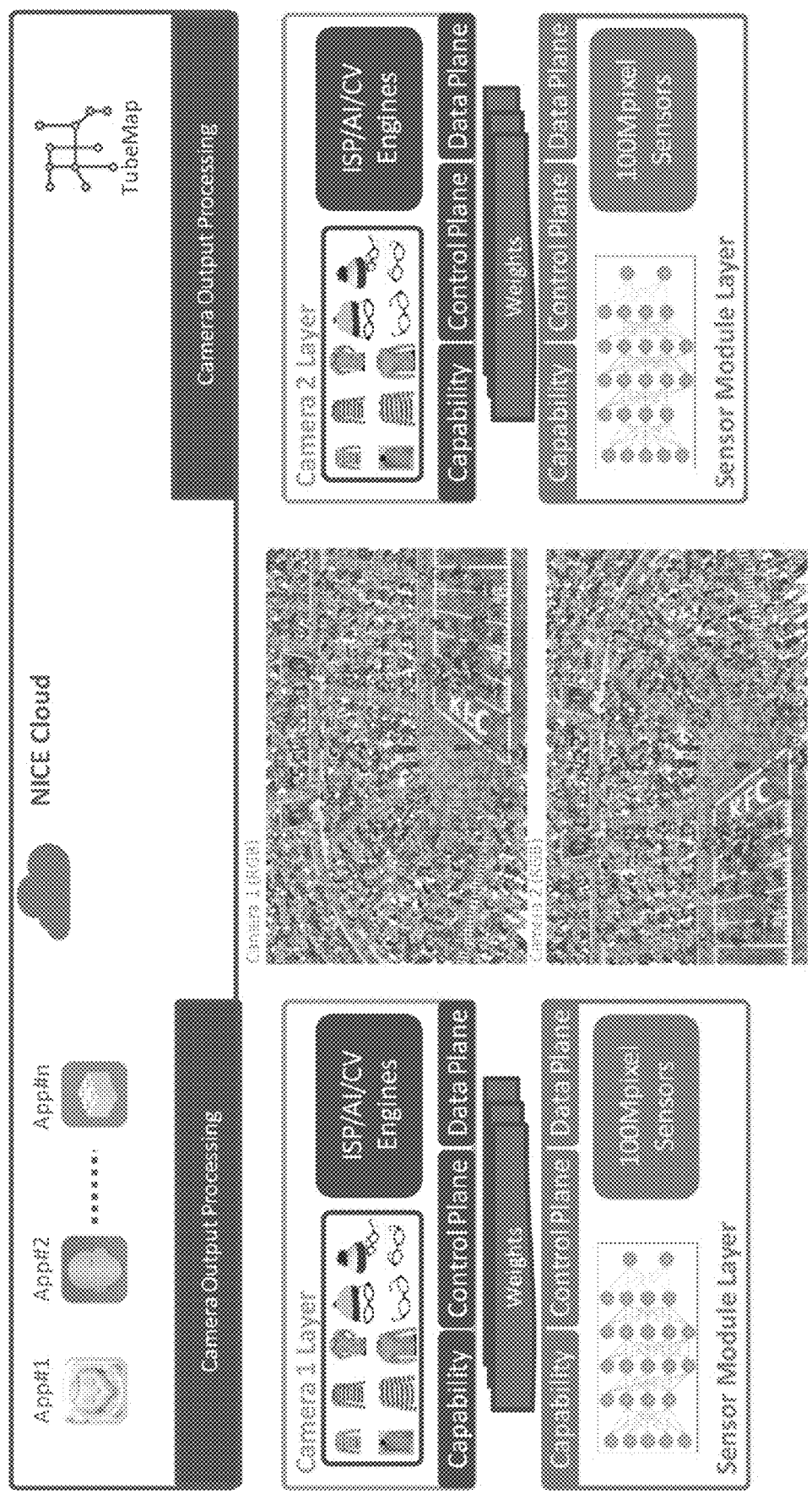
Figure 16D:
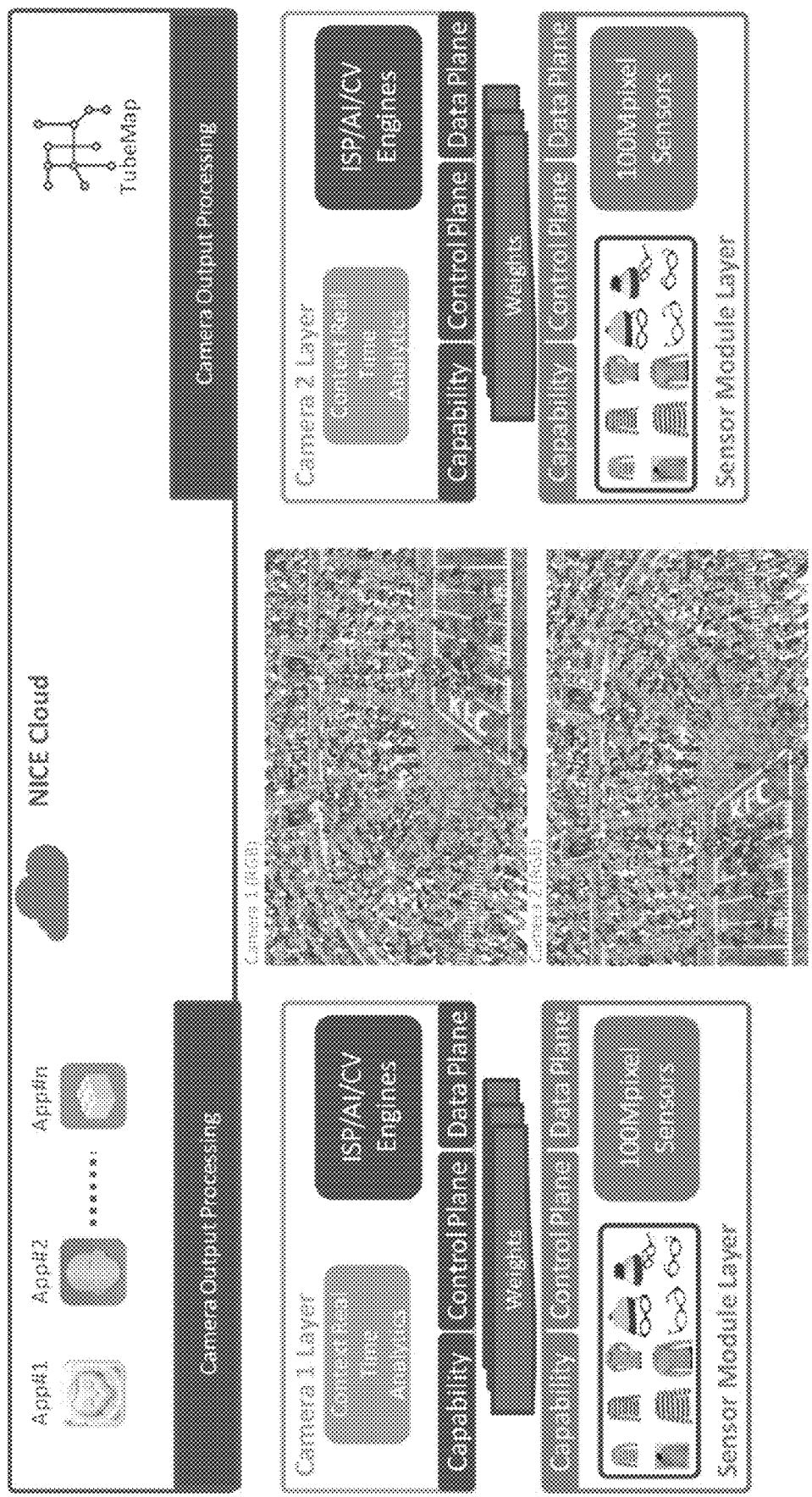
Figure 16E:
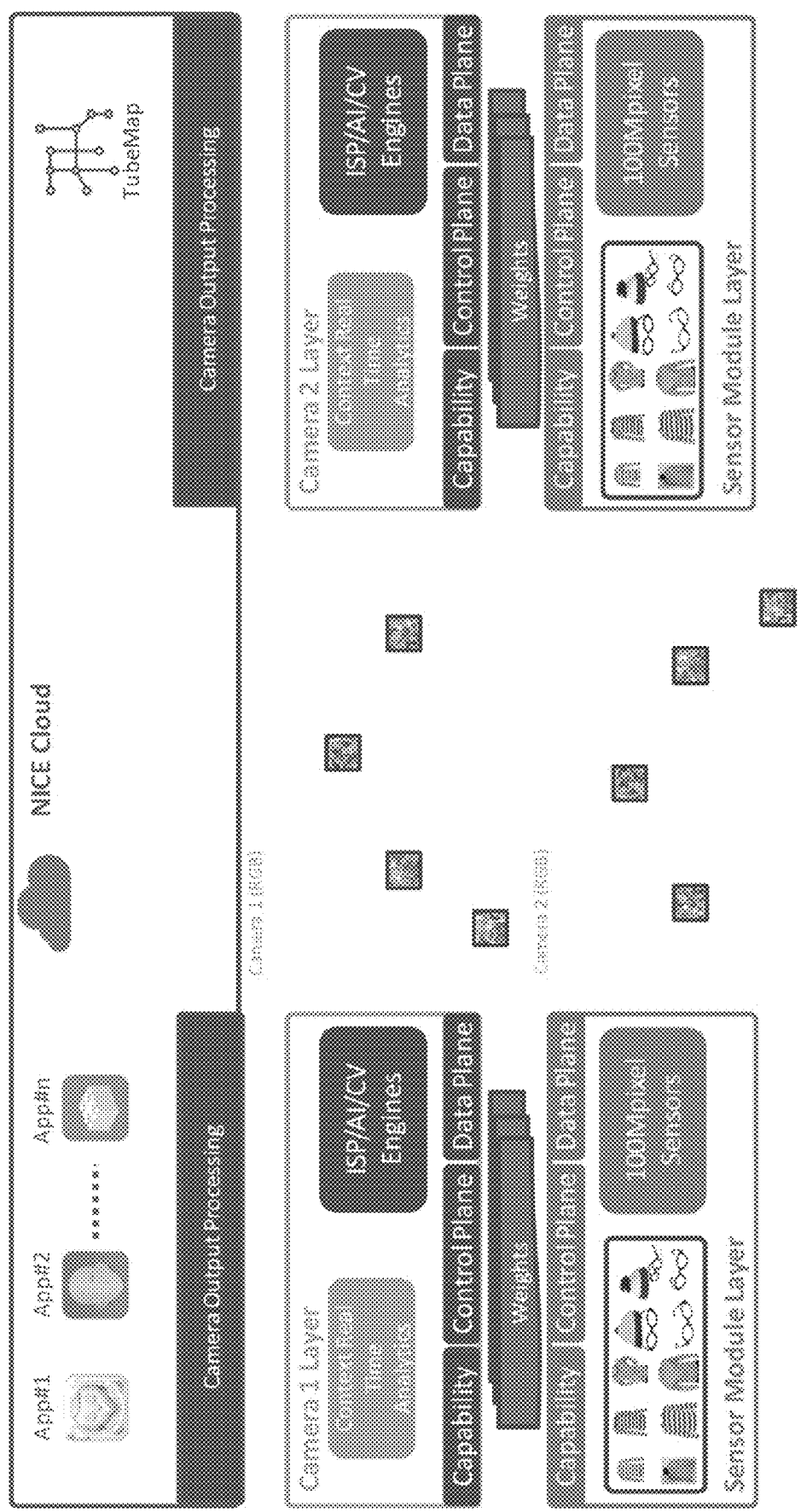
Figure 16F:
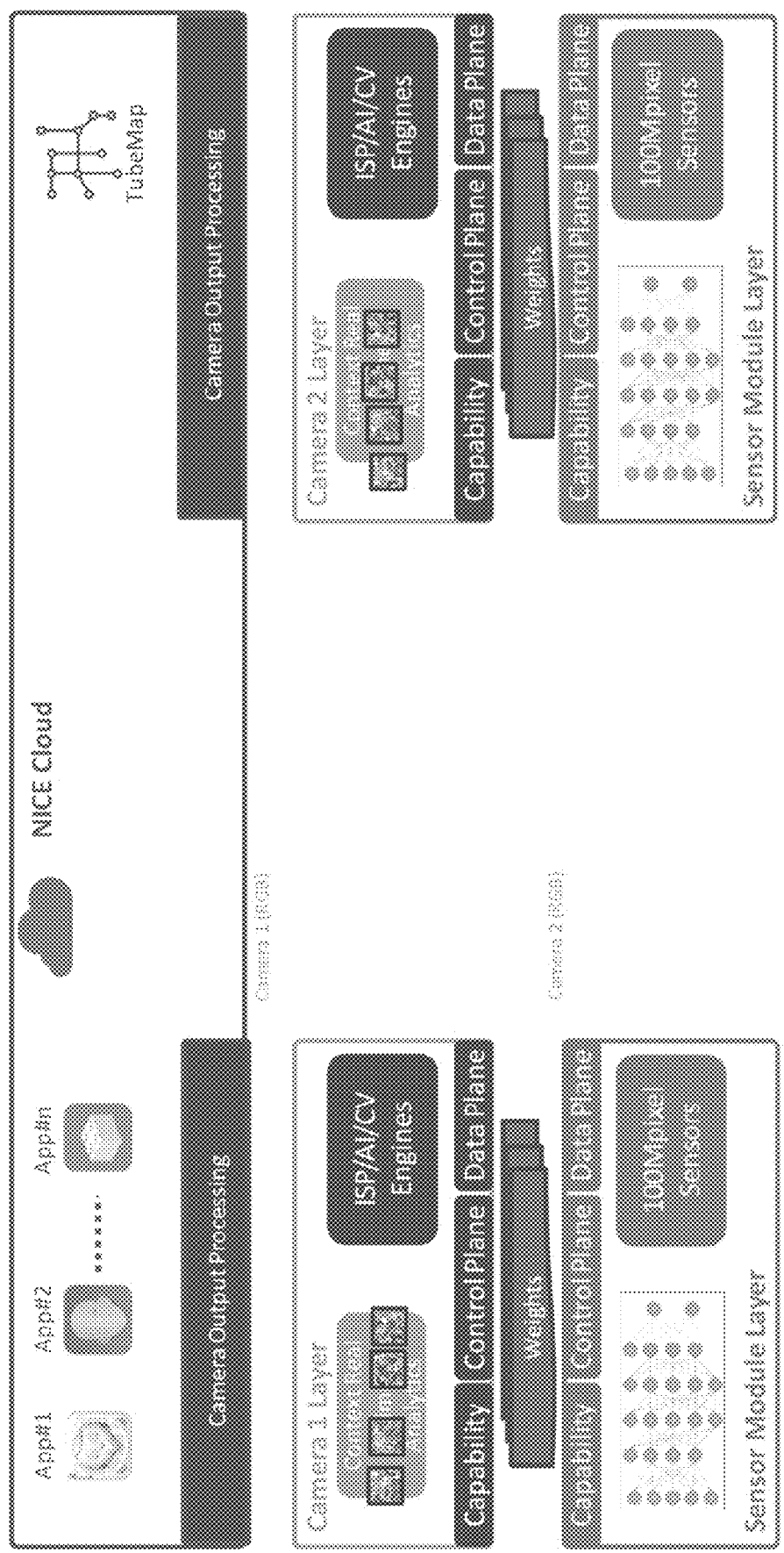
Figure 16G:
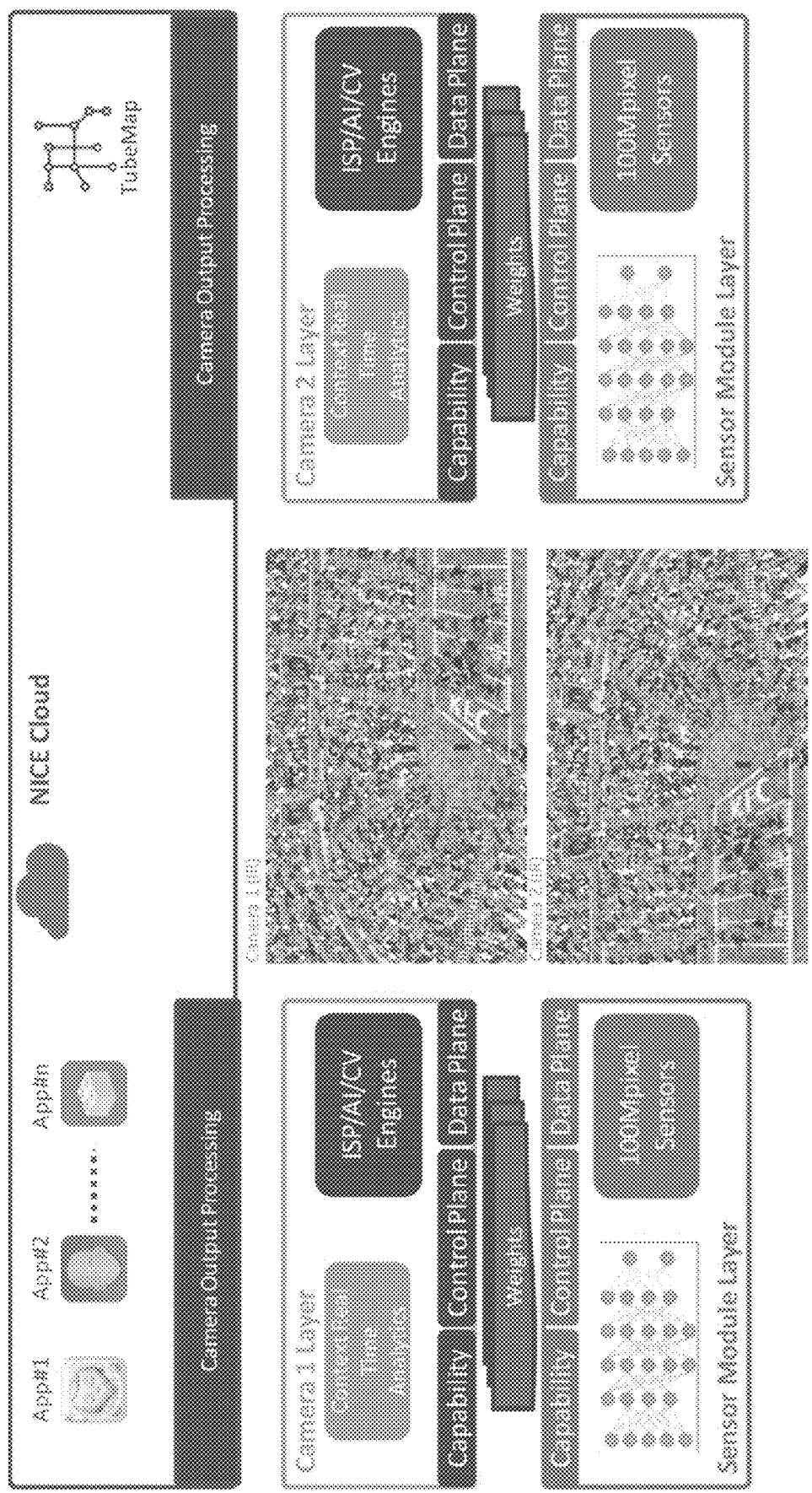
Figure 16H:
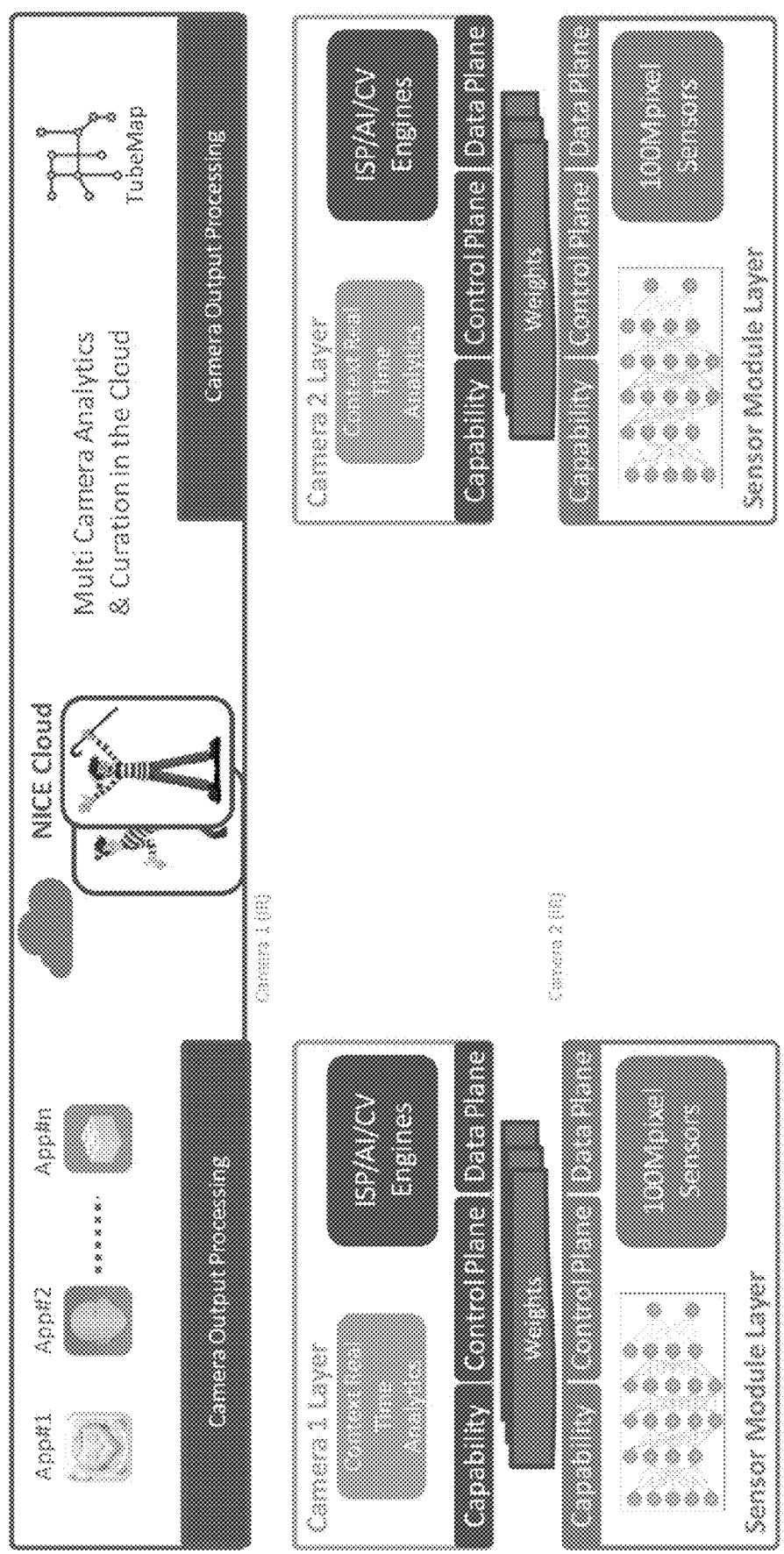

The task is finding Waldo. Waldo has certain distinguishing attributes: round glasses, red and white striped shirt, particular hat, and so on. The workflow identifies these attributes and sends these attributes to the device layer, as shown in FIG. 16C. If an image has any of these attributes, it may be an indication that Waldo is present. The presence of these attributes can be computed by sending appropriate weights for machine learning models in the sensing process, as shown in FIG. 16D. The sensor has 100 megapixels with a processing capability and it also gets these certain weights to look for red color, white color, stripes, round shapes, faces, etc. The weights for those attributes are downloaded to the sensors. The sensors then filter for these particular attributes and generate SceneMarks upon their detection. In FIG. 16E, the sensors have detected attributes at certain locations within their view. The sensor sends only those images where it detected possible Waldo attributes and then the camera layer processes these together. It may perform more sophisticated analysis of the SceneData and/or SceneMarks received from the sensor layers, as shown in FIG. 16F. Similar parallel processes may be performed for IR, black and white, or other modes or types of sensors, as represented by FIG. 16G. The SceneData and SceneMarks from the camera layer is analyzed by the cloud layer to identify Waldos, as shown in FIG. 16H.

The attributes described above may be extracted using machine learning, for example a CNN which produces a vector. The attribute is effectively encoded into the vector, typically in a manner that is not understandable to humans. For example, the color of a person's jersey may be encoded as certain numbers or combinations of numbers in the CNN's 256-number output vector. The CNN encodes the data in this way as a consequence of the training process that the network has undergone to differentiate between people. The triggering and distribution of attributes may then be based on the vector outputs of the CNN.

The layering facilitates the detection. The lowest layer may detect red, white, stripes, circles, face, torso, and other attributes, and generate corresponding SceneMarks. The next layer might realize that there are SceneMarks for red, white, striped and torso all in the same proximity and therefore it generates a SceneMark for red and white striped shirt. This is combined with SceneMarks for round black glasses, red and white tassel cap, tall skinny guy, etc. to generate a SceneMark for Waldo detected.

Figure 16I:
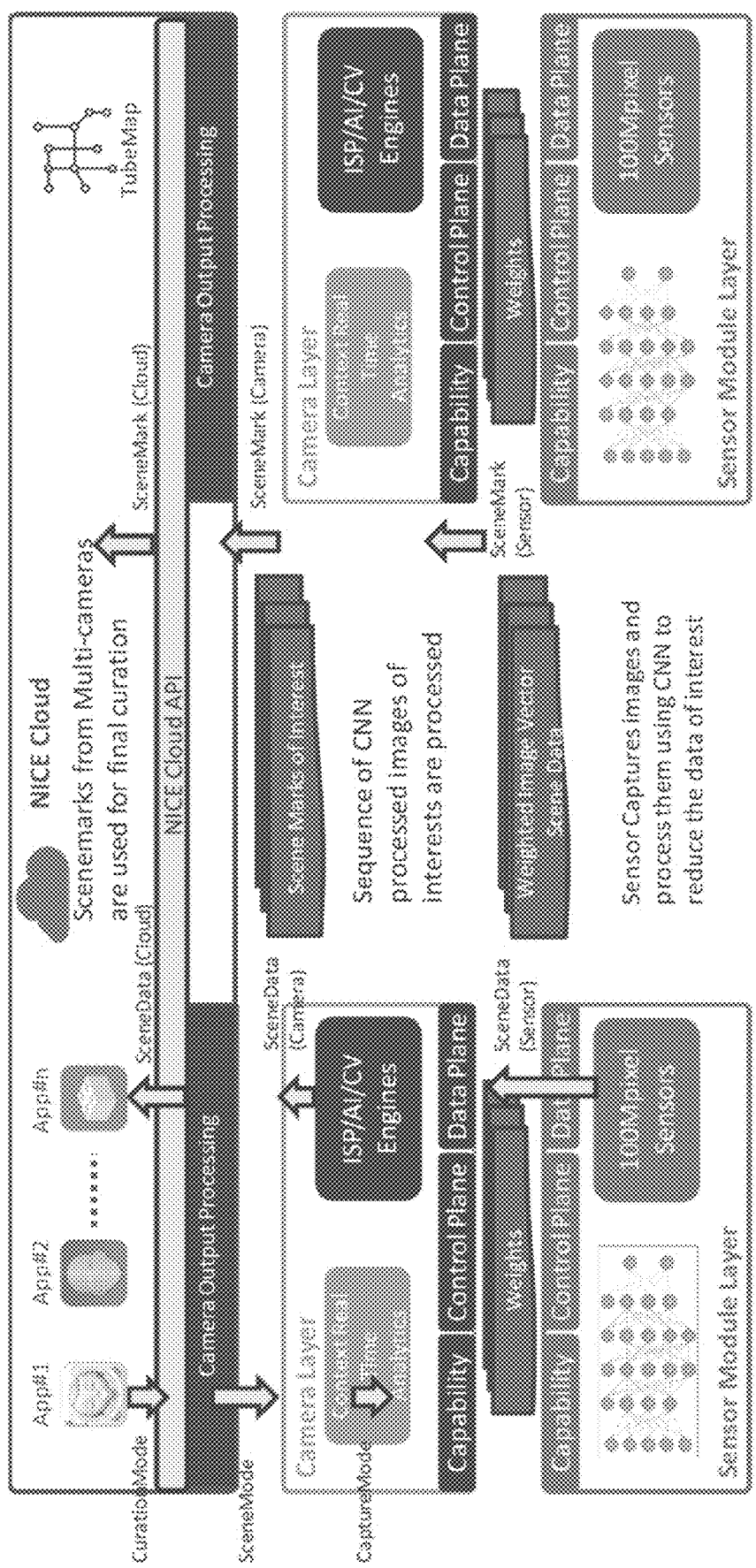
FIG. 16I shows data passing through the multi-layer technology stack.

FIG. 16I shows data passing through the multi-layer technology stack, via interface between the different layers. The middle set of arrows shows the passing of sensor data from the sensor capture up to the cloud. "SceneData" is sensor data, including processed and combined versions and possibly also including additional data. In the Waldo example, SceneData can include the raw captured images, processed versions of those images (e.g., change of resolution, color filtering, spatial filtering, fusion of images). The right set of arrows shows the passing of contextual metadata packaged into "SceneMarks". In the Waldo example, these are also passed from sensor layer to cloud layer. The left arrows show control data which deploy the overall workflow. In this example, the control data define different modes for the components in the layers. The packages of control data are referred to as CurationMode, SceneMode and CaptureMode, depending on which layer.

Figure 17A:
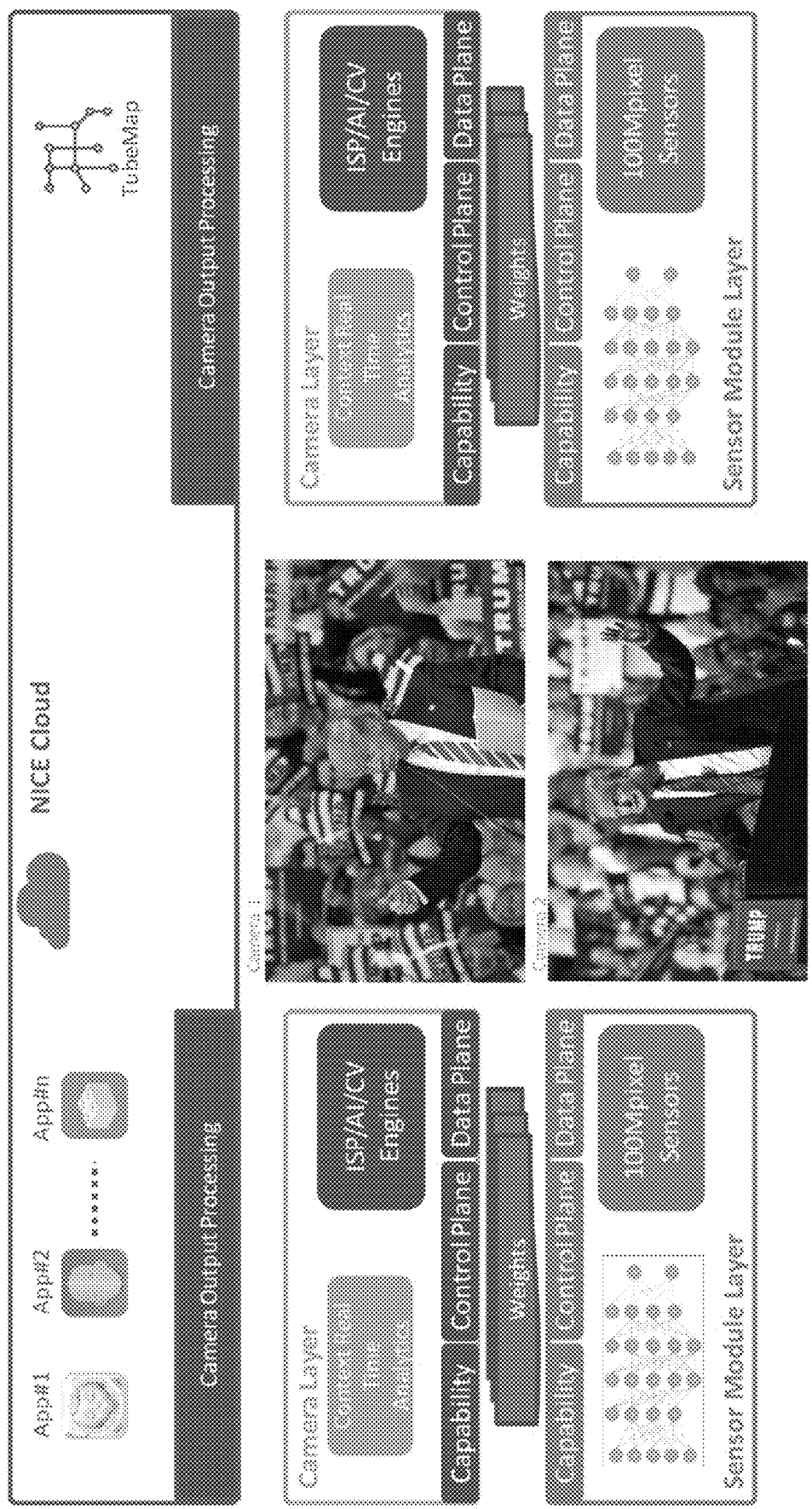
FIGS. 17A-17F show an example with security and privacy.
Figure 17B:
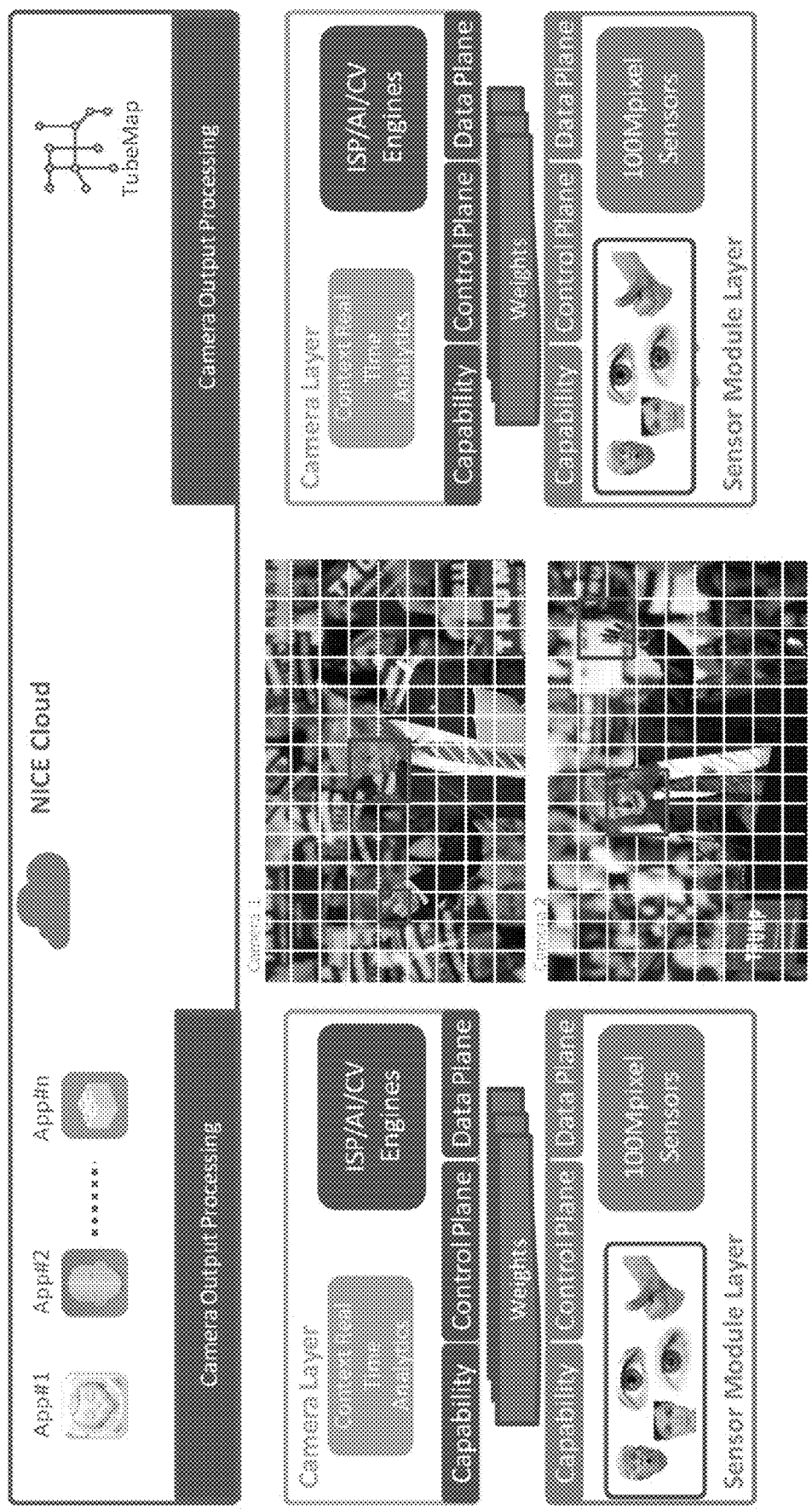
Figure 17C:
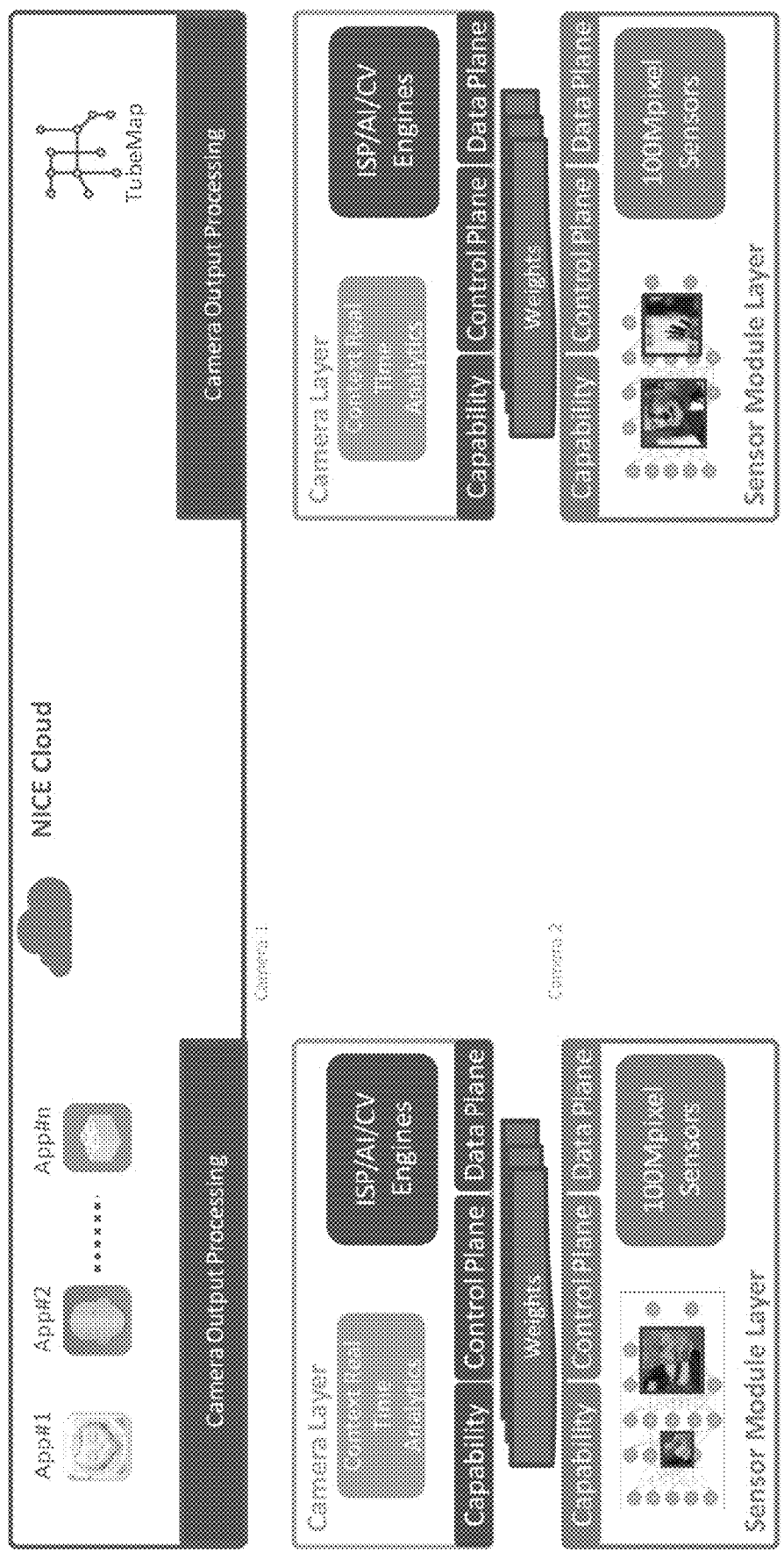
Figure 17D:
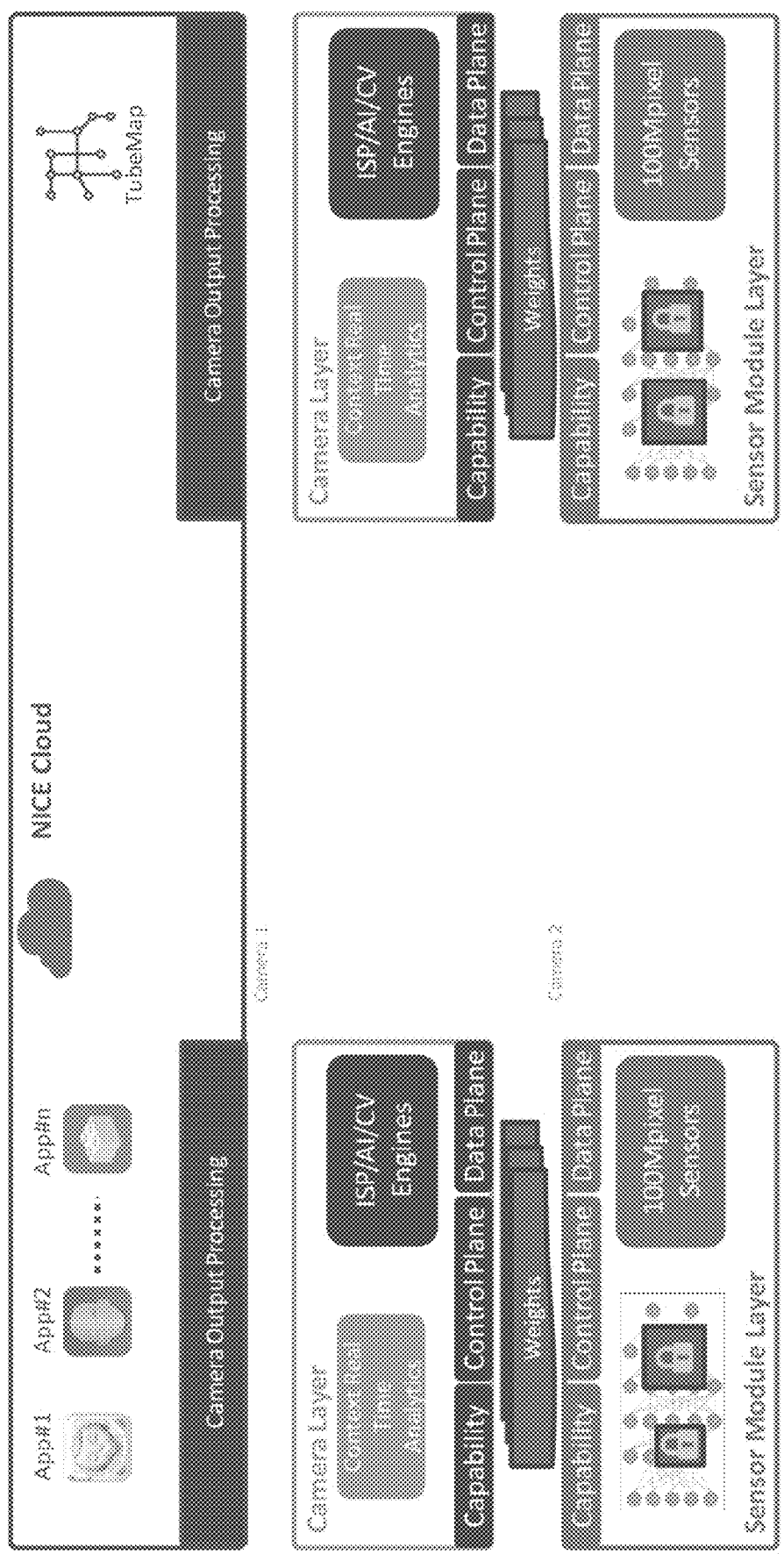
Figure 17E:
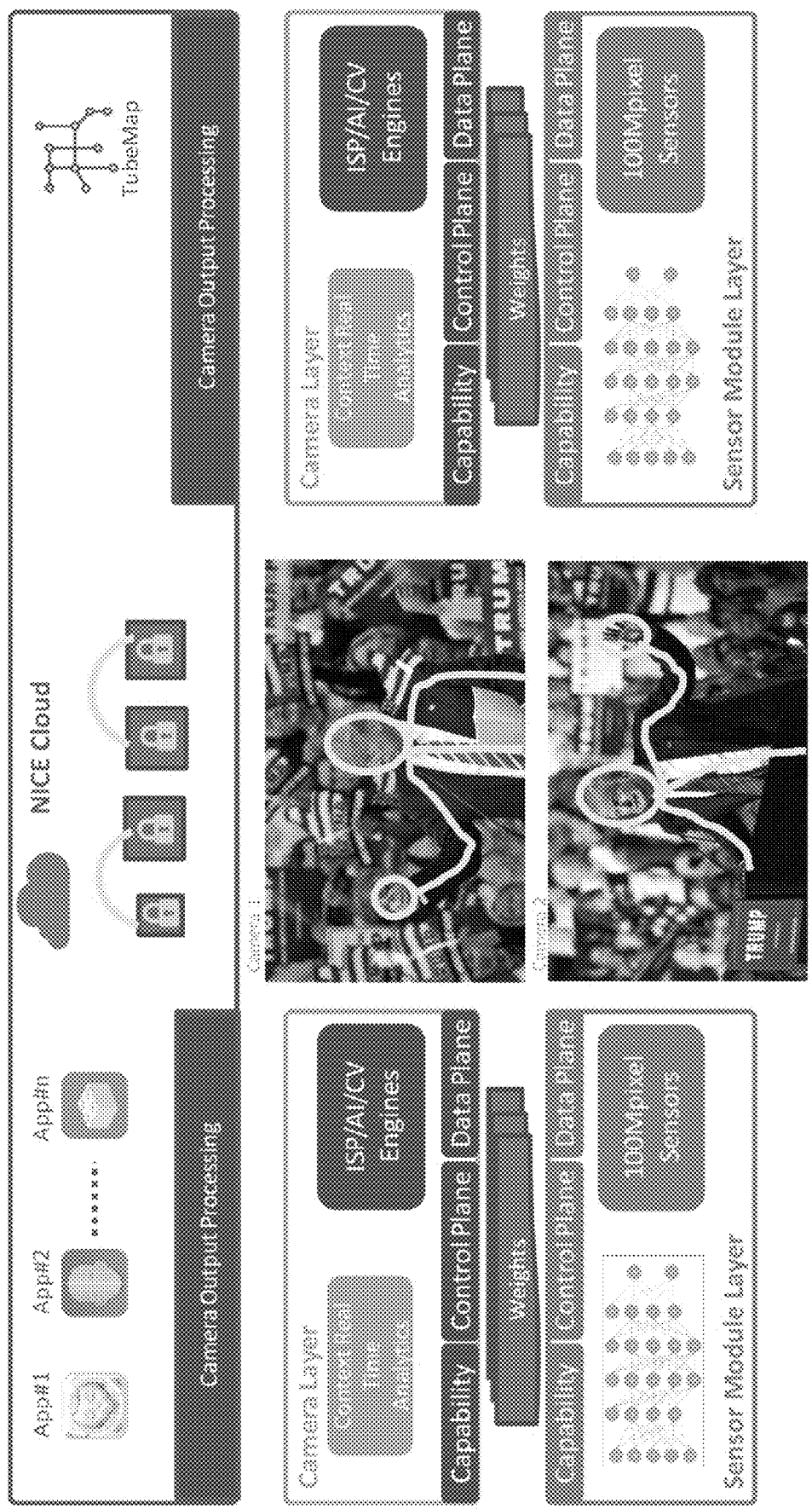
Figure 17F:
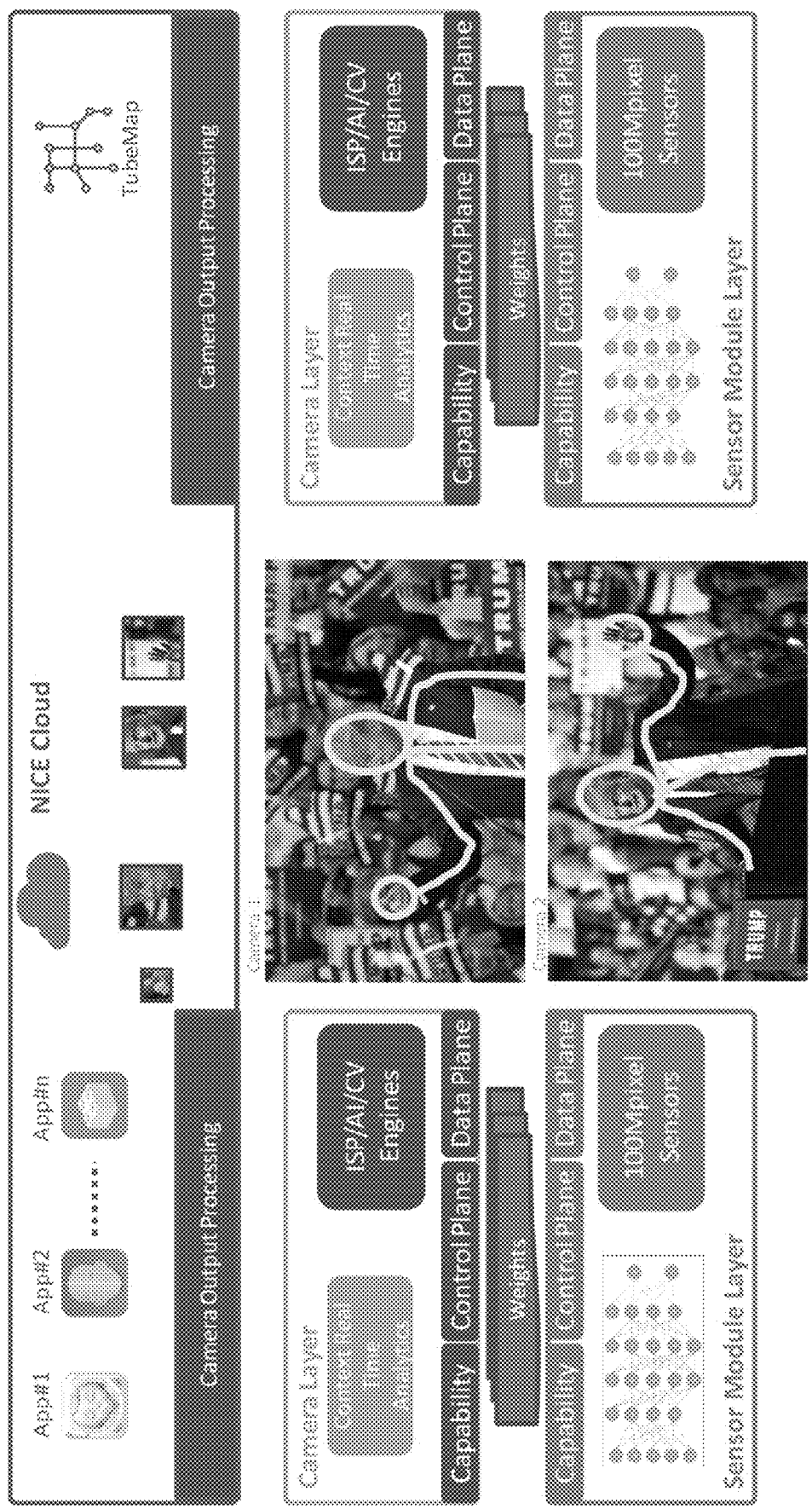

FIGS. 17A-17F show an example with security and privacy. Security and privacy concerns apply to many types of information, including biometric information like fingerprints and iris patterns. In this example, the workflow captures private information, so security measures are also taken. In FIG. 17A, a politician is shown here giving a thumbs up. A 100 megapixel camera can have enough resolution to capture the person's fingerprint or his iris. A similar approach to FIG. 16 identifies different attributes of the politician, including possibly his fingerprint, iris, etc. FIGS. 17B and 17C show the identification of sensitive attributes at the sensor layer. The workflow recognizes these are more sensitive information, so they are encrypted even before they leave the sensors, as shown in FIG. 17D. As soon as it is captured and recognized as biometric or private information, it is encrypted. The data is passed in encrypted from through the layers. The layers can decrypt on a need to know basis to build up the task required. The final result is detection of the politician. This end result may be presented without requiring disclosure of the sensitive information as shown in FIG. 17E. Here, fingerprint, iris print, and other sensitive information may be used together to identify the person as indicated by the yellow connections, but not shown in the final presentation. Alternatively, the sensitive information may be shown only to authorized users as in FIG. 17F.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

Section X: Description of Data Objects

This Section X describes example implementations of the following data objects:
Capabilities
SceneMode
SceneMark
SceneData These data objects may be used to facilitate image understanding. Image understanding are higher level functions used to understand the content of images. One example is the detection of the presence or absence of a specific object: the detection of faces, of humans, of animals or certain types of animals, of vehicles, of weapons, of man-made structures or certain type of structures, or of texts or logos or bar codes. A higher level example is the identification (i.e., recognition) of specific objects: the identification of a terrorist in a crowd, the identification of individuals by name, the identification of logos by company, the identification of an individual against a passport or driver's license or other credential. An even higher level example of image understanding are further characterizations based on the detection or identification of specific objects. For example, a face may be detected and then analyzed to understand the emotion expressed. Other examples of image understanding include the detection and identification of specific actions or activities, and of specific locations or environments. More complex forms of image understanding may be based on machine learning, deep learning and/or artificial intelligence techniques that require significant computing resources. The results of image understanding may be captured in metadata, referred to as image understanding metadata or contextual metadata. They may be packaged as SceneMarks described below.

Capabilities Object

The Capabilities object defines Processing, Transducers and Ports that the Node is capable of providing. The Capabilities data structure describes the available processing, capture (input) and output of images, audio, sources of data and outputs of data that are supported by a Node. These may include the following.

1. Transducer: A Transducer is either a sensor or an actuator which can convert data into a physical disturbance (for example a speaker). The following are examples of Transducers:
  Image sensor (image, depth, or temperature camera) typically outputs a two-dimensional array that represents a frame.
  Data sensor (humidity sensor, temperature sensor, etc.) typically outputs a text or data structure.
  Audio microphone typically produces a continuous sequence of audio samples.
  Speaker takes as an input a sequence of audio samples and outputs audio.
2. SceneModes supported: These are defined modes for analyzing images. See also the SceneMode object below.
3. Audio processing: This may be defined by the Node. It includes the function of speech to text.
4. CustomAnalysis: This allows the user to define custom analysis. As one example, it may be an algorithm that can process an audio, image or video input and generate a vector of scores whose meaning is defined by the algorithm.
5. Input: This may be SceneData or SceneMarks and may be in a processed or unprocessed form. The following may be sources for the process:
  Output of a sensor internal or external to the device.
  Output of a Node on a different device.
  Output of a different Node within the same device.
6. Output: An output may be SceneData or SceneMarks and may also be in a processed or unprocessed form.

SceneMode Object

The SceneMode determines the data to be generated. It defines which type of data is to be prioritized by the capture of frames and the processing of the captured frames. It also defines the SceneMarks that are generated and the trigger conditions for generating the SceneMarks.

For example the Face SceneMode will prioritize the capture of faces within a sequence of frames. When a face is detected, the camera system will capture frames with the faces present where the face is correctly focused, illuminated and, where necessary, sufficiently zoomed to enable facial recognition to be executed with increased chance of success. When more than one face is detected, the camera may capture as many faces as possible correctly. The camera may use multiple frames with different settings optimized for the faces in view. For example, for faces close to the camera, the camera is focused close. For faces further away, digital zoom and longer focus is used.

The following SceneModes may be defined:
Face
Human
Animal
Text/Logo/Barcode
Vehicle
Object Label. This is a generalized labeling of images captured by the camera.
Custom. This is user defined.

The SceneMode may generate data fields in the SceneMark associated with other SceneModes. The purpose of the SceneMode is guide the capture of images to suit the mode and define a workflow for generating the data as defined by the SceneMode. At the application level, the application need not have insight into the specific configuration of the devices and how the devices are capturing images. The application uses the SceneMode to indicate which types of data the application is interested in and are of highest priority to the application.

Trigger Condition

A SceneMode typically will have one or more "Triggers." A Trigger is a condition upon which a SceneMark is generated and the SceneData defined for the SceneMode is captured and processed. The application can determine when a SceneMark should be generated.

In one approach, Triggers are based on a multi-level model of image understanding. The Analysis Levels are the following:
1. Motion Detected: The Process is capable of detecting motion within the field of view.
2. Item Detected or Item Disappeared: The Process is capable of detecting the item associated with the SceneMode (Item Detected) or detecting when the item is no longer present (Item Disappeared). For example in the case of SceneMode=Face, Item Detected means that a Face has been detected. In the case of SceneMode=Animal, Item Disappeared means a previously detected animal is no longer present.
3. Item Recognized: The Process is capable of identifying the detected item. For example in the case of the SceneMode=Label, "Recognized" means a detected item can be labelled. In the case of SceneMode=Face, "Recognized" means that the identity of the face can be determined. In one version, the SceneMode configuration supports recognition of objects based on reference images for the object.

4. Item Characterized: The Process is capable of determining a higher-level characteristic for the item. For example in Scene Mode=Face, "Characterized" means that some feature of the detected face has had an attribute associated with it. For example, a mood or emotion has been attributed to the detected face.

The SceneMode defines the Analysis Level required to trigger the generation of a SceneMark. For example, for SceneMode=Face, the Trigger Condition may be Face Detected, or Face Recognized, or Face Characterized for Emotion. Similar options are available for the other SceneModes listed above.

SceneMark Object

A SceneMark is a compact representation of a recognized event or Scene of interest based on image understanding of the time- and/or location-correlated aggregated events. SceneMarks may be used to extract and present information pertinent to consumers of the sensor data. SceneMarks may also be used to facilitate the intelligent and efficient archival/retrieval of detailed information, including the raw sensor data. In this role, SceneMarks operate as an index into a much larger volume of sensor data.

SceneMark objects include the following:
SceneMark identifier
Timestamp
Image understanding metadata
Reference to corresponding SceneData When the analysis engines encounter Trigger Conditions, a SceneMark is produced. It provides a reference to the SceneData and metadata for the Trigger Condition. The completeness of the SceneMark is determined by the analysis capabilities of the Node. If the Node can only perform motion detection when higher level analysis is ultimately desired, a partial SceneMark may be generated. The partial SceneMark may then be completed by subsequent processing Nodes. The SceneMark may contain versioning information that indicates how the SceneMark and its associated SceneData have been processed. This enables the workflow processing the SceneMark to keep track of the current stage of processing for the SceneMark. This is useful when processing large numbers of SceneMarks asynchronously as it reduces the requirements to check databases to track the processing of the SceneMark.

SceneData Object

SceneData is captured or provided by a group of one or more sensor devices and/or sensor modules, which includes different types of sensor data related to the Scene. SceneData is not limited to the raw captured data, but may also include some further processing. Examples include:
RGB image data
IR image data
RGB IR image data
Depth map
Stereo image data
Audio
Temperature
Humidity
Carbon Monoxide
Passive Infrared The SceneMode defines the type and amount of SceneData that is generated when the Trigger that is associated with the SceneMode is triggered. For example the SceneMode configuration may indicate that 10 seconds of video before the Trigger and 30 seconds after the Trigger is generated as SceneData. This is set in the SceneData configuration field of the SceneMode data object. Multiple SceneMarks may reference a single video file of SceneData if Triggers happen more rapidly than the period defined for SceneData. For example where multiple Triggers occur within 30 seconds and the SceneData is defined for each Trigger is 30 seconds. Where multiple Triggers occur within those 30 seconds, the SceneMarks generated for each Trigger reference the same video file that makes up the SceneData for the Trigger.

What is claimed is:

1. A method implemented on a computer system to curate different custom workflows for multiple applications, the custom workflow for each application generating a custom set of data packages from a multi-layer technology stack, the method comprising:
receiving requirements for the custom set of data packages for the applications, the custom set of data packages comprising sensor data packages and contextual metadata packages that contextualize the sensor data packages;
for each application:
based on the received requirements for that application and capabilities of components in the technology stack: deploying the custom workflow for that application including a selection, configuration and linking of components from the technology stack; wherein the technology stack includes a sensor layer including image sensors, a device layer, and a cloud layer, with interfaces between the layers; and
implementing the custom workflow in the components of the technology stack by transmitting workflow control packages directly and/or indirectly via the interfaces to the different layers.

2. The method of claim 1 wherein the capabilities of the components include (a) capabilities at the sensor layer to capture raw sensor data, (b) capabilities to process sensor data into different versions of the sensor data, and (c) capabilities, including AI capabilities at the cloud layer, to analyze sensor data and/or metadata to generate additional metadata.

3. The method of claim 1 wherein at least some of the contextual metadata packages comprises detection of trigger events, and the custom workflow depends on the detection of trigger events.

4. The method of claim 3 wherein the custom workflow includes conditional linking of components that depends on the detection of trigger events.

5. The method of claim 3 wherein the custom workflow includes conditional configuration of components that depends on the detection of trigger events.

6. The method of claim 3 wherein the custom workflow includes conditional selection of components that depends on the detection of trigger events.

7. The method of claim 3 wherein the custom workflow includes conditional workflow in the sensor and/or device layers that depends on the detection of trigger events by AI in the cloud layer.

8. The method of claim 1 wherein deploying the custom workflow is further based on a proximity map of the sensors.

9. The method of claim 8 wherein the custom workflow includes capture of video by multiple image sensors in proximity to each other.

10. The method of claim 1 wherein deploying the custom workflows is further based on access rights of the applications to the components.

11. The method of claim 1 wherein the custom workflows are implemented using a message-based architecture.

12. The method of claim 1 wherein implementing the custom workflow comprises:
transmitting workflow control packages to one of the layers, wherein that layer analyzes the workflow control packages and generates and transmits additional workflow control packages resulting from the analysis to a next lower layer.

13. The method of claim 12 wherein the workflow control packages include CurationModes, SceneModes and CaptureModes.

14. The method of claim 1 wherein sensor data captured by at least two sensors are combined with corresponding metadata into SceneShots that are timestamped packages of the sensor data and metadata for a scene.

15. The method of claim 1 wherein multiple custom workflows can be executed simultaneously in the technology stack without conflict.

16. The method of claim 1 wherein the interfaces between layers are standardized application programming interfaces.

17. The method of claim 1 further comprising:
indexing and publishing at least some of the contextual metadata packages generated by the custom workflows.

18. A non-transitory computer-readable storage medium storing executable computer program instructions for curating different custom workflows for multiple applications, the custom workflow for each application generating a custom set of data packages from a multi-layer technology stack, the instructions executable by a computer system and causing the computer system to perform a method comprising:
receiving requirements for the custom set of data packages for the applications, the custom set of data packages comprising sensor data packages and contextual metadata packages that contextualize the sensor data packages;
for each application:
based on the received requirements for that application and capabilities of components in the technology stack: deploying the custom workflow for that application including a selection, configuration and linking of components from the technology stack;
wherein the technology stack includes a sensor layer including image sensors, a device layer, and a cloud layer, with interfaces between the layers; and the capabilities of the components include (a) capabilities at the sensor layer to capture raw sensor data, (b) capabilities to process sensor data into different versions of the sensor data, and (c) capabilities, including AI capabilities at the cloud layer, to analyze sensor data and/or metadata to generate additional metadata; and
implementing the custom workflow in the components of the technology stack by transmitting workflow control packages directly and/or indirectly via the interfaces to the different layers.

* * * * *